United States Patent
Boudreault et al.

(10) Patent No.: US 9,290,828 B2
(45) Date of Patent: Mar. 22, 2016

(54) PROCESSES FOR PREPARING TITANIUM OXIDE AND VARIOUS OTHER PRODUCTS

(71) Applicant: ORBITE ALUMINAE INC., St-Laurent (CA)

(72) Inventors: Richard Boudreault, St-Laurent (CA); Joël Fournier, Carignan (CA); Denis Primeau, Ste-Julie (CA); Marie-Maxime Labrecque-Gilbert, Laval (CA)

(73) Assignee: ORBITE TECHNOLOGIES INC., St-Laurent (CA)

( * ) Notice: Subject to any disclaimer, the term of this patent is extended or adjusted under 35 U.S.C. 154(b) by 0 days.

(21) Appl. No.: 14/413,940

(22) PCT Filed: Jul. 12, 2013

(86) PCT No.: PCT/CA2013/000638
§ 371 (c)(1),
(2) Date: Jan. 9, 2015

(87) PCT Pub. No.: WO2014/008586
PCT Pub. Date: Jan. 16, 2014

(65) Prior Publication Data
US 2015/0159239 A1 Jun. 11, 2015

Related U.S. Application Data

(63) Continuation-in-part of application No. PCT/CA2012/000871, filed on Sep. 17, 2012, and a continuation-in-part of application No. PCT/CA2013/000021, filed on Jan. 10, 2013.

(60) Provisional application No. 61/670,645, filed on Jul. 12, 2012, provisional application No. 61/726,971, filed on Nov. 15, 2012.

(51) Int. Cl.
*C22B 21/00* (2006.01)
*C01G 23/047* (2006.01)
(Continued)

(52) U.S. Cl.
CPC ............. *C22B 21/0015* (2013.01); *C01B 7/035* (2013.01); *C01B 33/193* (2013.01);
(Continued)

(58) Field of Classification Search
None
See application file for complete search history.

(56) References Cited

U.S. PATENT DOCUMENTS 558,726 A 4/1896 Gooch
650,763 A 5/1900 Raynaud
(Continued)

FOREIGN PATENT DOCUMENTS

| AU | 631226 | 2/1991 |
|---|---|---|
| AU | 4375001 | 12/2001 |
| CA | 1066872 | 11/1979 |
| CA | 1088961 | 11/1980 |

(Continued)

OTHER PUBLICATIONS

An English translation of Zhang et al., "Research on the Kinetics of Alumina from Kaolinite Leaching in Sulphuric Acid", Journal of Hefei University of Technology, vol. 24, No. 1, Feb. 2001, pp. 71-74.
(Continued)

*Primary Examiner* — Melissa Swain
(74) *Attorney, Agent, or Firm* — Bereskin & Parr LLP/S.E.N.C.R.L., s.r.l.

(57) ABSTRACT

There are provided processes for preparing various products from various materials. For example, such processes are effective for extracting titanium and various other metals from various materials, thereby allowing for preparing products such as titanium chloride and titanium oxide. These processes can comprise leaching the starting material with HCl so as to obtain a leachate and a solid. The solid can be treated so as to substantially selectively extract titanium therefrom while the leachate can be treated so as to substantially selectively recover a first metal chloride therefrom.

22 Claims, 10 Drawing Sheets

(51) Int. Cl.

| | | |
|---|---|---|
| C01F 7/56 | (2006.01) | |
| C22B 34/12 | (2006.01) | |
| C01F 7/22 | (2006.01) | |
| C01F 7/30 | (2006.01) | |
| C01G 23/02 | (2006.01) | |
| C01G 49/06 | (2006.01) | |
| C01G 53/04 | (2006.01) | |
| C01B 7/03 | (2006.01) | |
| C01B 33/193 | (2006.01) | |
| C22B 3/10 | (2006.01) | |
| C22B 3/44 | (2006.01) | |
| C22B 26/22 | (2006.01) | |
| C22B 59/00 | (2006.01) | |

(52) U.S. Cl.
CPC .................. *C01F 7/22* (2013.01); *C01F 7/306* (2013.01); *C01F 7/56* (2013.01); *C01G 23/02* (2013.01); *C01G 23/047* (2013.01); *C01G 49/06* (2013.01); *C01G 53/04* (2013.01); *C22B 3/10* (2013.01); *C22B 3/44* (2013.01); *C22B 26/22* (2013.01); *C22B 34/1245* (2013.01); *C22B 34/1259* (2013.01); *C22B 59/00* (2013.01)

(56) References Cited

U.S. PATENT DOCUMENTS

| | | | |
|---|---|---|---|
| 1,494,029 A | 5/1924 | Scofield et al. | |
| 1,501,873 A | 7/1924 | Tyrer | |
| 1,519,880 A | 12/1924 | Heinrich et al. | |
| 1,701,510 A | 2/1929 | Sieurin | |
| 1,760,962 A | 6/1930 | Phillips et al. | |
| 1,778,083 A | 10/1930 | Marburg | |
| 1,906,467 A | 5/1933 | Heath | |
| 1,931,515 A | 10/1933 | Fritz et al. | |
| 1,956,139 A | 4/1934 | Staufer et al. | |
| 1,962,498 A | 6/1934 | Frost | |
| 1,999,773 A | 4/1935 | McMichael | |
| 2,024,026 A | 12/1935 | Coleman et al. | |
| 2,189,376 A | 2/1940 | Burman | |
| 2,354,133 A | 7/1944 | Lyons | |
| 2,376,696 A | 5/1945 | Hixson et al. | |
| 2,406,577 A | 8/1946 | Alessandroni | |
| 2,471,844 A | 5/1949 | Strelzoff | |
| 2,489,309 A | 11/1949 | Mills et al. | |
| 2,642,337 A | 6/1953 | Newsome et al. | |
| 2,648,595 A | 8/1953 | Kennedy | |
| 2,663,620 A | 12/1953 | Haensel, III | |
| 2,707,149 A | 4/1955 | McKinley | |
| 2,722,471 A | 11/1955 | Hirsch et al. | |
| 2,769,686 A | 11/1956 | Michener, Jr. et al. | |
| 2,771,344 A | 11/1956 | Michel et al. | |
| 2,780,525 A | 2/1957 | Wendell, Jr. et al. | |
| 2,806,766 A | 9/1957 | Anderson | |
| 2,815,264 A | 12/1957 | Calkins et al. | |
| 2,824,783 A | 2/1958 | Peppard et al. | |
| 2,848,398 A | 8/1958 | Inagaki | |
| 2,914,381 A | 11/1959 | Wainer | |
| 2,914,464 A | 11/1959 | Burton et al. | |
| 2,992,893 A | 7/1961 | Soudan et al. | |
| 3,013,859 A | 12/1961 | Kuhlman, Jr. et al. | |
| 3,104,950 A | 9/1963 | Ellis | |
| 3,159,452 A | 12/1964 | Lerner | |
| 3,192,128 A | 6/1965 | Brandmair et al. | |
| 3,211,521 A | 10/1965 | George et al. | |
| 3,473,919 A | 10/1969 | Metcalfe et al. | |
| 3,479,136 A | 11/1969 | Michener, Jr. et al. | |
| 3,540,860 A | 11/1970 | Cochran | |
| 3,545,920 A | 12/1970 | George et al. | |
| 3,586,477 A | 6/1971 | Flood | |
| 3,620,671 A | 11/1971 | Maurel et al. | |
| 3,642,441 A | 2/1972 | Van Weert | |
| 3,649,185 A | 3/1972 | Sato et al. | |
| 3,658,483 A | 4/1972 | Lienau et al. | |
| 3,682,592 A | 8/1972 | Kovacs | |
| 3,751,553 A | 8/1973 | Oslo et al. | |
| 3,816,605 A | 6/1974 | Schwandorf | |
| 3,852,430 A | 12/1974 | Lienau et al. | |
| 3,862,293 A | 1/1975 | Maurel et al. | |
| 3,903,239 A | 9/1975 | Berkovich | |
| 3,922,164 A | 11/1975 | Reid et al. | |
| 3,944,648 A | 3/1976 | Solymar et al. | |
| 3,946,103 A | 3/1976 | Hund | |
| 3,966,909 A | 6/1976 | Grunig et al. | |
| 3,983,212 A | 9/1976 | Lowenstein et al. | |
| 4,042,664 A | 8/1977 | Cardwell et al. | |
| 4,045,537 A | 8/1977 | Hrishikesan | |
| 4,048,285 A | 9/1977 | Szepesi et al. | |
| 4,069,296 A | 1/1978 | Huang | |
| 4,098,868 A | 7/1978 | Tolley | |
| 4,107,281 A | 8/1978 | Reh et al. | |
| 4,110,399 A | 8/1978 | Gaudernack et al. | |
| 4,124,680 A | 11/1978 | Cohen et al. | |
| 4,130,627 A | 12/1978 | Russ et al. | |
| 4,133,677 A | 1/1979 | Matsui et al. | |
| 4,158,042 A | 6/1979 | Deutschman | |
| 4,172,879 A | 10/1979 | Miller et al. | |
| 4,177,242 A | 12/1979 | Cohen et al. | |
| 4,193,968 A | 3/1980 | Sullivan et al. | |
| 4,198,231 A | 4/1980 | Gusset | |
| 4,222,989 A * | 9/1980 | Belsky et al. .................. | 423/126 |
| 4,224,287 A | 9/1980 | Ziegenbalg et al. | |
| 4,226,844 A | 10/1980 | Reh et al. | |
| 4,233,273 A | 11/1980 | Meyer et al. | |
| 4,237,102 A | 12/1980 | Cohen et al. | |
| 4,239,735 A | 12/1980 | Eisele et al. | |
| 4,241,030 A | 12/1980 | Cohen et al. | |
| 4,259,311 A | 3/1981 | Shah | |
| 4,297,326 A | 10/1981 | Gjelsvik et al. | |
| 4,318,896 A | 3/1982 | Schoonover | |
| 4,362,703 A | 12/1982 | Boybay et al. | |
| 4,370,422 A | 1/1983 | Panda et al. | |
| 4,378,275 A | 3/1983 | Adamson et al. | |
| 4,392,987 A | 7/1983 | Laine et al. | |
| 4,402,932 A | 9/1983 | Miller et al. | |
| 4,414,196 A | 11/1983 | Matsumoto et al. | |
| 4,435,365 A | 3/1984 | Morris | |
| 4,437,994 A | 3/1984 | Baker | |
| 4,465,566 A | 8/1984 | Loutfy et al. | |
| 4,465,659 A | 8/1984 | Cambridge et al. | |
| 4,486,393 A | 12/1984 | Baksa et al. | |
| 4,490,338 A | 12/1984 | De Schepper et al. | |
| 4,530,819 A | 7/1985 |Ieglédi et al. | |
| 4,560,541 A | 12/1985 | Davis | |
| 4,567,026 A | 1/1986 | Liosowyj | |
| 4,585,645 A | 4/1986 | Sucech | |
| 4,634,581 A | 1/1987 | Cambridge et al. | |
| 4,652,433 A | 3/1987 | Ashworth et al. | |
| 4,676,838 A | 6/1987 | Franz et al. | |
| 4,710,369 A | 12/1987 | Bergman | |
| 4,741,831 A | 5/1988 | Grinstead | |
| 4,797,271 A | 1/1989 | Fleming et al. | |
| 4,816,233 A | 3/1989 | Rourke et al. | |
| 4,820,498 A | 4/1989 | Newkirk | |
| 4,826,671 A | 5/1989 | Arndt et al. | |
| 4,830,507 A | 5/1989 | Bagatto et al. | |
| 4,898,719 A | 2/1990 | Rourke et al. | |
| 4,913,884 A | 4/1990 | Feuling | |
| 4,938,871 A | 7/1990 | Musikas et al. | |
| 4,965,053 A | 10/1990 | Herchenroeder et al. | |
| 4,968,504 A | 11/1990 | Rourke et al. | |
| 4,980,141 A | 12/1990 | Kimura et al. | |
| 4,988,487 A | 1/1991 | Lai et al. | |
| 4,995,984 A | 2/1991 | Barkatt et al. | |
| 5,006,753 A | 4/1991 | Hasker et al. | |
| 5,008,089 A | 4/1991 | Moody et al. | |
| 5,011,665 A | 4/1991 | Cailly et al. | |
| 5,015,447 A | 5/1991 | Fulford et al. | |
| 5,019,362 A | 5/1991 | Rourke et al. | |
| 5,030,424 A | 7/1991 | Fulford et al. | |
| 5,035,365 A | 7/1991 | Birmingham | |
| 5,037,608 A | 8/1991 | Tarcy et al. | |

(56) References Cited

U.S. PATENT DOCUMENTS

| | | |
|---|---|---|
| 5,039,336 A | 8/1991 | Feuling |
| 5,043,077 A | 8/1991 | Chandler et al. |
| 5,045,209 A | 9/1991 | Snyder et al. |
| 5,053,144 A | 10/1991 | Szirmai et al. |
| 5,061,474 A | 10/1991 | Pauli et al. |
| 5,071,472 A | 12/1991 | Traut et al. |
| 5,080,803 A | 1/1992 | Bagatto et al. |
| 5,091,159 A | 2/1992 | Connelly et al. |
| 5,093,091 A | 3/1992 | Dauplaise et al. |
| 5,104,544 A | 4/1992 | Shimizu et al. |
| 5,106,797 A | 4/1992 | Allaire |
| 5,112,534 A | 5/1992 | Guon et al. |
| 5,120,513 A | 6/1992 | Moody et al. |
| 5,124,008 A | 6/1992 | Rendall et al. |
| 5,149,412 A | 9/1992 | Allaire |
| 5,160,482 A | 11/1992 | Ash et al. |
| 5,180,563 A | 1/1993 | Lai et al. |
| 5,188,809 A | 2/1993 | Crocker et al. |
| 5,192,443 A | 3/1993 | Delloye et al. |
| 5,244,649 A | 9/1993 | Ostertag et al. |
| 5,274,129 A | 12/1993 | Natale et al. |
| 5,368,736 A | 11/1994 | Horwitz et al. |
| 5,409,677 A | 4/1995 | Zinn |
| 5,409,678 A | 4/1995 | Smith et al. |
| 5,433,931 A | 7/1995 | Bosserman |
| 5,443,618 A | 8/1995 | Chapman |
| 5,492,680 A | 2/1996 | Odekirk |
| 5,500,043 A | 3/1996 | Harada et al. |
| 5,505,857 A | 4/1996 | Misra et al. |
| 5,512,256 A | 4/1996 | Bray et al. |
| 5,531,970 A | 7/1996 | Carlson |
| 5,585,080 A | 12/1996 | Andersen et al. |
| 5,597,529 A | 1/1997 | Tack |
| 5,622,679 A | 4/1997 | Yuan et al. |
| 5,632,963 A | 5/1997 | Schwab et al. |
| 5,639,433 A | 6/1997 | Yuan et al. |
| 5,645,652 A | 7/1997 | Okinaka et al. |
| 5,665,244 A | 9/1997 | Rothenberg et al. |
| 5,720,882 A | 2/1998 | Stendahl et al. |
| 5,723,097 A | 3/1998 | Barnett et al. |
| 5,766,478 A | 6/1998 | Smith et al. |
| 5,787,332 A | 7/1998 | Black et al. |
| 5,792,330 A | 8/1998 | Petersen et al. |
| 5,795,482 A | 8/1998 | Ehle et al. |
| 5,876,584 A | 3/1999 | Cortellini |
| 5,885,545 A | 3/1999 | Pitzer |
| 5,904,856 A | 5/1999 | Kvant et al. |
| 5,911,967 A | 6/1999 | Ruthner |
| 5,922,403 A | 7/1999 | Tecle |
| 5,942,199 A | 8/1999 | Jokinen et al. |
| 5,955,042 A | 9/1999 | Barnett et al. |
| 5,962,125 A | 10/1999 | Masaki |
| 5,993,758 A * | 11/1999 | Nehari et al. ............... 423/126 |
| 5,997,828 A | 12/1999 | Rendall |
| 6,033,579 A | 3/2000 | Riemer et al. |
| 6,045,631 A | 4/2000 | Tarcy et al. |
| 6,077,486 A | 6/2000 | Spitzer |
| 6,093,376 A | 7/2000 | Moore |
| 6,153,157 A | 11/2000 | McLaughlin |
| 6,214,306 B1 | 4/2001 | Aubert et al. |
| 6,221,233 B1 | 4/2001 | Rendall |
| 6,238,566 B1 | 5/2001 | Yoshida et al. |
| 6,248,302 B1 | 6/2001 | Barnett et al. |
| 6,254,782 B1 | 7/2001 | Kreisler |
| 6,267,936 B1 | 7/2001 | Delmas et al. |
| 6,302,952 B1 | 10/2001 | Mobbs et al. |
| 6,309,441 B1 | 10/2001 | Benz et al. |
| 6,312,653 B1 | 11/2001 | Delmau et al. |
| 6,337,061 B1 | 1/2002 | Iyatomi et al. |
| 6,348,154 B1 | 2/2002 | Stewart |
| 6,383,255 B1 | 5/2002 | Sundkvist |
| 6,395,062 B2 | 5/2002 | Olafson et al. |
| 6,395,242 B1 | 5/2002 | Allen et al. |
| 6,406,676 B1 | 6/2002 | Sundkvist |
| 6,447,738 B1 | 9/2002 | Rendall et al. |
| 6,468,483 B2 | 10/2002 | Barnett et al. |
| 6,500,396 B1 | 12/2002 | Lakshmanan et al. |
| 6,524,549 B1 | 2/2003 | Mohri et al. |
| 6,565,733 B1 | 5/2003 | Sportel et al. |
| 6,576,204 B2 | 6/2003 | Johansen |
| 6,716,353 B1 | 4/2004 | Mirzadeh et al. |
| 6,843,970 B1 | 1/2005 | Hard |
| 6,893,474 B2 | 5/2005 | Jäfverström et al. |
| 7,090,809 B2 | 8/2006 | Harel et al. |
| 7,118,719 B2 | 10/2006 | Fugleberg |
| 7,182,931 B2 | 2/2007 | Turnbaugh, Jr. et al. |
| 7,220,394 B2 | 5/2007 | Sreeram et al. |
| 7,282,187 B1 | 10/2007 | Brown et al. |
| 7,294,319 B2 | 11/2007 | Lahtinen et al. |
| 7,381,690 B1 | 6/2008 | Ding et al. |
| 7,442,361 B1 | 10/2008 | Gloeckler et al. |
| 7,498,005 B2 | 3/2009 | Yadav |
| 7,651,676 B2 | 1/2010 | Beaulieu et al. |
| 7,781,365 B2 | 8/2010 | Okamoto |
| 7,837,961 B2 | 11/2010 | Boudreault et al. |
| 7,892,426 B2 | 2/2011 | Hayashi et al. |
| 7,906,097 B2 | 3/2011 | Beaulieu et al. |
| 8,038,969 B2 | 10/2011 | Kondo et al. |
| 8,147,795 B2 | 4/2012 | Dolling et al. |
| 8,216,532 B1 | 7/2012 | Vierheilig |
| 8,241,594 B2 | 8/2012 | Boudreault et al. |
| 8,287,826 B2 | 10/2012 | Pettey |
| 8,337,789 B2 | 12/2012 | Boudreault et al. |
| 8,568,671 B2 | 10/2013 | Guo et al. |
| 2002/0050230 A1 | 5/2002 | Meisen |
| 2002/0071802 A1 | 6/2002 | Fulton et al. |
| 2003/0075021 A1 | 4/2003 | Young et al. |
| 2003/0152502 A1 | 8/2003 | Lewis et al. |
| 2003/0183043 A1 | 10/2003 | Wai et al. |
| 2004/0042945 A1 | 3/2004 | Rao et al. |
| 2004/0062695 A1 | 4/2004 | Horwitz et al. |
| 2005/0166706 A1 | 8/2005 | Withers et al. |
| 2006/0018813 A1 | 1/2006 | Bray |
| 2006/0066998 A1 | 3/2006 | Ishiguro |
| 2007/0062669 A1 | 3/2007 | Song et al. |
| 2007/0278106 A1 | 12/2007 | Shaw |
| 2008/0047395 A1 | 2/2008 | Liu et al. |
| 2008/0069748 A1 | 3/2008 | Lien et al. |
| 2008/0115627 A1 | 5/2008 | Wang et al. |
| 2008/0286182 A1 | 11/2008 | Costa et al. |
| 2009/0241731 A1 | 10/2009 | Pereira et al. |
| 2009/0272230 A1 | 11/2009 | Mackowski et al. |
| 2010/0018347 A1 | 1/2010 | Holden et al. |
| 2010/0078382 A1 | 4/2010 | Naganawa et al. |
| 2010/0129277 A1 | 5/2010 | Kondo et al. |
| 2010/0150799 A1 | 6/2010 | Boudreault et al. |
| 2010/0160144 A1 | 6/2010 | Kim et al. |
| 2010/0260640 A1 | 10/2010 | Shindo et al. |
| 2010/0278720 A1 | 11/2010 | Wong et al. |
| 2010/0319491 A1 | 12/2010 | Sugahara et al. |
| 2010/0329970 A1 | 12/2010 | Lian et al. |
| 2011/0017020 A1 | 1/2011 | Homma et al. |
| 2011/0044869 A1 | 2/2011 | Boudreault et al. |
| 2011/0120267 A1 | 5/2011 | Roche |
| 2011/0182786 A1 | 7/2011 | Burba, III |
| 2012/0073407 A1 | 3/2012 | Drinkard, Jr. et al. |
| 2012/0237418 A1 | 9/2012 | Boudreault et al. |
| 2013/0052103 A1 | 2/2013 | Boudreault et al. |
| 2014/0341790 A1 | 11/2014 | Kasaini |
| 2014/0356262 A1 | 12/2014 | Ruth et al. |

FOREIGN PATENT DOCUMENTS

| | | |
|---|---|---|
| CA | 1136380 | 11/1982 |
| CA | 1176470 | 10/1984 |
| CA | 1224327 | 7/1987 |
| CA | 1226719 | 9/1987 |
| CA | 2027519 | 4/1991 |
| CA | 2027973 | 4/1991 |
| CA | 2029623 | 5/1991 |
| CA | 2036058 | 8/1991 |
| CA | 2097809 | 7/1992 |
| CA | 2137249 | 12/1993 |
| CA | 2122364 | 2/1994 |

(56) References Cited

FOREIGN PATENT DOCUMENTS

| | | |
|---|---|---|
| CA | 2156295 | 9/1994 |
| CA | 2160488 | 11/1994 |
| CA | 2193726 | 1/1996 |
| CA | 2159534 | 4/1996 |
| CA | 2167890 | 7/1996 |
| CA | 2240067 | 6/1997 |
| CA | 2251433 | 4/1999 |
| CA | 2360447 | 8/2000 |
| CA | 2306015 | 12/2000 |
| CA | 2309225 | 12/2000 |
| CA | 2377600 | 1/2001 |
| CA | 2317692 | 3/2001 |
| CA | 2391394 | 5/2001 |
| CA | 2400673 | 8/2001 |
| CA | 2429889 | 6/2002 |
| CA | 2431466 | 6/2002 |
| CA | 2433448 | 7/2002 |
| CA | 2189631 | 11/2002 |
| CA | 2454812 | 2/2003 |
| CA | 2468885 | 7/2003 |
| CA | 2471179 | 7/2003 |
| CA | 2484134 | 11/2003 |
| CA | 2467288 | 11/2004 |
| CA | 2548225 | 11/2004 |
| CA | 2385775 | 5/2005 |
| CA | 2556613 | 8/2005 |
| CA | 2572190 | 1/2006 |
| CA | 2597440 | 8/2006 |
| CA | 2521817 | 3/2007 |
| CA | 2624612 | 4/2007 |
| CA | 2629167 | 5/2007 |
| CA | 2639796 | 6/2007 |
| CA | 2636379 | 7/2007 |
| CA | 2641919 | 8/2007 |
| CA | 2538962 | 9/2007 |
| CA | 2608973 | 1/2008 |
| CA | 2610918 | 2/2008 |
| CA | 2659449 | 2/2008 |
| CA | 2684696 | 11/2008 |
| CA | 2685369 | 11/2008 |
| CA | 2711013 | 11/2008 |
| CA | 2697789 | 3/2009 |
| CA | 2725391 | 11/2009 |
| CA | 2678724 | 3/2010 |
| CA | 2745572 | 7/2010 |
| CA | 2747370 | 7/2010 |
| CA | 2667029 | 11/2010 |
| CA | 2667033 | 11/2010 |
| CA | 2678276 | 3/2011 |
| CA | 2773571 | 3/2011 |
| CA | 2788965 | 8/2011 |
| CA | 2797561 | 11/2011 |
| CA | 2834356 | 12/2012 |
| CA | 2884787 | 4/2013 |
| CA | 2860491 | 8/2013 |
| CN | 1099424 | 3/1995 |
| CN | 1923730 | 3/2007 |
| CN | 101773925 | 7/2010 |
| CN | 101792185 | 8/2010 |
| DE | 19903011 | 8/2000 |
| EP | 157503 | 10/1985 |
| EP | 0054976 | 7/1986 |
| EP | 0238185 | 9/1987 |
| EP | 0279672 | 8/1988 |
| EP | 0327234 | 8/1989 |
| EP | 0382383 | 8/1990 |
| EP | 0399786 | 11/1990 |
| EP | 508676 | 10/1992 |
| EP | 466338 | 12/1995 |
| EP | 0449942 | 4/1996 |
| EP | 0775753 | 5/1997 |
| EP | 0829454 | 3/1998 |
| EP | 0692035 | 4/1998 |
| EP | 0834584 | 4/1998 |
| EP | 999185 | 5/2000 |
| EP | 1496063 | 1/2005 |
| EP | 2241649 | 10/2010 |
| EP | 2298944 | 3/2011 |
| FR | 2319579 | 2/1977 |
| FR | 2600635 | 12/1987 |
| GB | 153500 | 11/1920 |
| GB | 159086 | 2/1921 |
| GB | 195295 | 3/1923 |
| GB | 230916 | 3/1925 |
| GB | 240834 | 5/1926 |
| GB | 241184 | 5/1926 |
| GB | 273999 | 7/1927 |
| GB | 409710 | 5/1934 |
| GB | 470305 | 8/1937 |
| GB | 480921 | 3/1938 |
| GB | 490099 | 8/1938 |
| GB | 574818 | 1/1946 |
| GB | 745601 | 2/1956 |
| GB | 798750 | 7/1958 |
| GB | 857245 | 12/1960 |
| GB | 858026 | 1/1961 |
| GB | 1021326 | 3/1966 |
| GB | 1056488 | 1/1967 |
| GB | 1307319 | 2/1973 |
| GB | 2013164 | 8/1979 |
| GB | 1552918 | 9/1979 |
| GB | 2018230 | 10/1979 |
| GB | 2238813 | 6/1991 |
| JP | 04354836 A * | 12/1992 |
| JP | 05287405 | 11/1993 |
| JP | 6056429 | 3/1994 |
| OA | 010034 | 10/1996 |
| WO | 8603521 | 6/1986 |
| WO | 9103424 | 3/1991 |
| WO | 9213637 | 8/1992 |
| WO | 9313017 | 7/1993 |
| WO | 9418122 | 8/1994 |
| WO | 9600698 | 1/1996 |
| WO | 9621619 | 7/1996 |
| WO | 9624555 | 8/1996 |
| WO | WO 9624555 A1 * | 8/1996 |
| WO | 9722554 | 6/1997 |
| WO | 0104366 | 1/2001 |
| WO | 2004056468 | 7/2004 |
| WO | 2004056471 | 7/2004 |
| WO | 2004101833 | 11/2004 |
| WO | 2005123591 | 12/2005 |
| WO | 2006084682 | 8/2006 |
| WO | 2007074207 | 7/2007 |
| WO | 2007079532 | 7/2007 |
| WO | 2008067594 | 6/2008 |
| WO | 2008104250 | 9/2008 |
| WO | 2008141423 | 11/2008 |
| WO | 2008154995 | 12/2008 |
| WO | 2009085514 | 7/2009 |
| WO | 2009153321 | 12/2009 |
| WO | 2010002059 | 1/2010 |
| WO | 2010009512 | 1/2010 |
| WO | 2010056742 | 5/2010 |
| WO | 2010079369 | 7/2010 |
| WO | 2010133284 | 11/2010 |
| WO | 2011094858 | 8/2011 |
| WO | 2011100820 | 8/2011 |
| WO | 2011100821 | 8/2011 |
| WO | 2011147867 | 12/2011 |
| WO | 2014029031 | 2/2012 |
| WO | 2012126092 | 9/2012 |
| WO | 2012145797 | 11/2012 |
| WO | 2012149642 | 11/2012 |
| WO | 2013037054 | 3/2013 |
| WO | 2013142957 | 10/2013 |
| WO | 2014094155 | 6/2014 |
| WO | 2014094157 | 6/2014 |
| WO | 2014124539 | 8/2014 |

OTHER PUBLICATIONS

An English translation of Zhang et al., "Research of the Controlling Steps of the Reaction of Kaolin and Hydrochloric Acid", Journal of Hefei University of Technology, vol. 21, No. 1, Feb. 1998, pp. 50-53.

(56) References Cited

OTHER PUBLICATIONS

An English translation of Zhang et al., "Kinetics Research on Alumina in Kaolinite Leached by Hydrochloric Acid", Journal of Hefei University of Technology, vol. 22, No. 2, Apr. 1999, pp. 33-36.
Certification of translation from Park IP Translations dated May 14, 2012.
An English Abstract of CN101450811 "Method for extracting alumina from coal gangue", published on Jun. 10, 2009.
An English Abstract of JP2001162108 "Method for Manufacturing Iron-Aluminum Combined Flocculant", published on Jun. 19, 2001.
English Translation of Abstract of CN101462757, "Preparation of nano Na-beat-alumina powder", Jun. 24, 2009.
An English Abstract of JP57145027 "Preparation of Granular Alumina", published on Sep. 7, 1982.
An English Abstract of CA1065068 "Method of Selectively Precipitating Metals From Solutions", published on Oct. 23, 1979.
English Translation of Abstract of CN101289705, "Process for abstracting vanadium from iron-smeltin waste slag of vanadium-containing iron ore", Jul. 14, 2010.
English Translation of Abstract of CN102220487, "Method for extracting vanadium and aluminum from vanadium-containing stone coal and clay vanadium ore", Oct. 19, 2011.
English Translation of Abstract of CN102241410, "Ecological and Comprehensive Utilization Method of Coal Ash", Nov. 16, 2011.
English Translation of Abstract of RU2363748, "Method of Producing Aluminium", Aug. 10, 2009.
English Translation of Abstract of ES2194586, "Separation procedure for contaminatory metals present in acid solutions involves liquid-liquid extraction with mixtures based on phosphonated dialkyl alkyl, trialkyl phosphates and acid phosphates", Mar. 1, 2005.
English Translation of Abstract of WO2009005115, "Composition for promotion of reduction in size of adipocyte", Jan. 8, 2009.
English Translation of Abstract of CN101434484, "Processes for producing alumina ceramic valve body and use thereof", May 20, 2009.
English Translation of Abstract of CN101045543, "Method for preparing sheet alumina using coal series kaolin rock or flyash as raw material", Oct. 3, 2007.
English Translation of Abstract of CN101249965, "Method for preparing ultra-fine white carbon black and nano alumina by using kaolinite as raw material", Aug. 27, 2008.
English Translation of Abstract of CN101045538, "Method for preparing modified silicon oxide using coal series kaolin rock or flyash", Oct. 3, 2007.
Tceisele, "Primary Metal Production", Dec. 3, 2007.
US EPA, "Alumina & Aluminum", Office of Resource Conservation and Recovery, Apr. 2, 2012.
Abstract of Dash et al., "Acid dissolution of alumina from waste aluminium dross", Hydrometallurgy, vol. 92, issues 1-2, May 2008, pp. 48-53.
Copson et al., "Extraction of Alumina from Clays by the Lime-sinter Modification of the Pedersen Process", New York Meeting, Feb. 1944, pp. 241-254.
Wei, X. et al., "Recovery of Iron and Aluminium from Acid Mine Drainage by selective precipitation", Environmental Engineering Science, vol. 22, No. 6, 2005, pp. 745-755.
Ajemba et al., "Application of the Shrinking Core Model to the Analysis of Alumina Leaching From UKPOR Clay Using Nitric Acid", International Journal of Engineering Research & Technology (IJERT), ISSN: 2278-0181, vol. 1 Issue 3, May 2012.
Zhou et al., "Extraction of Scandium from red mud by modified activated carbon and kinetics study", Rare Metals, vol. 27, No. 3, Jun. 2008, pp. 223-227.
Ouellet, Dissertation 9689, (Extraction de l'alumine de l'argile de la région de Murdochville, Québec, Canada), "Extraction of Alumina from Clay in the Murdochville region of Quebec", Canada—Universite Laval—Original French Version, Oct. 2004.
Ouellet, Dissertation 9689, (Extraction de l'alumine de l'argile de la région de Murdochville, Québec, Canada), "Extraction of Alumina from Clay in the Murdochville region of Quebec", Canada—Universite Laval—English Translation, Oct. 2004.
Translator Certification—Sep. 10, 2012.
English Abstract BE1019347, "Hydrometallurgical Reactor", published on Jun. 5, 2012.
Abstract Kao et al., "Solvent extraction of La(III) and Nd(III) from nitrate solutions with 2-ethylhexylphosphonic acid mono-2-ethylhexyl ester", Chemical Engineering Journal, vol. 119, Issues 2-3, Jun. 15, 2006, pp. 167-174.
English Abstract CN102690954, "Back extraction and removement method for aluminium", published on Sep. 26, 2012.
English Abstract CN101781719, "Method for recovering rare earth from oil shale waste slag", published on Jul. 21, 2010.
English Abstract CN102643985, "Method for extracting valuable metals from high-iron bauxite with step-by-step acid leaching", published on Aug. 22, 2012.
English Abstract CN102628105, "Method for comprehensively recycling and using baric waste slag in refined aluminum production process", published on Aug. 8, 2012.
English Abstract of WO 2007122720, published on Nov. 1, 2007.
English Abstract of WO 2004085719, published on Oct. 7, 2004.
English Abstract of SU 1 734 395, published on Oct. 27, 1996.
English Abstract of RU2416655, published on Apr. 20, 2011.
English Abstract of RU2008113385, published on Oct. 20, 2009.
English Abstract of RU2361941, published on Jul. 20, 2009.
English Abstract of RU2257348, published on Jul. 27, 2005.
English Abstract of RU2247788, published on Mar. 10, 2005.
English Abstract of RU2236375, published on Sep. 20, 2004.
English Abstract of RU2205242, published on May 27, 2003.
English Abstract of RU2201988, published on Apr. 10, 2003.
English Abstract of RU2196184, published on Jan. 10, 2003.
English Abstract of RU2189358, published on Sep. 20, 2002.
English Abstract of RU2176680, published on Dec. 10, 2001.
English Abstract of RU2162898, published on Feb. 10, 2001.
English Abstract of RU2162112, published on Jan. 20, 2001.
English Abstract of RU2158170, published on Oct. 27, 2000.
English Abstract of RU2147623, published on Apr. 20, 2000.
English Abstract of RU2147622, published on Apr. 20, 2000.
English Abstract of RU2140998, published on Nov. 10, 1999.
English Abstract of RU2119816, published on Oct. 10, 1998.
English Abstract of KR20070028987, published on Mar. 13, 2007.
English Abstract of JP9324227, published on Dec. 16, 1997.
English Abstract of JP9324192, published on Dec. 16, 1997.
English Abstract of JP9291320, published on Nov. 11, 1997.
English Abstract of JP9249672, published on Sep. 22, 1997.
English Abstract of JP9248463, published on Sep. 22, 1997.
English Abstract of JP9208222, published on Aug. 12, 1997.
English Abstract of JP9194211, published on Jul. 29, 1997.
English Abstract of JP9176756, published on Jul. 8, 1997.
English Abstract of JP9143589, published on Jun. 3, 1997.
English Abstract of JP8232026, published on Sep. 10, 1996.
English Abstract of JP5051208, published on Mar. 2, 1993.
English Abstract of JP4198017, published on Jul. 17, 1992.
English Abstract of JP4183832, published on Jun. 30, 1992.
English Abstract of JP4046660, published on Feb. 17, 1992.
English Abstract of JP3173725, published on Jul. 29, 1991.
English Abstract of JP2179835, published on Jul. 12, 1990.
English Abstract of JP2080530, published on Mar. 20, 1990.
English Abstract of JP2011116622, published on Jun. 16, 2011.
English Abstract of JP2011046588, published on Mar. 10, 2011.
English Abstract of JP2010270359, published on Dec. 2, 2010.
English Abstract of JP2008194684, published on Aug. 28, 2008.
English Abstract of JP2007327126, published on Dec. 20, 2007.
English Abstract of JP2007254822, published on Oct. 4, 2007.
English Abstract of JP2006348359, published on Dec. 28, 2006.
English Abstract of JP2006028187, published on Feb. 2, 2006.
English Abstract of JP2005139047, published on Jun. 2, 2005.
English Abstract of JP2000313928, published on Nov. 14, 2000.
English Abstract of JP10158629, published on Jun. 16, 1998.
English Abstract of JP10121164, published on May 12, 1998.
English Abstract of EP1817437, published on Aug. 15, 2007.
English Abstract of CN2292806, published on Sep. 30, 1998.
English Abstract of CN1986895, published on Jun. 27, 2007.

(56) References Cited

OTHER PUBLICATIONS

English Abstract of CN1796608, published on Jul. 5, 2006.
English Abstract of CN1699609, published on Nov. 23, 2005.
English Abstract of CN1410599, published on Apr. 16, 2003.
English Abstract of CN1397653, published on Feb. 19, 2003.
English Abstract of CN1192479, published on Sep. 9, 1998.
English Abstract of CN1478600, published on Mar. 3, 2004.
English Abstract of CN1140148, published on Jan. 15, 1997.
English Abstract of CN1127791, published on Jul. 31, 1996.
English Abstract of CN1131200, published on Sep. 18, 1996.
English Abstract of CN1061246, published on May 20, 1992.
English Abstract of CN1043752, published on Jul. 11, 1990.
English Abstract of CN102153128, published on Aug. 17, 2011.
English Abstract of CN102139943, published on Aug. 3, 2011.
English Abstract of CN102127641, published on Jul. 20, 2011.
English Abstract of CN102071317, published on May 25, 2011.
English Abstract of CN102071315, published on May 25, 2011.
English Abstract of CN102061392, published on May 18, 2011.
English Abstract of CN102030355, published on Apr. 27, 2011.
English Abstract of CN102021343, published on Apr. 20, 2011.
English Abstract of CN102011010, published on Apr. 13, 2011.
English Abstract of CN101824555, published on Sep. 8, 2010.
English Abstract of CN1045812, published on Oct. 3, 1990.
English Abstract of CN101407879, published on Apr. 15, 2009.
English Abstract of CN101307384, published on Nov. 19, 2008.
English Abstract of CN101161834, published on Apr. 16, 2008.
English Abstract of CN1844421, published on Oct. 11, 2006.
English Abstract of CN101182601, published on May 21, 2008.
English Abstract of CN1043752C, published on Jun. 23, 1999.
English Abstract of CN87101034, published on Aug. 28, 1991.
English Abstract of RU2079431, published on May 20, 1997.
English Abstract of RU2063458, published on Jul. 10, 1996.
English Abstract of RU 2 048 565, published on Nov. 20, 1995.
English Abstract of RU 2 040 587, published on Jul. 25, 1995.
English Abstract of RU 2 034 074, published on Apr. 30, 1995.
English Abstract of RU 2 031 168, published on Mar. 20, 1995.
English Abstract of RU 2 020 175, published on Sep. 30, 1994.
English Abstract of RU 2 010 876, published on Apr. 15, 1994.
English Abstract of RU 2 094 374, published on Oct. 27, 1997.
English Abstract of RU 2 081 831, published on Jun. 20, 1997.
English Abstract of RU 2 070 596, published on Dec. 20, 1996.
English Abstract of AU2008286599A1, "A process of smelting monazite rare earth ore rich in Fe", published on Feb. 19, 2009.
English Abstract of KR820001546, "Production of Titanium Metal Valves", published on Aug. 31, 1982.
English Abstract of KR100927466, published on Nov. 19, 2009.
English Abstract of RU 2 069 180, published on Nov. 20, 1996.
English Abstract of RU 2 068 392, published on Oct. 27, 1996.
English Abstract of RU 2 062 810, published on Jun. 27, 1996.
English Abstract of RU 2 055 828, published on Mar. 10, 1996.
English Abstract of RU 2 049 728, published on Dec. 10, 1995.
English Abstract of RU 1 704 483, published on Oct. 27, 1996.
English Abstract of SU1567518, published on May 30, 1990.
English Abstract of SU1424174, published on Jul. 23, 1991.
English Abstract of RU2038309, published on Jun. 27, 1995.
English Abstract of HU51574, published on May 28, 1990.
English Abstract of JP2008253142, published on Oct. 23, 2008.
English Abstract of JP2005152756, published on Jun. 16, 2005.
English Abstract of JP2005082462, published on Mar. 31, 2005.
English Abstract of JP2005219938, published on Aug. 18, 2005.
English Abstract of JP2004036003, published on Feb. 5, 2004.
English Abstract of W02011092292, published on Aug. 4, 2011.
English Abstract of CN101157453, published on Apr. 9, 2008.
English Abstract of AU2737892, published on May 13, 1993.
English Abstract of JPH09249420, published on Sep. 22, 1997.
English Abstract of CN102515590, published on Jun. 27, 2012.
English Abstract of CN102502745, published on Jun. 20, 2012.
English Abstract of WO2007082447, published on Jul. 26, 2007.
English Abstract of CN102694218, published on Sep. 26, 2012.
English Abstract of RU2183225, published on Jun. 10, 2002.
English Abstract of JP2009249674, published on Oct. 29, 2009.
English Abstract of CN102719674, published on Oct. 10, 2012.
English Abstract of 102680423, published on Sep. 19, 2012.
English Abstract of JP2005112636, published on Apr. 28, 2005.
English Abstract of CN101285127, published on Oct. 15, 2008.
Australie Minerals & Mining Group LTD, "AMMG Updates Process Design for HPA Chemical Project", Oct. 3, 2014, pp. 1-4.
English Abstract of CN1044126(C), "Stretched polypropylene film", published on Jul. 14, 1999.
English Translation of CN102452677, published on May 16, 2012.
English Abstract of CN101781719, "Method for recovering rare earth from oil shale waste slag", published on Jul. 21, 2010.
Yatsenko et al., "Red Mud Pulp Carbonization with Scandium Extraction during alumina Production", ISSN 0040-5795, Theoretical Foundations of Chemical Engineering, Jan. 2010, vol. 44, No. 4, pp. 563-568.
Wang et al., "Recovery of scandium from synthetic red mud leach solutions by solvent extraction with D2EHPA", Separation and Purification Technology (Feb. 2013), pp. 1-14.
Andritz Metals, "Regeneration Systems for Hydrochloric Waste Pickling Solutions", Aug. 2011.
Aluminium for Future Generations, "Bauxite Residual Management", http://bauxite.world-aluminium.org/refining/bauxite-residue-management.html, Jan. 2012.
Vedanta Aluminium Limited, Lanjigarh, "Red Mud Filtration and Recovery of Valuable Metals", Aug. 2011, http://marvels.engineeringwatch.in/eea025/.
Adham et al., "Fluid Bed Dehydration of Magnesium Chloride", Magnesium Technology 2012, TMS (The Minerals, Metals & Materials Society), Jan. 2012, pp. 49-53.
Dutrizac et al., "Fundamentals of Serpentine Leaching in Hydrochloric Acid Media", Magnesium Technology 2000, The Minerals, Metals & Materials Society, Jan. 2000, pp. 41-51.
Kumar et al., "Refining of a low-grade molybdenite concentrate", Hydrometallurgy 86 (Jan. 2007) 56-62.
Wang et al., "Metallurgical processes for scandium recovery from various resources: A review", Hydrometallurgy 108 (Mar. 2011) 100-108.
Hudson et al., "Direct Calcination of AlCl3 •6H2O with Off-Gas use for Crystallization", United States Department of the Interior Bureau of Mines, Contract No. J0188096, Jan. 1979, pp. 1-28.
Elsner et al., "Alumina via hydrochloric acid leaching of high silica bauxites—Process Development", Jan. 1984, pp. 411-429.
Maysilles et al., "Aluminum Chloride Hexahydrate Crystallization by HCl Gas Sparging", U.S. Dept. of the Interior, Bureau of Mines, Jan. 1981, pp. 1-38.
Brand et al., "Formation of α-Al2O3 by thermal decomposition of basic aluminum chlorides at low temperatures", Crystal Research and Technology Jan. 1989 (24) 671-675.
Park et al., "Manufacture of low-soda alumina from clay", Industrial and Engineering Chemistry Jan. 1996 (35) 4379-4385.
Yanagida et al., "The role of water vapor in formation of alpha alumina from transient alumina" Journal of Ceramic Association Japan Jan. 1966 (74) 371-77.
Pijolat et al., "Influence of additives and water vapor on the transformation of transition aluminas into alpha alumina", Thermochimica Acta Dec. 1987 (122) 71-77.
Bagwell et al., "Effect of seeding and water vapor on the nucleation and growth of α-Al2O3 from γ-Al2O3", Journal of the American Ceramic Society Jan. 1999 (82) 825-832.
Hrabe et al., "The influence of water vapor on thermal transformations of boehmite", Journal of Material Research Jan. 1992 (7) 444-449.
English Abstract of Petzold et al., "Thermoanalytical studies on the decomposition of aluminum chloride hexahydrate", Journal of thermal analysis Jan. 1981 (20) 71-86.
Fang et al., "Recovery of gallium from coal fly ash", Hydrometallurgy 41 (Jan. 1996) 187-200.
Gutiérrez et al., "Recovery of gallium from coal fly ash by a dual reactive extraction process", Waste Management & Research (Jan. 1997) 16, 371-382.

(56) References Cited

OTHER PUBLICATIONS

Gunnar et al., Abstract of "Extraction of iron compounds from wood from the Vasa", Department of Chemistry, Swedish University of Agricultural Sciences, vol. 60, No. 6, pp. 678-684, Jan. 2006.

Elmolla et al., "Effect of Photo-Fenton Operating Conditions on the Performance of Photo-Fenton-SBR Process for Recalcitrant Wastewater Treatment", Journal of Applied Sciences 10 (24): 3236-3242, Jun. 2010.

Cohen et al., "Precipitation of iron from concentrated chloride solutions: Literature observations, challenges and preliminary experimental results", Minerals Engineering 18 (Sep. 16, 2005), pp. 1344-1347.

Cablik, "Characterization and applications of red mud from bauxite processing", VSB—Technical University of Ostrava, Faculty of Mining and Geology, pp. 27-37, Jan. 2007.

Wahab et al., "Alumina Recovery From Iraqi Kaolinitic Clay by Hydrochloric Acid Route", Iraqi Bulletin of Geology and Mining, vol. 2, No. 1, Jan. 2006, pp. 67-76.

Khan et al., "Production of Aluminum Sulphate from Indigenous Bauxite without Precalcination of the Ore", Jour. Chem Soc. Pak., vol. 17, No. 4, pp. 213-216, Apr. 1995.

Sahoo et al., "Characterization of γ- and α-Fe2O3 nano powders synthesized by emulsion precipitation-calcination route and rheological behavior of α-Fe2O3", International Journal of Engineering, Science and Technology, vol. 2, No. 8, pp. 118-126, Jan. 2010.

Bharathi et al., "Highly mesoporous α-Fe2O3 nanostructures: preparation, characterization and improved photocatalytic performance towards Rhodamine B (RhB)", J. Phys. D: Appl. Phys. 43 015501, pp. 1-9, Jan. 2010.

"Industrial Inorganic Pigments", Wiley—VCH Verlag GmbH and Co. KgaA, pp. 105-112, Jan. 1993.

Andrieux et al., Abstract of: "Hydrothermal synthesis of dioctahedral smectites: The Al-Fe3+ chemical series: Part I: Influence of experimental conditions", Universite de Poitiers, Nov. 2009.

Bazin et al., "Alumina from clays", Department of Mining, Metallurgical and Materials Engineering; Alcan International Limitee; Groupe Conseil PROCD Inc.; Conseil de Developpement economique de Murdochville, pp. 24-38, Jan. 2005.

Aleksandrovich, "The receipt of alumina from clay materials", May 2011.

Al-Zahrani et al., "Extraction of Alumina from Local Clays by Hydrochloric Acid Process", JKAU: Eng. Sci., vol. 20, No. 2, pp. 29-41, Jan. 2009.

Dutrizac et al., "The Precipitation of Hematite from Ferric Chloride Media at Atmospheric Pressure", Mining and Mineral Sciences Laboratories, vol. 30B, Dec. 12, 1999, pp. 993-1001.

Riveros et al., "The precipitation of hematite from ferric chloride media", Mining and Mineral Sciences Laboratories, Hydrometallurgy 46 (Jan. 1997), pp. 85-104.

Smirnov, V., "Alumina production in Russia Part I: Historical background", Journal of Materials, vol. 48, Issue 8, Jan. 1996, pp. 24-26.

Wang et al., "A novel recovery process of metal values from the cathode active materials of the lithium-ion secondary batteries", Hydrometallurgy 99 (Aug. 2009) 194-201.

Becze et al., "Precipitation of Hematite and Recovery of Hydrochloric Acid from Concentrated Chloride Solutions by a Novel Hydrolytic Decomposition Process", TMS (The Minerals & Materials Society, Jan. 2001.

Demopoulos et al., "New Technologies for HCl Regeneration in Chloride Hydrometallurgy", World of Metallurgy—ERZMETALL 61 (Jan. 2008) No. 2.

English Abstract of CN103964480(A), "Process for Producing Aluminum Oxide by Using Hydrochloric Acid Method", published on Aug. 6, 2014.

English Abstract of CN203922759(U), "Device for Preparing Aluminum Oxide by Roasting Aluminum Chloride Hexahydrate Crystal through Rotary Kiln", published on Nov. 5, 2014.

English Abstract of EP0850881(A1), "Process and Apparatus for the Preparation of Iron Oxides from Solutions Containing Hydrochloric Acid Iron Oxide Chloride", published on Jul. 1, 1998.

English Abstract of JPH0543252A, "Method for Removing Halogen Radical in Ferric Oxide", published on Feb. 23, 1993.

English Abstract of JPH0656429(A), "Production of Plate-Like Iron Oxide Particulate Powder", published on Mar. 1, 1994.

English Abstract of WO2008070885(A2), "Method for Increasing the Specific Surface of Iron Oxides in Spray Roasting Plants", published on Jun. 19, 2008.

Englist Abstract of CN1099424A, "Method for Treating Blast Furnace Slag with Diluted Chlorhydric Acid", published on Mar. 1, 1995.

Weissenbaeck et al., "Development of Chloride Based Metal Extraction Techniques", Paper presented at ALTA May 28, 2013, Perth, WA.

Hoffman et al., "Development of a hydrochloric acid process for the production of alumina from clay", Journal of research of the national bureau of standards Dec. 1946 (37) 409-428.

Marchessaux et al., "Thermal decomposition of aluminum hexahydrate chloride (AlCl3 × 6H2 O) for alumina production", Light metals Jan. 1979 (1) 189-204.

Miller et al., "Fluidized-bed decomposition of aluminum chloride hexahydrate", Light Metals: Proceedings of Sessions, AIME Annual Meeting (Warrendale, Pennsylvania), Jan. 1983 253-271.

Shanks et al., "Options in the HCl process for the production of alumina from clay", Light Metals Jan. 1986, R.E. Miller, Editor, p. 1089.

Bengston et al., "Alumina process feasibility study and preliminary pilot plant design. Task 3 report: preliminary design of 25 ton per day pilot plant.", vol. 1, Process Technology and Costs. Bureau of Mines Open File Report PB81-125031, Nov. 1979.

Liu et al., "High Purity Alumina Powders Extracted from Aluminum Dross by the Calcining-Leaching Process", TMS (The Minerals, Metals & Materials Society), Jan. 2011, pp. 197-200.

Perander et al., "The Nature and Impacts of Fines in S melter-Grade Alumina." Journal of the Minerals, Metals, & Materials Society 61.11 (Nov. 2009).

Chi et al. Derwent Acc-No. 2010-L68306 for the patent family including CN 101811712A published Aug. 25, 2010. Abstract.

* cited by examiner

PROCESSES FOR PREPARING TITANIUM OXIDE AND VARIOUS OTHER PRODUCTS

CROSS-REFERENCE TO RELATED APPLICATIONS

The present application is a 35 USC 371 national stage entry of PCT/CA2013/000638 filed on Jul. 12, 2013 and which claims priority on U.S. 61/670,645 filed on Jul. 12, 2012; on PCT/CA2012/000871 filed on Sep. 17, 2012; on U.S. 61/726,971 filed on Nov. 15, 2012; and on PCT/CA2013/000021 filed on Jan. 10, 2013. These documents are hereby incorporated by reference in their entirety.

TECHNICAL FIELD

The present disclosure relates to improvements in the field of chemistry applied to the production of alumina and/or titanium oxide. For example, it relates to processes for the production of alumina via the extraction of aluminum from aluminum-containing materials and production of titanium oxide via the extraction of titanium from titanium-containing materials. These processes can also be efficient for preparing other products such as hematite, MgO, silica and oxides of various metals, titanium chloride as well as rare earths and aluminum.

BACKGROUND OF THE DISCLOSURE

There have been several known processes for the production of alumina. Many of them were using bauxite as starting material. These processes, that were mainly alkaline processes, have been employed throughout the years. Several of such alkaline processes have the disadvantage of being inefficient to segregate and extract value added secondary products, thus leaving an important environmental impact. There have also been development work employing hydrochloric acid for the leaching step but, it has been found that such processes were not efficient for removing most part of the impurities and especially iron. Removal of iron was also difficult to be carried out via adequate and economical techniques especially when using continuous processes.

There have also been several processes proposed for preparing titanium oxide but there is still room for improvement.

SUMMARY OF THE DISCLOSURE

According to one aspect, there is provided a process for preparing various products, the process comprising:
  leaching a titanium-containing material comprising Ti, Si and a first metal with HCl so as to obtain a leachate comprising ions of the first metal and a solid comprising titanium, and separating the solid from the leachate;
  reacting the leachate with HCl so as to obtain a liquid and a precipitate comprising a chloride of the first metal, and separating the precipitate from the liquid;
  heating the precipitate under conditions effective for converting the chloride of the first metal into an oxide of the first metal; and
  treating the solid so as to substantially separate Si from Ti that are contained therein.

According to another aspect, there is provided a process for preparing alumina, the process comprising:
  leaching an aluminum-containing material with HCl so as to obtain a leachate comprising aluminum ions and a solid, and separating the solid from the leachate;
  reacting the leachate with HCl so as to obtain a liquid and a precipitate comprising the aluminum ions in the form of $AlCl_3$, and separating the precipitate from the liquid;
  heating the precipitate under conditions effective for converting $AlCl_3$ into $Al_2O_3$ and optionally recovering gaseous HCl so-produced; and
  leaching the solid with HCl optionally in the presence of a chloride so as to obtain a leachate comprising titanium ions.

According to another aspect, there is provided a process for preparing aluminum, the process comprising:
  leaching an aluminum-containing material with HCl so as to obtain a leachate comprising aluminum ions and a solid, and separating the solid from the leachate;
  reacting the leachate with HCl so as to obtain a liquid and a precipitate comprising the aluminum ions in the form of $AlCl_3$, and separating the precipitate from the liquid;
  heating the precipitate under conditions effective for converting $AlCl_3$ into $Al_2O_3$ and optionally recovering gaseous HCl so-produced;
  converting the $Al_2O_3$ into alumina; and
  leaching the solid with HCl optionally in the presence of a chloride so as to obtain a leachate comprising titanium ions.

According to another aspect, there is provided a process for preparing alumina and optionally other products, the process comprising:
  leaching an aluminum-containing material with HCl so as to obtain a leachate comprising aluminum ions and a solid, and separating the solid from the leachate;
  reacting the leachate with HCl so as to obtain a liquid and a precipitate comprising the aluminum ions in the form of $AlCl_3$, and separating the precipitate from the liquid;
  heating the precipitate under conditions effective for converting $AlCl_3$ into $Al_2O_3$ and recovering gaseous HCl so-produced;
  recycling the gaseous HCl so-produced by contacting it with water so as to obtain a composition having a concentration higher that HCl azeotrope concentration (20.2 weight %) and reacting the composition with a further quantity of aluminum-containing material so as to leaching it; and
  leaching the solid with HCl optionally in the presence of a chloride so as to obtain a leachate comprising titanium ions.

According to another aspect, there is provided a process for preparing alumina and optionally other products, the process comprising:
  leaching an aluminum-containing material with HCl so as to obtain a leachate comprising aluminum ions and a solid, and separating the solid from the leachate;
  reacting the leachate with HCl so as to obtain a liquid and a precipitate comprising the aluminum ions in the form of $AlCl_3$, and separating the precipitate from the liquid;
  heating the precipitate under conditions effective for converting $AlCl_3$ into $Al_2O_3$ and recovering gaseous HCl so-produced;
  recycling the gaseous HCl so-produced by contacting it with water so as to obtain a composition having a concentration of about 25 to about 45 weight % and reacting the composition with a further quantity of aluminum-containing material so as to leaching it; and
  leaching the solid with HCl optionally in the presence of a chloride so as to obtain a leachate comprising titanium ions.

According to another aspect, there is provided a process for preparing titanium chloride, the process comprising:
- leaching a titanium-containing material with HCl so as to obtain a leachate comprising ions from at least one metal and a solid, and separating the solid from the leachate;
- at least substantially isolating the ions of the at least one metal from the leachate; and
- leaching the solid with HCl optionally in the presence of a chloride so as to obtain a leachate comprising titanium chloride.

According to another aspect, there is provided a process for preparing titanium oxide, the process comprising:
- leaching a titanium-containing material with HCl so as to obtain a leachate comprising ions from at least one metal and a solid, and separating the solid from the leachate;
- at least substantially isolating the ions of the at least one metal from the leachate;
- leaching the solid with HCl optionally in the presence of a chloride so as to obtain a leachate comprising titanium chloride; and
- converting the titanium chloride into titanium oxide.

According to another example, there is provided a process for preparing titanium oxide, the process comprising:
- leaching a titanium-containing material with HCl so as to obtain a first leachate comprising ions from at least one metal and a solid, and separating the solid from the first leachate;
- at least substantially isolating the ions of the at least one metal from the first leachate;
- leaching the solid with HCl optionally in the presence of a chloride so as to obtain a second leachate comprising titanium chloride; or reacting the solid with $Cl_2$ and a carbon source so as to obtain a liquid portion comprising the titanium chloride and a solid portion, and separating the liquid portion form the solid portion; and
- converting the titanium chloride into titanium oxide.

According to another example, there is provided a process for preparing titanium oxide, the process comprising:
- leaching a titanium-containing material with HCl so as to obtain a first leachate comprising ions from at least one metal and a solid, and separating the solid from the first leachate;
- at least substantially isolating the ions of the at least one metal from the first leachate;
- leaching the solid with HCl optionally in the presence of a chloride so as to obtain a second leachate comprising titanium chloride; and
- converting the titanium chloride into titanium oxide.

According to another example, there is provided a process for preparing titanium oxide, the process comprising:
- leaching a titanium-containing material with HCl so as to obtain a first leachate comprising ions from at least one metal and a solid, and separating the solid from the first leachate;
- at least substantially isolating the ions of the at least one metal from the first leachate;
- reacting the solid with $Cl_2$ so as to obtain a liquid portion comprising the titanium chloride and a solid portion, and separating the liquid portion form the solid portion; and
- converting the titanium chloride into titanium oxide.

According to another example, there is provided a process for preparing titanium chloride, the process comprising:
- leaching a titanium-containing material with HCl so as to obtain a first leachate comprising ions from at least one metal and a solid, and separating the solid from the first leachate;
- at least substantially isolating the ions of the at least one metal from the leachate; and
- leaching the solid with HCl optionally in the presence of a chloride so as to obtain a second leachate comprising titanium chloride.

According to another example, there is provided a process for preparing titanium chloride, the process comprising:
- leaching a titanium-containing material with HCl so as to obtain a first leachate comprising ions from at least one metal and a solid, and separating the solid from the leachate;
- at least substantially isolating the ions of the at least one metal from the first leachate; and
- reacting the solid with $Cl_2$ so as to obtain a liquid portion comprising the titanium chloride and a solid portion, and separating the liquid portion form the solid portion.

According to another example, there is provided a process for preparing various products, the process comprising:
- leaching a titanium-containing material comprising Ti and a first metal with HCl so as to obtain a leachate comprising ions of the first metal and a solid comprising titanium, and separating the solid from the leachate;
- substantially selectively recovering the first metal from the leachate; and
- treating the solid so as at least partially recover Ti.

According to another example, there is provided a process for preparing various products, the process comprising:
- leaching a titanium-containing material comprising Ti and Al with HCl so as to obtain a leachate comprising ions of Al and a solid comprising titanium, and separating the solid from the leachate;
- substantially selectively recovering the Al from the leachate; and
- treating the solid so as at least partially recover Ti.

According to another example, there is provided a process for preparing various products, the process comprising:
- leaching a titanium-containing material comprising Ti and Fe with HCl so as to obtain a leachate comprising ions of Fe and a solid comprising titanium, and separating the solid from the leachate;
- substantially selectively recovering the Fe from the leachate; and
- treating the solid so as at least partially recover Ti.

According to another example, there is provided a process for preparing titanium oxide, the process comprising:
- leaching a titanium-containing material with HCl so as to obtain a first leachate comprising Al ions and a solid, and separating the solid from the first leachate;
- at least substantially isolating the Al ions from the first leachate;
- leaching the solid with HCl optionally in the presence of a chloride so as to obtain a second leachate comprising titanium chloride; or reacting the solid with $Cl_2$ so as to obtain a liquid portion comprising the titanium chloride and a solid portion, and separating the liquid portion form the solid portion; and
- converting the titanium chloride into titanium oxide.

According to another example, there is provided a process for preparing titanium oxide, the process comprising:
- leaching a titanium-containing material with HCl so as to obtain a first leachate comprising Al ions and a solid, and separating the solid from the first leachate;
- at least substantially isolating the Al ions from the first leachate;
- leaching the solid with HCl optionally in the presence of a chloride so as to obtain a second leachate comprising titanium chloride; and converting the titanium chloride into titanium oxide.

According to another example, there is provided a process for preparing titanium oxide, the process comprising:
- leaching a titanium-containing material with HCl so as to obtain a first leachate comprising Fe ions and a solid, and separating the solid from the first leachate;
- at least substantially isolating the Fe ions from the first leachate;
- leaching the solid with HCl optionally in the presence of a chloride so as to obtain a second leachate comprising titanium chloride; or reacting the solid with $Cl_2$ so as to obtain a liquid portion comprising the titanium chloride and a solid portion, and separating the liquid portion form the solid portion; and
- converting the titanium chloride into titanium oxide.

According to another example, there is provided a process for preparing titanium oxide, the process comprising:
- leaching a titanium-containing material with HCl so as to obtain a first leachate comprising Al ions and a solid, and separating the solid from the first leachate;
- at least substantially isolating the Al ions from the first leachate;
- leaching the solid with HCl optionally in the presence of a chloride so as to obtain a second leachate comprising titanium chloride; and
- converting the titanium chloride into titanium oxide.

According to another example, there is provided a process for preparing titanium oxide, the process comprising:
- leaching a titanium-containing material with HCl so as to obtain a first leachate comprising Fe ions and a solid, and separating the solid from the first leachate;
- at least substantially isolating the Fe ions from the first leachate;
- leaching the solid with HCl optionally in the presence of a chloride so as to obtain a second leachate comprising titanium chloride; and
- converting the titanium chloride into titanium oxide.

According to another example, there is provided a process for preparing titanium chloride, the process comprising:
- leaching a titanium-containing material with HCl so as to obtain a first leachate comprising ions from at least one metal and a solid, and separating the solid from the first leachate;
- at least substantially isolating the ions of the at least one metal from the leachate; and
- leaching the solid with HCl optionally in the presence of a chloride so as to obtain a second leachate comprising titanium chloride.

According to another example, there is provided a process for preparing titanium chloride, the process comprising:
- leaching a titanium-containing material with HCl so as to obtain a first leachate comprising ions from at least one metal and a solid, and separating the solid from the leachate;
- at least substantially isolating the ions of the at least one metal from the first leachate; and
- reacting the solid with $Cl_2$ so as to obtain a liquid portion comprising the titanium chloride and a solid portion, and separating the liquid portion form the solid portion.

According to another aspect, there is provided a process for preparing alumina and optionally other products, the process comprising:
- leaching an aluminum-containing material with HCl so as to obtain a leachate comprising aluminum ions and a solid, and separating the solid from the leachate;
- reacting the leachate with HCl so as to obtain a liquid and a precipitate comprising the aluminum ions in the form of $AlCl_3$, and separating the precipitate from the liquid;
- heating the precipitate under conditions effective for converting $AlCl_3$ into $Al_2O_3$ and recovering gaseous HCl so-produced; and
- recycling the gaseous HCl so-produced by contacting it with water so as to obtain a composition having a concentration higher that HCl azeotrope concentration (20.2 weight %) and reacting the composition with a further quantity of aluminum-containing material so as to leaching it.

According to another aspect, there is provided a process for preparing alumina and optionally other products, the process comprising:
- leaching an aluminum-containing material with HCl so as to obtain a leachate comprising aluminum ions and a solid, and separating the solid from the leachate;
- reacting the leachate with HCl so as to obtain a liquid and a precipitate comprising the aluminum ions in the form of $AlCl_3$, and separating the precipitate from the liquid;
- heating the precipitate under conditions effective for converting $AlCl_3$ into $Al_2O_3$ and recovering gaseous HCl so-produced; and
- recycling the gaseous HCl so-produced by contacting it with water so as to obtain a composition having a concentration of about 25 to about 45 weight % and reacting the composition with a further quantity of aluminum-containing material so as to leaching it.

According to another aspect, there is provided a process for preparing alumina and optionally other products, the process comprising:
- leaching an aluminum-containing material with HCl so as to obtain a leachate comprising aluminum ions and a solid, and separating the solid from the leachate;
- reacting the leachate with HCl so as to obtain a liquid and a precipitate comprising the aluminum ions in the form of $AlCl_3$, and separating the precipitate from the liquid;
- heating the precipitate under conditions effective for converting $AlCl_3$ into $Al_2O_3$ and recovering gaseous HCl so-produced; and
- recycling the gaseous HCl so-produced by contacting it with water so as to obtain a composition having a concentration of about 25 to about 45 weight % and using the composition for leaching the aluminum-containing material.

According to another aspect, there is provided a process for preparing alumina and optionally other products, the process comprising:
- leaching an aluminum-containing material with HCl so as to obtain a leachate comprising aluminum ions and a solid, and separating the solid from the leachate;
- reacting the leachate with HCl so as to obtain a liquid and a precipitate comprising the aluminum ions in the form of $AlCl_3$, and separating the precipitate from the liquid;
- heating the precipitate under conditions effective for converting $AlCl_3$ into $Al_2O_3$ and recovering gaseous HCl so-produced; and
- recycling the gaseous HCl so-produced by contacting it with the leachate so as to precipitate the aluminum ions in the form of $AlCl_3.6H_2O$.

According to another aspect, there is provided a process for preparing alumina and optionally other products, the process comprising:
- leaching an aluminum-containing material with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid; and heating the precipitate under conditions effective for converting $AlCl_3$ into $Al_2O_3$.

According to another aspect, there is provided a process for preparing alumina and optionally other products, the process comprising:

leaching an aluminum-containing material with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid; and heating the precipitate under conditions effective for converting $AlCl_3$ into $Al_2O_3$ and optionally recovering gaseous HCl so-produced.

According to one aspect, there is provided a process for preparing aluminum and optionally other products, the process comprising:

leaching an aluminum-containing material with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid;

heating the precipitate under conditions effective for converting $AlCl_3$ into $Al_2O_3$; and converting $Al_2O_3$ into aluminum.

According to another aspect, there is provided a process for preparing aluminum and optionally other products, the process comprising:

leaching an aluminum-containing material with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid;

heating the precipitate under conditions effective for converting $AlCl_3$ into $Al_2O_3$ and optionally recovering gaseous HCl so-produced; and converting $Al_2O_3$ into aluminum.

BRIEF DESCRIPTION OF DRAWINGS

In the following drawings, which represent by way of example only, various embodiments of the disclosure.

DETAILED DESCRIPTION OF VARIOUS EMBODIMENTS

Figure 1:
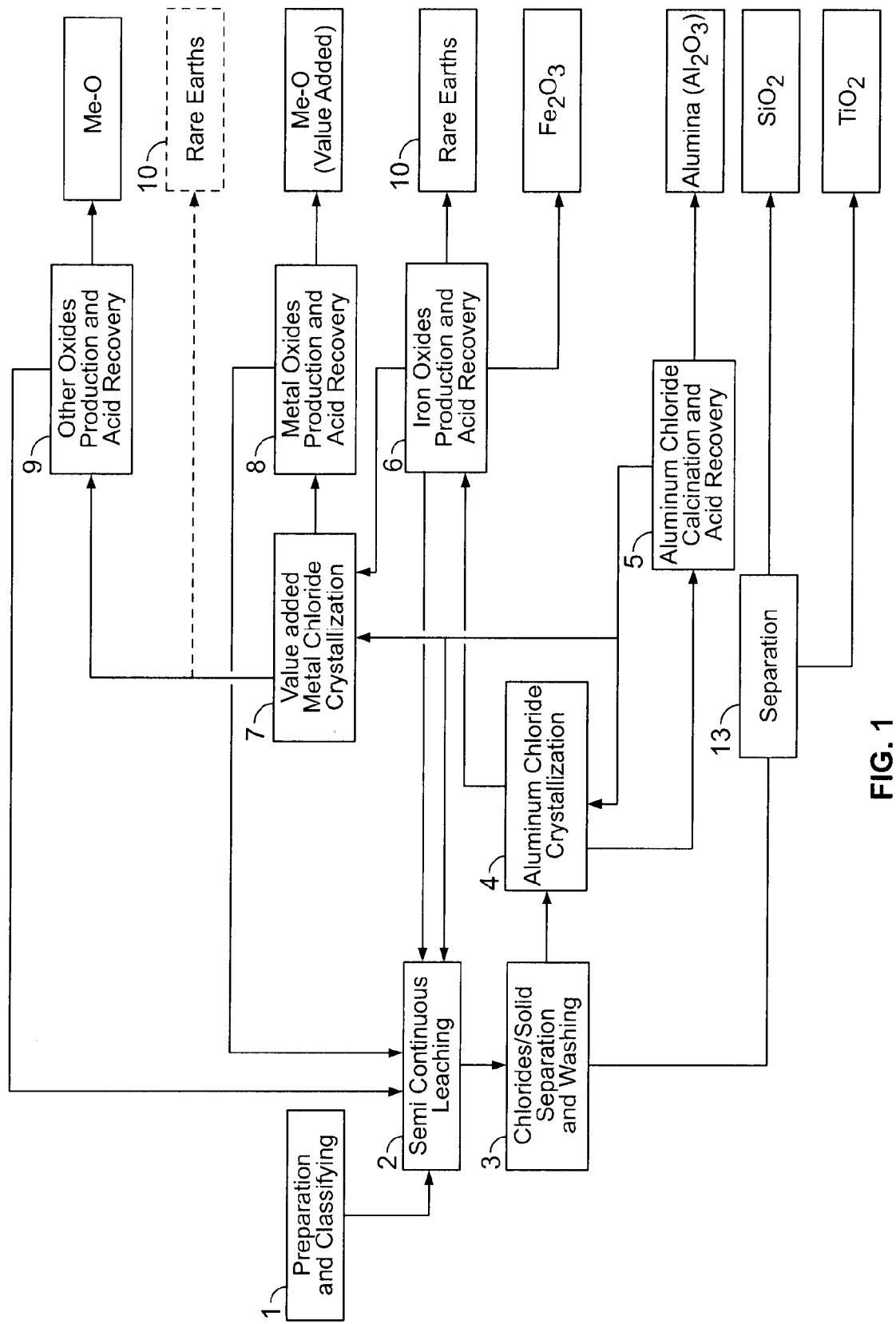
FIG. 1 shows a bloc diagram of an example of process for preparing alumina and various other products according to the present disclosure.

The following non-limiting examples further illustrate the technology described in the present disclosure.

In the processes of the present disclosure, the material can be, for example, a titanium-containing material.

In the processes of the present disclosure, the material can be, for example, an aluminum-containing material.

In the processes of the present disclosure, the material can be, for example, an iron-containing material.

The aluminum-containing material can be for example chosen from aluminum-bearing ores (such as clays, argillite, mudstone, beryl, cryolite, garnet, spinel, bauxite, or mixtures thereof can be used). The aluminum-containing material can also be a recycled industrial aluminum-containing material such as slag, red mud or fly ashes.

The titanium-containing material can be for example chosen from a titanium-bearing ores (such as ilmenite, rutile, anatase, brookite, perovskite, sphene, ecandrewsite, geikielite, pyrophanite or titanomagnetite or mixtures thereof can be used). The titanium-containing material can also be a recycled industrial titanium-containing material such as slag red mud or fly ashes.

For example, the material can be chosen from industrial refractory materials.

For example, the material chosen from aluminosilicate minerals.

The expression "red mud" as used herein refers to an industrial waste product generated during the production of alumina. For example, such a waste product can contain silica, aluminum, iron, calcium, titanium. It can also contains an array of minor constituents such as Na, K, Cr, V, Ni, Ba, Cu, Mn, Pb, Zn etc. For example, red mud can comprises about 15 to about 80% by weight of $Fe_2O_3$, about 1 to about 35% by weight $Al_2O_3$, about 1 to about 65% by weight of $SiO_2$, about 1 to about 20% by weight of $Na_2O$, about 1 to about 20% by weight of CaO, and up to about 35% by weight of $TiO_2$. According to another example, red mud can comprise about 30 to about 65% by weight of $Fe_2O_3$, about 10 to about 20% by weight $Al_2O_3$, about 3 to about 50% by weight of $SiO_2$, about 2 to about 10% by weight of $Na_2O$, about 2 to about 8% by weight of CaO, and from 0 to about 25% by weight of $TiO_2$.

The expression "fly ashes" as used herein refers to an industrial waste product generated in combustion. For example, such a waste product can contain various elements such as silica, oxygen, aluminum, iron, calcium. For example, fly ashes can comprise silicon dioxide ($SiO_2$) and aluminium oxide ($Al_2O_3$). For example, fly ashes can further comprises calcium oxide (CaO) and/or iron oxide ($Fe_2O_3$). For example fly ashes can comprise fine particles that rise with flue gases. For example, fly ashes can be produced during combustion of coal. For example, fly ashes can also comprise at least one element chosen from arsenic, beryllium, boron, cadmium, chromium, chromium VI, cobalt, lead, manganese, mercury, molybdenum, selenium, strontium, titanium, thallium, and/or vanadium. For example, fly ashes can also comprise rare earth elements. For example, fly ashes can be considered as an aluminum-bearing material.

The expression "slag" as used herein refers to an industrial waste product comprising oxides such as oxides of aluminum, calcium, titanium, magnesium, iron, and/or silicon.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The expression "titanium chloride" as used herein refers, for example, to a compound chosen from $TiCl_2$, $TiCl_3$ and $TiCl_4$ and mixtures thereof. For example, it refers to $TiCl_4$.

The term "hematite" as used herein refers, for example, to a compound comprising $\alpha$-$Fe_2O_3$, $\gamma$-$Fe_2O_3$, $\beta$-FeO.OH or mixtures thereof.

The expression "iron ions" as used herein refers, for example to ions comprising to at least one type of iron ion chosen from all possible forms of Fe ions. For example, the at least one type of iron ion can be $Fe^{2+}$, $Fe^{3+}$, or a mixture thereof.

The expression "aluminum ions" as used herein refers, for example to ions comprising to at least one type of aluminum ion chosen from all possible forms of Al ions. For example, the at least one type of aluminum ion can be $Al^{3+}$.

The expression "at least one aluminum ion", as used herein refers, for example, to at least one type of aluminum ion chosen from all possible forms of Al ions. For example, the at least one aluminum ion can be $Al^{3+}$.

The expression "at least one iron ion", as used herein refers, for example, to at least one type of iron ion chosen from all possible forms of Fe ions. For example, the at least one iron ion can be $Fe^{2+}$, $Fe^{3+}$, or a mixture thereof.

The expression "at least one precipitated iron ion", as used herein refers, for example, to at least one type of iron ion chosen from all possible forms of Fe ions that was precipitated in a solid form. For example, the at least one iron ion present in such a precipitate can be $Fe^{2+}$, $Fe^{3+}$, or a mixture thereof.

The expressions "substantially selectively recovering", "substantially selectively recovered" and their equivalents as used herein when referring to recovering a compound refers, for example, to recovering or isolating such a compound together with less than 30, 25, 20, 15, 10, 5, 3, 2 or 1% of impurities. Such impurities can be other compounds such as other metals.

The expressions "substantially selectively precipitating", "substantially selectively precipitate" and their equivalents as used herein when referring to precipitating a compound refers, for example, to precipitating such a compound together with less than 30, 25, 20, 15, 10, 5, 3, 2 or 1% of impurities. Such impurities can be other compounds such as other metals.

For example, the at least one metal can comprise a first metal that is chosen from aluminum, iron, zinc, copper, gold, silver, molybdenum, cobalt, magnesium, lithium, manganese, nickel, palladium, platinum, thorium, phosphorus, uranium and titanium, and/or at least one rare earth element and/or at least one rare metal.

For example, the first metal can be aluminum, iron, or magnesium.

For example, the liquid can comprise a second metal. For example, the liquid can comprise a third metal.

For example, the second metal can be chosen from aluminum, iron, zinc, copper, gold, silver, molybdenum, cobalt, magnesium, lithium, manganese, nickel, palladium, platinum, thorium, phosphorus, uranium and titanium, and/or at least one rare earth element and/or at least one rare metal.

For example, the process can comprise separating Si from Ti that are contained in the solid comprises leaching the solid with an acid so as to obtain a liquid portion comprising Ti and a solid portion containing Si and wherein the liquid portion is separated from the solid portion.

For example, the material can be leached with HCl having a concentration of about 15 to about 45 weight %, of about 20 to about 45 weight %, of about 25 to about 45 weight %, of about 26 to about 42 weight %, of about 28 to about 40 weight %, of about 30 to about 38 weight %, or between 25 and 36 weight %. For example, HCl at about 18 wt % or about 32 wt % can be used.

For example, the material can be leached with HCl having a concentration of about 1 M to about 12 M, about 2 M to about 10 M, about 3 M to about 9 M, about 4 M to about 8 M, about 5 M to about 7 M or about 6 M.

Leaching can also be carried out by adding dry highly concentrated acid (for example, 85%, 90% or 95%) in gas phase into the aqueous solution. Alternatively, leaching can also be carried out by using a weak acid solution (for example <3 wt %).

For example, leaching can be carried out by using HCl having a concentration of about 18 to about 32 wt % in a first reactor and then, by using HCl having concentration of about 90 to about 95% (gaseous) in a second reactor.

For example, leaching can be carried out by using HCl having a concentration of about 18 to about 32 wt % in a first reactor then, by using HCl having concentration of about 90 to about 95% (gaseous) in a second reactor; and by using HCl having concentration of about 90 to about 95% (gaseous) in a third reactor.

For example, leaching can be carried out under an inert gas atmosphere (for example argon or nitrogen).

For example, leaching can be carried out under an atmosphere of $NH_3$.

For example, the material can be leached at a temperature of about 125 to about 225° C., about 140 to about 165° C., about 145 to about 160° C., about 150 to about 200° C., about 150 to about 190° C., about 160 to about 190° C., about 185 to about 190° C., about 160 to about 180° C., about 160 to about 175° C., or about 165 to about 170° C.

For example, the material can be leached at a pressure of about 4 to about 10 barg, about 4 to about 8 barg, or about 5 to about 6 barg.

For example, the material can be leached at a pressure of about 50 to about 150 psig, about 60 to about 100 psig, or about 70 to about 80 psig.

For example, the material can be leached with HCl having a concentration of about 10 to about 50 weight %, about 15 to about 45 weight %, of about 18 to about 45 weight % of about 18 to about 32 weight %, of about 20 to about 45 weight %, of about 25 to about 45 weight %, of about 26 to about 42 weight %, of about 28 to about 40 weight %, of about 30 to about 38 weight %, or between 25 and 36 weight %. For example, HCl at about 18 wt % or about 32 wt % can be used.

Leaching can also be carried out by adding dry highly concentrated acid (for example, 85%, 90% or 95%) in gas phase into the aqueous solution. Alternatively, leaching can also be carried out by using a weak acid solution (for example <3 wt %).

For example, leaching can be carried out by using HCl having a concentration of about 18 to about 32 wt % in a first reactor and then, by using HCl having concentration of about 90 to about 95%, or about 95 to about 100% (gaseous) in a second reactor.

For example, leaching can be carried out by using HCl having a concentration of about 18 to about 32 wt % in a first reactor then, by using HCl having concentration of about 90 to about 95% (gaseous) in a second reactor; and by using HCl having concentration of about 90 to about 95% (gaseous) in a third reactor.

For example, leaching can be carried out under an inert gas atmosphere (for example argon or nitrogen).

For example, leaching can be carried out under an atmosphere of $NH_3$.

For example a first leaching can be carried out at atmospheric pressure and then, at least one further leaching (for example 1, 2 or 3 subsequent leaching steps) can be carried out under pressure.

For example, the material can be leached at a temperature of about 125 to about 225° C., about 150 to about 200° C., about 160 to about 180° C., or about 165 to about 170° C.

For example, the material can be leached at a temperature of about 125 to about 225° C., about 140 to about 165° C., about 145 to about 160° C., about 150 to about 200° C., about 150 to about 190° C., about 160 to about 190° C., about 185 to about 190° C., about 160 to about 180° C., about 160 to about 175° C., or about 165 to about 170° C.

For example, leaching can be a continuous leaching or semi-continuous.

For example, the processes can further comprise recycling the gaseous HCl so-produced by contacting it with water so as to obtain a composition having a concentration of about 18 to about 45 weight %, about 26 to about 42 weight %, about 25 to about 45 weight %, about 28 to about 40 weight %, about 30 to about 38 weight %, about 18 to about 36%, or about 25 to about 36%.

For example, the processes can further comprise recycling the gaseous HCl so-produced by contacting it with water so as to obtain a composition having a concentration of about 18 to about 45 weight % or about 25 to about 45 weight % and using the composition for leaching the material.

For example, the liquid can comprise iron chloride. Iron chloride can comprise at least one of $FeCl_2$, $FeCl_3$, and a mixture thereof.

For example, the iron chloride can be hydrolyzed into iron oxide.

For example, iron chloride can be hydrolyzed into hematite.

For example, the liquid can have an iron chloride concentration of at least 30% by weight; and can then be hydrolyzed at a temperature of about 155 to about 350° C.

For example, the liquid can be concentrated to a concentrated liquid having an iron chloride concentration of at least 30% by weight; and then the iron chloride can be hydrolyzed at a temperature of about 155 to about 350° C. while maintaining a ferric chloride concentration at a level of at least 65% by weight, to generate a composition comprising a liquid and precipitated hematite, and recovering the hematite.

For example, non-hydrolysable elements with hematite can be concentrated back to a concentration of about 0.125 to about 52% wt. in circulation loop in view of selective extraction.

For example, the liquid can be concentrated to a concentrated liquid having a concentration of the at least one iron chloride of at least 30% by weight; and then hydrolyzed at a temperature of about 155 to about 350° C.

For example, the at least one iron chloride can be hydrolyzed at a temperature of about, 150 to about 175, 160 to about 175, 155 to about 170, 160 to about 170 or 165 to about 170° C.

For example, the liquid can be concentrated to a concentrated liquid having a concentration of the at least one iron chloride of at least 30% by weight; and then the at least one iron chloride is hydrolyzed at a temperature of about 155 to about 350° C. while maintaining a ferric chloride concentration at a level of at least 65% by weight, to generate a composition comprising a liquid and precipitated hematite, and recovering the hematite.

For example, the liquid can be concentrated to a concentrated liquid having an iron chloride concentration of at least 30% by weight; and then the iron chloride can be hydrolyzed at a temperature of about 155 to about 350° C. while maintaining a ferric chloride concentration at a level of at least 65% by weight, to generate a composition comprising a liquid and precipitated hematite; recovering the hematite; and recovering rare earths from the liquid.

Alternatively, iron chloride can be treated by pyrohydrolysis so as to generate $Cl_2$. For example, such a pyrohydrolysis can be carried out under oxidizing conditions (for example $O_2$ can be present at a concentration of at least 4, 5, 6, 7, 8, 9, or 10% by weight). Such a reaction can be described as follows:

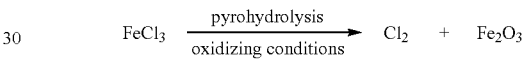

For example, such a pyrohydrolysis can be carried out in a fluid bed reactor. For example, the $Cl_2$ so produced can eventually used for treating the solid comprising Ti.

For example, iron chloride can be pyrohydrolzed so as to generate $Cl_2$.

For example, the $Cl_2$ so generated can be used for treating said solid and to react with said Ti contained therein.

For example, $Cl_2$ so generated can be used for treating said solid and to react with $TiO_2$ contained in said solid, thereby producing $TiCl_4$.

For example, said Fe ions can be substantially selectively extracted by converting them into $Fe_2O_3$ via an hydrolysis.

For example, said Fe ions can be substantially selectively extracted by converting them into $Fe_2O_3$ via a pyrohydrolysis that allows for generating $Cl_2$.

For example, said Fe ions can be substantially selectively isolated by converting them into $Fe_2O_3$ via a pyrohydrolysis that allows for generating $Cl_2$.

For example, said $Cl_2$ so produced can be effective for treating said solid so as to obtain said liquid portion comprising the titanium chloride.

For example, the process can further comprise, after recovery of the rare earths, reacting the liquid with HCl so as to cause precipitation of $MgCl_2$, and recovering same.

For example, the processes can further comprise calcining $MgCl_2$ into MgO.

For example, the processes can further comprise calcining $MgCl_2$ into MgO and recycling the gaseous HCl so-produced by contacting it with water so as to obtain a composition having a concentration of about 25 to about 45 weight % or about 18 to about 45 weight % and using the composition for leaching the red mud.

For example, the processes can further comprises, after recovery of the rare earths, reacting the liquid with HCl, and substantially selectively precipitating $Na_2SO_4$. For example, $Na_2SO_4$ can be precipitated by reacting the liquid with $H_2SO_4$.

For example, the processes can further comprises, after recovery of the rare earths, reacting the liquid with HCl, and substantially selectively precipitating $K_2SO_4$. For example, $K_2SO_4$ can be precipitated by adding $H_2SO_4$.

For example, the liquid can be concentrated to a concentrated liquid having an iron chloride concentration of at least 30% by weight; and then the iron chloride can be hydrolyzed at a temperature of about 155 to about 350° C. while maintaining a ferric chloride concentration at a level of at least 65% by weight, to generate a composition comprising a liquid and precipitated hematite; recovering the hematite; and reacting the liquid with HCl. For example, such a process can further comprises reacting the liquid with $H_2SO_4$ so as to substantially selectively precipitate $K_2SO_4$. The processes can also comprise further reacting the liquid with $H_2SO_4$ so as to substantially selectively precipitating $K_2SO_4$.

For example, the processes can comprise reacting dry individual salts (for example Na or K salts) obtained during the processes with $H_2SO_4$ and recovering HCl while producing marketable $K_2SO_4$ and $Na_2SO_4$ and recovering hydrochloric acid of about 15 to about 90% wt.

For example, sodium chloride produced in the processes can undergo a chemical reaction with sulfuric acid so as to obtain sodium sulfate and regenerate hydrochloric acid. Potassium chloride can undergo a chemical reaction with sulfuric acid so as to obtain potassium sulfate and regenerate hydrochloric acid. Sodium and potassium chloride brine solution can alternatively be the feed material to adapted small chlor-alkali electrolysis cells. In this latter case, common bases (NaOH and KOH) and bleach (NaOCl and KOCl) are produced.

For example, the processes can further comprise, after recovery of the rare earth elements and/or rare metals, recovering NaCl from the liquid, reacting the NaCl with $H_2SO_4$, and substantially selectively precipitating $Na_2SO_4$.

For example, the processes can further comprise, downstream of recovery of the rare earth elements and/or rare metals, recovering KCl from the liquid, reacting the KCl with $H_2SO_4$, and substantially selectively precipitating $K_2SO_4$.

For example, the processes can further comprise, downstream of recovery of the rare earth elements and/or rare metals, recovering NaCl from the liquid, carrying out an electrolysis to generate NaOH and NaOCl.

For example, the processes can further comprise, downstream of recovery of the rare earth elements and/or rare metals, recovering KCl from the liquid, reacting the KCl, carrying out an electrolysis to generate KOH and KOCl.

For example, the liquid can be concentrated to a concentrated liquid having a concentration of the at least one iron chloride of at least 30% by weight; and then the at least one iron chloride is hydrolyzed at a temperature of about 155 to about 350° C. while maintaining a ferric chloride concentration at a level of at least 65% by weight, to generate a composition comprising a liquid and precipitated hematite; recovering the hematite; and extracting NaCl and/or KCl from the liquid.

For example, the processes can further comprise reacting the NaCl with $H_2SO_4$ so as to substantially selectively precipitate $Na_2SO_4$.

For example, the processes can further comprise reacting the KCl with $H_2SO_4$ so as to substantially selectively precipitate $K_2SO_4$.

For example, the processes can further comprise carrying out an electrolysis of the NaCl to generate NaOH and NaOCl.

For example, the processes can further comprise carrying out an electrolysis of the KCl to generate KOH and KOCl.

For example, the processes can comprise separating the solid from the leachate and washing the solid so as to obtain silica having a purity of at least 95%, at least 96%, at least 97%, at least 98%, at least 99%, at least 99.5% or at least 99.9%.

For example, the process can comprise separating the solid from the leachate and washing the solid so as to obtain silica having a purity of at least 95%.

For example, the processes can comprise reacting the leachate with gaseous HCl so as to obtain the liquid and the precipitate comprising the first metal under the form of a chloride.

For example, the processes can comprise reacting the leachate with dry gaseous HCl so as to obtain the liquid and the precipitate comprising the first metal under the form of a chloride.

For example, precipitating $AlCl_3$ can comprise crystallizing $AlCl_3.6H_2O$.

For example, the process can comprise reacting the leachate with HCl recovered during the process and a having a concentration of at least 30% as to obtain the liquid and the precipitate comprising the aluminum ions, the precipitate being formed by crystallization of $AlCl_3.6H_2O$.

For example, the first metal can be chosen from aluminum, iron, zinc, copper, gold, silver, molybdenum, cobalt, magnesium, lithium, manganese, nickel, palladium, platinum, thorium, phosphorus and uranium, and/or at least one rare earth element and/or at least one rare metal.

For example, the second metal can be iron or aluminum.

For example, the liquid can comprise a second metal.

For example, the second metal can be chosen from aluminum, iron, zinc, copper, gold, silver, molybdenum, cobalt, magnesium, lithium, manganese, nickel, palladium, platinum, thorium, phosphorus and uranium and titanium, and/or at least one rare earth element and/or at least one rare metal.

For example, the second metal can be iron or aluminum.

For example, the process can comprise separating the precipitate from the liquid and heating the second metal in order to convert a chloride of the second metal into an oxide of the second metal.

For example, the processes can comprise:
separating the solid from the leachate;
leaching the solid with an acid so as to obtain another leachate; and
recovering a third metal from the another leachate.

For example, the third metal can be chosen from aluminum, iron, zinc, copper, gold, silver, molybdenum, cobalt, magnesium, lithium, manganese, nickel, palladium, platinum, thorium, phosphorus, uranium and titanium, and/or at least one rare earth element and/or at least one rare metal.

For example, the third metal can be titanium.

For example, the acid used for leaching can be chosen from HCl, $HNO_3$, $H_2SO_4$ and mixtures thereof.

For example, the acid can be HCl.

For example, the acid can be gaseous HCl.

For example, the process can comprise recovering the third metal from the another leachate by precipitating the third metal.

For example, the third metal can be precipitated by reacting it with HCl.

For example, the process can further comprise heating the third metal in order to convert a chloride of the third metal into an oxide of the third metal.

For example, the first metal can be aluminum.

For example, the first metal can be magnesium.

For example, the first metal can be nickel.

For example, the second metal can be magnesium.

For example, the second metal can be nickel.

For example, the second metal can be iron.

For example, the processes can comprise controlling the temperature of the leachate so as to substantially selectively precipitate the first metal ions in the form of a chloride, and removing the precipitate from the leachate.

For example, the process can comprise reacting the leachate with HCl so as to obtain a liquid and a precipitate comprising a chloride of the first metal, and separating the precipitate from the liquid.

For example, controlling the temperature of the leachate so as to precipitate the first metal in the form of a chloride, and removing the precipitate from the leachate, can be carried out before reacting the leachate with HCl so as to obtain a liquid and a precipitate comprising a chloride of the second metal, and separating the precipitate from the liquid.

For example, controlling the temperature of the leachate so as to precipitate the first metal in the form of a chloride, and removing the precipitate from the leachate, can be carried out after reacting the leachate with HCl so as to obtain a liquid and a precipitate comprising a chloride of the second metal, and separating the precipitate from the liquid.

For example, reacting the leachate with HCl so as to obtain a precipitate comprising the first metal in the form of a chloride, can be carried out by substantially selectively precipitating the first metal chloride.

For example, reacting the leachate with HCl so as to obtain a precipitate comprising the second metal in the form of a chloride, can be carried out by substantially selectively precipitating the second metal chloride.

For example, controlling the temperature of the leachate so as to precipitate the first metal in the form of a chloride can be carried out substantially selectively.

For example, controlling the temperature of the leachate so as to precipitate the second metal in the form of a chloride can be carried out substantially selectively.

For example, controlling the concentration of HCl in the leachate and/or the temperature of the leachate so as to precipitate the first metal in the form of a chloride, can be carried out substantially selectively.

For example, controlling the concentration of HCl in the leachate and/or the temperature of the leachate so as to precipitate the second metal in the form of a chloride, can be carried out substantially selectively.

For example, the processes can comprise reacting the leachate with gaseous HCl so as to obtain the liquid and the precipitate comprising the aluminum ions in the form of $AlCl_3.6H_2O$.

For example, the processes can comprise reacting the leachate with dry gaseous HCl so as to obtain the liquid and the precipitate comprising the aluminum ions in the form of $AlCl_3.6H_2O$.

For example, the processes can comprise reacting the leachate with acid of at least 30% wt. that was recovered, regenerated and/or purified as indicated in the present disclosure so as to obtain the liquid and the precipitate comprising the aluminum ions in the form of $AlCl_3.6H_2O$.

For example, the processes can comprise reacting the leachate with gaseous HCl so as to obtain the liquid and the precipitate comprising the aluminum ions, the precipitate being formed by crystallization of $AlCl_3.6H_2O$.

For example, the processes can comprise reacting the leachate with dry gaseous HCl so as to obtain the liquid and the precipitate comprising the aluminum ions, the precipitate being formed by crystallization of $AlCl_3.6H_2O$.

For example, aluminum ions can be precipitated under the form of $AlCl_3$ (for example $AlCl_3.6H_2O$) in a crystallizer, for example, by adding HCl having a concentration of about 26 to about 32 wt %.

For example, the solid can be treated so as to separate Ti from Si contained therein.

For example, the gaseous HCl can have a HCl concentration of at least 85% wt. or at least 90% wt.

For example, the gaseous HCl can have a HCl concentration of about 90% wt., about 90% to about 95% wt. or about 90% to about 99% wt.

For example, during the crystallization of $AlCl_3.6H_2O$, the liquid can be maintained at a concentration of HCl of about 25 to about 35% by weight or about 30 to about 32% by weight.

For example, the crystallization can be carried out at a temperature of about 45 to about 65° C. or about 50 to about 60° C.

For example, crystallization of $AlCl_3.6H_2O$ can be carried out by adding concentrated gaseous HCl to reach a proprietary concentration established of free HCl in the crystalliser. The average results obtained from the crystals For example, the hexahydrate crystals can be fed to the calcination unit. $AlCl_3$ hydrolysis and conversion can occur at very low temperature (<200° C.). The crystals can pass through a first step where decomposition occurs followed by the calcination itself. The circulating fluid bed can be operated such that energy consumption is less than 30% of the energy normally required for hexahydrate crystal calcination. The alumina produced can be washed to remove unconverted salt if required.

For example, the HCl can be obtained from the gaseous HCl so-produced.

For example, in the processes of the present disclosure, a given batch or quantity of the aluminum-containing material will be leached, will then be converted into $AlCl_3$ and when the HCl generated during calcination of $AlCl_3$ into $Al_2O_3$ will be used for example to leach another given batch or quantity of the aluminum-containing material.

For example, the processes can comprise heating the precipitate at a temperature of at least 180, 230, 250, 300, 350, 400, 450, 500, 550, 600, 650, 700, 750, 800, 850, 900, 925, 930, 1000, 1100, 1200 or 1250° C. for converting $AlCl_3$ into $Al_2O_3$.

For example, converting $AlCl_3$ into $Al_2O_3$ can comprise calcination of $AlCl_3$.

For example, calcination is effective for converting $AlCl_3$ into beta-$Al_2O_3$.

For example, calcination is effective for converting $AlCl_3$ into alpha-$Al_2O_3$.

For example, converting $AlCl_3$ into $Al_2O_3$ can comprise carrying out a calcination via a two-stage circulating fluid bed reactor.

For example, converting $AlCl_3$ into $Al_2O_3$ can comprise carrying out a calcination via a two-stage circulating fluid bed reactor that comprises a preheating system.

For example, converting $AlCl_3$ into $Al_2O_3$ can comprise carrying out a calcination at low temperature, for example, about 300 to about 600° C., about 325 to about 550° C. about 350 to about 500° C., about 375 to about 450° C., about 375 to about 425° C., or about 385 to about 400° C. and/or injecting steam.

For example, converting $AlCl_3$ into $Al_2O_3$ can comprise carrying out a calcination at low temperature, for example, at least 180° C., at least 250° C., at least 300° C., at least 350° C. and/or injecting steam.

For example, converting $AlCl_3$ into $Al_2O_3$ can comprise carrying out a calcination at low temperature, for example, less than 600° C. and/or injecting steam.

For example, converting $AlCl_3$ into $Al_2O_3$ can comprise carrying out a calcination by using coal as combustion source and by using a degasification unit.

For example, the process can comprise converting $AlCl_3.6H_2O$ into $Al_2O_3$ by carrying out a calcination of $AlCl_3.6H_2O$, the calcination comprising steam injection.

For example, steam (or water vapor) can be injected at a pressure of about 200 to about 700 psig, about 300 to about 700 psig, about 400 to about 700 psig, about 550 to about 650 psig, about 575 to about 625 psig, or about 590 to about 610 psig.

For example, steam (or water vapor) can be injected and a plasma torch can be used for carrying fluidization.

For example, the steam (or water vapor) can be overheated.

For example, the steam (or water vapor) can be at a temperature of about 300 to about 400° C.

For example, acid from the offgases generated during calcination can be then treated via a gas phase purification process.

For example, converting $AlCl_3$ into $Al_2O_3$ can comprise carrying out a calcination by means of carbon monoxide (CO).

For example, converting $AlCl_3$ into $Al_2O_3$ can comprise carrying out a calcination by means of a Refinery Fuel Gas (RFG).

For example, calcination can be carried out by injecting water vapor or steam and/or by using a combustion source chosen from fossil fuels, carbon monoxide, a Refinery Fuel Gas, coal, or chlorinated gases and/or solvents.

For example, calcination can be carried out by injecting water vapor or steam and/or by using a combustion source chosen from natural gas or propane.

For example, calcination can be carried out by providing heat by means of electric heating, gas heating, microwave heating.

For example, the processes can comprise precipitating the $Al^{3+}$ ions under the form of $Al(OH)_3$. For example, precipitating the $Al^{3+}$ under the form of $Al(OH)_3$ is carried out at a pH of about 7 to about 10; about 9 to about 10; about 9.2 to about 9.8; about 9.3 to about 9.7; about 9.5; 7.5 to about 8.5; about 7.8 to about 8.2; or about 8.

For example, the iron ions can be precipitated at a pH greater than 11, a pH greater than 12, a pH comprised between 10 and 11, a pH about 11.5 to about 12.5, or a pH about 11.8 to about 12.0.

For example, the $Al^{3+}$ ions can be purified.

For example, the process can comprise precipitating $Al^{3+}$ ions under the form of $AlCl_3$ so as to purify the $Al^{3+}$ ions. For example, precipitating $AlCl_3$ can be carried out by crystallizing the $AlCl_3$ under the form of $AlCl_3.6H_2O$.

For example, the process can comprise converting $AlCl_3$ into $Al_2O_3$, for example, by converting $AlCl_3$ into $Al_2O_3$ under an inert gas atmosphere or by converting $AlCl_3$ into $Al_2O_3$ under a nitrogen atmosphere.

The obtained alumina can be washed by demineralized water so as to at least partially remove NaCl and/or KCl.

For example, the fluid bed reactor can comprise a metal catalyst chosen from metal chlorides.

For example, the fluid bed reactor can comprise a metal catalyst that is $FeCl_3$, $FeCl_2$ or a mixture thereof.

For example, the fluid bed reactor can comprise a metal catalyst that is $FeCl_3$.

For example, the preheating system can comprise a plasma torch.

For example, steam can be used as the fluidization medium heating. Heating can also be electrical.

For example, a plasma torch can be used for preheating the calcination reactor.

For example, a plasma torch can be used for preheating air entering in the calcination reactor.

For example, the plasma torch can be used for generating steam that is injected into a calcination reactor.

For example, the plasma torch can be effective for generating steam that is as fluidization medium in a fluid bed reactor.

For example, a plasma torch can be used for preheating a fluid bed.

For example, the calcination medium can be substantially neutral in terms of $O_2$ (or oxidation). For example, the calcination medium can favorize reduction (for example a concentration of CO of about 100 ppm).

For example, the calcination medium is effective for preventing formation of $Cl_2$.

For example, the processes can comprise converting $AlCl_3.6H_2O$ into $Al_2O_3$ by carrying out a calcination of $AlCl_3.6H_2O$, for example, that is provided by the combustion of gas mixture that comprises:

$CH_4$: 0 to about 1% vol;
$C_2H_6$: 0 to about 2% vol;
$C_3H_8$: 0 to about 2% vol;
$C_4H_{10}$: 0 to about 1% vol;
$N_2$: 0 to about 0.5% vol;
$H_2$: about 0.25 to about 15.1% vol;
CO: about 70 to about 82.5% vol; and
$CO_2$: about 1.0 to about 3.5% vol.

Such a mixture can be efficient for reduction in off gas volume of 15.3 to 16.3%; therefore the capacity increases of 15.3 to 16.3% proven on practical operation of the circulating fluid bed. Thus for a same flow it represents an Opex of 0.65*16.3%=10.6%.

For example, the air to natural gas ratio of ($Nm^3/h$ over $Nm^3/h$) in the fluid bed can be about 9.5 to about 10

For example, the air to CO gas ratio of ($Nm^3/h$ over $Nm^3/h$) in the fluid bed can be about 2 to about 3.

For example, $O_2$ can be substantially absent from the gas mixture.

For example, the processes can comprise, before leaching the material, a pre-leaching removal of fluorine optionally contained in the material.

For example, the HCl can obtained from the gaseous HCl so-produced.

For example, the processes can comprise heating the precipitate at a temperature of at least 1000, 1100, 1200 or 1250° C. for converting $AlCl_3$ into $Al_2O_3$.

For example, in the processes of the present disclosure, a given batch or quantity of the material can be leached, will then be converted into $AlCl_3$ and when the HCl generated during calcination of $AlCl_3$ into $Al_2O_3$ will be used for example to leach another given batch or quantity of the aluminum-containing material.

For example, the processes can be effective for providing an $Al_2O_3$ recovery yield of at least 93%, at least 94%, at least 95%, about 90 to about 95%, about 92 to about 95%, or about 93 to about 95%.

For example, the processes can be effective for providing a $Fe_2O_3$ recovery yield of at least 98%, at least 99%, about 98 to about 99.5%, or about 98.5 to about 99.5%.

For example, the processes can be effective for providing a MgO recovery yield of at least 96%, at least 97%, at least 98%, or about 96 to about 98%.

For example, the processes can be effective for providing a HCl recovery yield of at least 98%, at least 99%, or about 98 to about 99.9%.

For example, the aluminum-containing material can be argillite.

For example, the aluminum-containing material can be bauxite.

For example, the aluminum-containing material can be red mud.

For example, the processes can be effective for avoiding producing red mud.

For example, the alumina and the other products are substantially free of red mud.

For example, HCl can be recycled. For example, such a recycled HCl can be concentrated and/or purified.

For example, gaseous HCl can be concentrated and/or purified by means of $H_2SO_4$. For example, gaseous HCl can be passed through a packed column where it is contacted with a $H_2SO_4$ countercurrent flow. For example, by doing so, concentration of HCl can be increased by at least 50 wt %, at least 60 wt %, at least 70 wt %, at least 75 wt %, at least 80 wt %, about 50 wt % to about 80 wt %, about 55 wt % to about 75 wt %, or about 60 wt %. For example, the column can be packed with a polymer such as polypropylene or polytrimethylene terephthalate (PTT).

For example, gaseous HCl can be concentrated and/or purified by means of $CaCl_2$. For example, gaseous HCl can be passed through a column packed with $CaCl_2$.

For example, the processes can further comprise converting alumina ($Al_2O_3$) into aluminum. Conversion of alumina into aluminum can be carried out, for example, by using the Hall-Héroult process. References is made to such a well known process in various patents and patent applications such as US 20100065435; US 20020056650; U.S. Pat. No. 5,876,584; U.S. Pat. No. 6,565,733. Conversion can also be carried out by means of other methods such as those described in U.S. Pat. No. 7,867,373; U.S. Pat. No. 4,265,716; U.S. Pat. No. 6,565,733 (converting alumina into aluminum sulfide followed by the conversion of aluminum sulfide into aluminum.)

For example, the various products obtained by the processes of the present disclosure such as alumina, hematite, titanium oxides, magnesium oxides, rare earth elements and rare metals, etc can be further purified by means of a plasma torch. For example, they can be individually injected into a plasma torch so as to further purify them.

For example, converting $AlCl_3$ into $Al_2O_3$ can comprise carrying out a one-step calcination.

For example, calcination can be carried out at different temperatures with steam. Temperature applied of superheated steam can be of about 350° C. to about 550° C. or about 350° C. to about 940° C. or about 350° C. to about 1200° C.

For example, multi stage evaporation step of the hydrolyser can be carried out to reduce drastically energy consumption.

For example, calcination can be carried out at very low temperature with steam.

For example, multi stage evaporation step of the hydrolyser can be carried out to reduce drastically energy consumption.

For example, leaching of the solid with HCl can be done so as to obtain a leachate comprising titanium ions (for example $TiCl_4$).

For example, leaching of the solid with HCl can be done in the presence of a chloride so as to obtain a leachate comprising titanium ions (for example $TiCl_4$). Such a leaching can be carried out as described in U.S. Pat. No. 7,803,336 and WO 2005049872. These documents are hereby integrated by reference in their entirety.

For example, the chloride can be magnesium chloride, calcium chloride or sodium chloride.

For example, the processes, when applicable, can further comprise converting titanium chloride into titanium oxide. Such a conversion can be carried out as described in U.S. Pat. No. 7,803,336 and WO 2005049872. These documents are hereby integrated by reference in their entirety.

For example, the processes can comprise leaching of the material with HCl so as to obtain the leachate comprising aluminum ions and the solid, separating the solid from the leachate; and further treating the solid so as to separate $SiO_2$ from $TiO_2$ that are contained therein.

For example, the processes can comprise leaching the material with HCl so as to obtain the leachate comprising aluminum ions and the solid, separating the solid from the leachate; and further treating the solid so as to separate Si from Ti that are contained therein.

For example, the processes can comprise leaching the material with HCl so as to obtain the leachate comprising aluminum ions and the solid, separating the solid from the leachate; and further treating the solid with HCl so as to separate Si from Ti that are contained therein.

For example, the process can comprise leaching the material with HCl so as to obtain the leachate comprising aluminum ions and the solid, separating the solid from the leachate; and further treating the solid with HCl, in the presence of a chloride (for example chosen from akali chlorides and alkaline earth chlorides), so as to separate Si from Ti that are contained therein.

For example, leaching of the solid with HCl in the presence of a chloride allows for obtaining a leachate comprising titanium chloride.

For example, the solid can be treated with HCl and the chloride so as to obtain a liquid portion comprising Ti and a solid portion containing Si and wherein the liquid portion is separated from the solid portion.

For example, the solid can be treated with HCl and the chloride so as to obtain a liquid portion comprising $TiCl_4$.

For example, the process can further comprise converting $TiCl_4$ into $TiO_2$.

For example, $TiCl_4$ can be converted into $TiO_2$ by solvent extraction of the third liquid fraction and subsequent formation of titanium dioxide from the solvent extraction.

For example, $TiCl_4$ can be reacted with water and/or a base to cause precipitation of $TiO_2$.

For example, $TiCl_4$ can be converted into $TiO_2$ by means of a pyrohydrolysis, thereby generating HCl.

For example, $TiCl_4$ can be converted into $TiO_2$ by means of a pyrohydrolysis, thereby generating HCl that is recycled.

For example, $TiCl_4$ can be converted into $TiO_2$ by reacting $TiCl_4$ with $O_2$.

For example, $TiCl_4$ can be converted into $TiO_2$ by reacting $TiCl_4$ with $O_2$ under heating.

For example, HCl generated in the conversion of $TiCl_4$ into $TiO_2$ can be recovered.

For example, HCl generated in the conversion of $TiCl_4$ into $TiO_2$ can be recovered and reused for leaching the titanium-containing material or the solid For example, the metal chloride can be $MgCl_2$ or $ZnCl_2$.

For example, the solid can comprise $TiO_2$ and $SiO_2$ and the solid can be treated with $Cl_2$ and carbon in order to obtain a liquid portion and a solid portion, and wherein the solid portion and the liquid portion are separated from one another.

For example, the solid can comprise Ti and Si and the solid can be treated with $Cl_2$ and carbon in order to obtain a liquid portion and a solid portion, and wherein the solid portion and the liquid portion are separated from one another.

For example, the solid can comprise $TiO_2$ and $SiO_2$ and the solid can be treated with $Cl_2$ and carbon in order to obtain a liquid portion and a solid portion, and wherein the solid portion and the liquid portion are separated from one another.

For example, the solid can comprise Ti and Si and the solid can be treated with $Cl_2$ in order to obtain a liquid portion and a solid portion, and wherein the solid portion and the liquid portion are separated from one another.

For example, the solid can comprise $TiO_2$ and $SiO_2$ and the solid can be treated with $Cl_2$ in order to obtain a liquid portion and a solid portion, and wherein the solid portion and the liquid portion are separated from one another.

For example, the processes can comprise heating titanium chloride so as to convert it into $TiO_2$.

For example, the liquid portion can comprise $TiCl_2$ and/or $TiCl_4$.

For example, the liquid portion can comprise $TiCl_4$.

For example, the process can further comprise heating $TiCl_4$ so as to convert it into $TiO_2$.

For example, obtained $TiO_2$ can be purified by means of a plasma torch.

For example, the solid can be treated as described in U.S. Pat. No. 7,182,931 (hereby incorporated by reference in its entirety) in order to obtain $TiCl_4$ and then converting $TiCl_4$ into $TiO_2$. Regarding the conversion of $TiCl_4$ into $TiO_2$, examples of processes are also provided in U.S. Pat. No. 6,207,131, which is hereby incorporated in its entirety.

For example, the processes can comprise leaching the material with HCl so as to obtain the leachate comprising aluminum ions and the solid, separating the solid from the leachate; and further treating the solid with HCl at a concentration of less than 20% wt., at a temperature of less than 85° C., in the presence of a chloride, so as to separate Si from Ti that are contained therein.

For example, the chloride can be chosen from akali chlorides and alkaline earth chlorides.

For example, the chloride can be $MgCl_2$ or $CaCl_2$.

After the leaching, the titanium ions under the form of titanium chloride can be in a liquid phase and the Si remains solid. Therefore, Si can thus be simply separated from Ti by a solid/liquid separation. Then, titanium chloride can be converted into $TiO_2$. It has to be noted that titanium oxychloride can also be present in the leachate.

Various methods of recovering titanium from a leachate are discussed in CA 2,513,309, which is hereby integrated by reference in its entirety.

For example, separation methods such as solvent extraction, precipitation or ion exchange can be used to remove impurities various impurities e. g. iron, chromium and vanadium, followed by recovery of titanium. Some of these techniques are discussed in the U.S. Pat. No. 6,500,396 (also integrated by reference in its entirety).

For example, in order to purify titanium ions, the leachate can be treated with an organic phase. The organic phase can be selected so that ions of a given can be selectively extracted into the organic phase, with titanium ions remaining in the aqueous solution. Thus, oxides of this given metal can also be obtained in high purity.

Examples of the organic phase are quaternary ammonium chlorides, amines (primary, secondary or tertiary), phosphoric and phosphinic acids, and esters and oxides thereof, e. g. tri-n-butyl phosphate, di-2-ethylhexyl phosphoric acid and phosphine oxide. The organic phase may be stripped from the iron values and recycled. Such an organic phase can be selected so that the titanium chloride can be soluble in the organic phase. For example, the organic phase can be selected such that the organic phase and titanium chloride may be separated by fractional distillation (for example with a separation in boiling points between the organic phase and titanium chloride.)

For example, the titanium chloride can be treated with water or a base, (for example magnesium oxide), or by raising the temperature of the solution to 85-110 C, to effect precipitation of titanium dioxide.

The titanium chloride product obtained can also be subjected to calcination in a pyrohydrolysis reactor or be treated in a plasma torch so as to convert it into $TiO_2$.

For example, NaCl recovered from the processes of the present disclosure can be reacted with $SO_2$, so as to produce HCl and $Na_2SO_4$. Such a reaction that is an exothermic reaction can generate steam that can be used to activate a turbine and eventually produce electricity.

For example, U and/or Th can be treated with the processes of the present disclosure. For example, these two elements can be in such processes in admixtures with iron ions and they can be separated therefrom by means of at least one ion exchange resin.

According to one example as shown in FIG. 1, the processes can involve the following steps (the reference numbers in FIG. 1 correspond to the following steps):

According to one example as shown in FIG. 1, the processes can involve the following steps (the reference numbers in FIG. 1 correspond to the following steps):

1—The aluminum-containing material is reduced to an average particle size of about 50 to about 80 μm.

2—The reduced and classified material is treated with hydrochloric acid which allows for dissolving, under a predetermined temperature and pressure, the aluminum with other elements like iron, magnesium and other metals including rare earth elements and/or rare metals. The silica and titanium (if present in raw material) remain totally undissolved.

3—The mother liquor from the leaching step then undergoes a separation, a cleaning stage in order to separate the solid from the metal chloride in solution.

4—The spent acid (leachate) obtained from step 3 is then brought up in concentration with dry and highly concentrated gaseous hydrogen chloride by sparging this one into a crystallizer. This results into the crystallization of aluminum chloride hexahydrate (precipitate) with a minimum of other impurities. Depending on the concentration of iron chloride at this stage, further crystallization step(s) can be required. The precipitate is then separated from the liquid. For example, particle size of crystals can be about 100 to about 500 microns, about 200 to about 400 microns, or about 200 to about 300 microns. Alternatively, particle size of crystals can be about 100 to about 200 microns, about 300 to about 400 microns or about 400 to 500 microns.

5—The aluminum chloride hexahydrate is then calcined (for example by means of a rotary kiln, fluid bed, etc) at high temperature in order to obtain the alumina form. Highly concentrated gaseous hydrogen chloride is then recovered and excess is brought in aqueous form to the highest concentration possible so as to be used (recycled) in the acid leaching step. Acid can also be directly sent in gas phase to the acid purification stage to increase HCl concentration from about 30 wt % to about 95 wt %. This can be done, for example, during drying stage.

6—Iron chloride (the liquid obtained from step 4) is then pre-concentrated and hydrolyzed at low temperature in view of the $Fe_2O_3$ (hematite form) extraction and acid recovery from its hydrolysis. All heat recovery from the calcination step (step 5), the leaching part exothermic reaction (step 1) and other section of the processes is being recovered into the pre-concentrator. Alternatively, the iron chloride can be treated by means of a pyrohydrolysis in order to generate $Cl_2$ (instead of mainly HCl). In such a case, the $Cl_2$ so produced can be used in step 13 of FIG. 1 for treating the solid that comprises Ti. For example, it can be used to convert $TiO_2$ into $TiCl_4$. Such a reaction can be carried under oxidizing conditions (for example more than 4% of $O_2$). The pyrohydrolysis can be carried out in a fluid bed reactor under such oxidizing conditions.

10—After the removal of hematite, a solution rich in rare earth elements and/or rare metals can be processed. As it can be seen in FIG. 3, an internal recirculation can be done (after the removal of hematite) and the solution rich in rare earth elements and/or rare metals can be used for crystallization stage 4. Extraction of the rare earth elements and/or rare metals can be done as described in WO/2012/126092 and/or WO/2012/149642. These two documents are hereby integrated by reference in their entirety.

Other non-hydrolysable metal chlorides (Me-Cl) such as $MgCl_2$ and others then undergo the following steps:

7—The solution rich in magnesium chloride and other non-hydrolysable products at low temperature is then brought up in concentration with dry and highly concentrated gaseous hydrogen chloride by sparging it into a crystallizer. This results into the precipitation of magnesium chloride as an hexahydrate, for example after sodium and potassium chloride removal.

8—Magnesium chloride hexahydrate is then calcined (either through a rotary kiln, fluid bed, etc.) and hydrochloric acid at very high concentration is thus regenerated and brought back to the leaching step.

9—Other Me-Cl undergo a standard pyrohydrolysis step where mixed oxides (Me-O) can be produced and hydrochloric acid at the azeotropic point (20.2% wt.) is regenerated.

11—Ti contained in the solid obtained from step 3 can be treated so as to separate Si from Ti and thus obtain $SiO_2$ and $TiO_2$.

NaCl produced in this process can undergo chemical reaction with $H_2SO_4$ to produce $Na_2SO_4$ and HCl at a concentration at or above azeotropic concentration. Moreover, KCl can undergo chemical reaction with $H_2SO_4$ to produce $K_2SO_4$ and HCl having a concentration that is above the azeotropic concentration. Sodium and potassium chloride brine solution can be the feed material to adapted small chlor-alkali electrolysis cells. In this latter case, common bases (NaOH and KOH) and bleach (NaOCl and KOCl) are produced as well as HCl.

For example, the liquid can be concentrated to a concentrated liquid having an iron chloride concentration of at least 30% by weight; and then the iron chloride can be hydrolyzed at a temperature of about 155 to about 350° C. while maintaining a ferric chloride concentration at a level of at least 65% by weight, to generate a composition comprising a liquid and precipitated hematite, and recovering the hematite.

For example, the liquid can be concentrated to a concentrated liquid having an iron chloride concentration of at least 30% by weight; and then the iron chloride can be hydrolyzed at a temperature of about 155 to about 350° C. while maintaining a ferric chloride concentration at a level of at least 65% by weight, to generate a composition comprising a liquid and precipitated hematite; recovering the hematite; and recovering rare earth elements and/or rare metals from the liquid. For example, the process can further comprise, after recovery of the rare earth elements and/or rare metals, reacting the liquid with HCl so as to cause precipitation of $MgCl_2$, and recovering same.

As previously indicated, various aluminum-containing materials can be used as starting material of the processes disclosed in the present disclosure. Examples with clays and bauxite have been carried out. However, the person skilled in the art will understand that the continuous processes can handle high percentages of silica (>55%) and impurities as well as relatively low percentages of aluminum (for example as low as about 15%) and still being economically and technically viable. Satisfactory yields can be obtained (>93-95%) on $Al_2O_3$ and greater than 75%, 85 or 90% on rare earth elements and/or rare metals. No pre-thermal treatment in most cases are required. The processes disclosed in the present disclosure involve special techniques on leaching and acid recovery at very high strength, thereby offering several advantages over alkaline processes.

In step 1 the mineral, whether or not thermally treated is crushed, milled, dried and classified to have an average particle size of about 50 to about 80 μm.

In step 2, the milled raw material is introduced into the reactor and will undergo the leaching phase.

The leaching hydrochloric acid used in step 2 can be a recycled or regenerated acid from steps 5, 6, 8, 9, 10 and 11 (see FIG. 3) its concentration can vary from 15% to 45% weight. percent. Higher concentration can be obtained using membrane separation, cryogenic and/or high pressure approach. The acid leaching can be carried out under pressure and at temperature close to its boiling point thus, allowing a minimal digestion time and extended reaction extent (90%-100%). Leaching (step 2) can be accomplished in a semi-continuous mode where spent acid with residual free hydrochloric acid is replaced by highly concentrated acid at a certain stage of the reaction or allowing a reduced acid/mineral ratio, thereby reducing reaction time and improving reaction kinetics. For example, kinetic constant k can be: 0.5-0.75 g/mole·L. For example, leaching can be continuous leaching.

As previously indicated, alkali metals, iron, magnesium, sodium, calcium, potassium, rare earth elements and other elements will also be in a chloride form at different stages. Silica and optionally titanium can remain undissolved and will undergo (step 3) a liquid/solid separation and cleaning stage. The processes of the present disclosure tend to recover maximum amount of free hydrochloric acid left and chlorides in solution in order to maximize hydrochloric acid recovery yield, using techniques such as rake classifying, filtration with band filters, centrifugation, high pressure, rotofilters and others. Thanks to step 13, Ti contained in the solid obtained from step 3 can be treated so as to separate Si from Ti and thus obtain $SiO_2$ and $TiO_2$. Various possible strategies can be used to separated Si from Ti as previously indicated. For example, the solid can be further leached (for example with HCl in the presence of a metal chloride (for example $MgCl_2$ or $ZnCl_2$) so as to solubilize Ti (for example in the form of $TiCl_4$) while the Si remains solid. Alternatively, the solid can be reacted with $Cl_2$ (see FIGS. 9A and 9B). The purified silica can then optionally undergo one or two additional leaching stages (for example at a temperature of about 150 to about 160° C.) so as to increase the purity of silica above 99.9%.

Figure 9A:
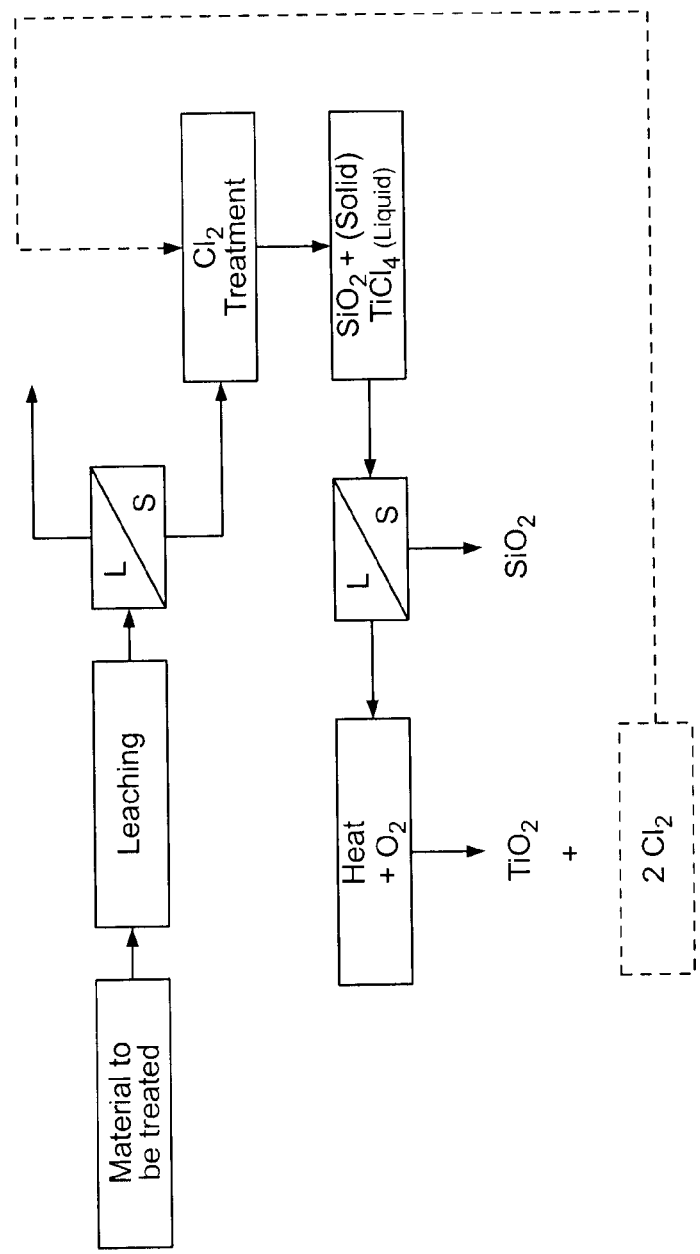
FIGS. 9A and 9B show further bloc diagrams of examples of processes according to the present disclosure.
Figure 9B:
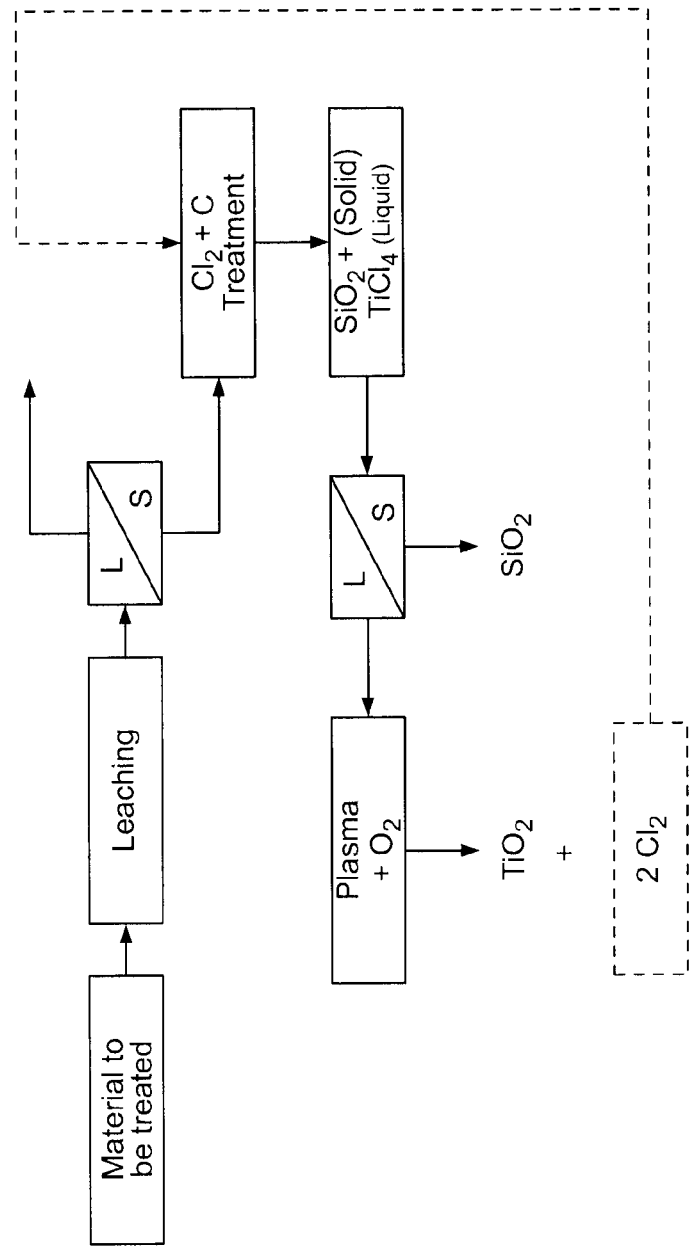

As previously indicated, if iron chloride generated in certain processes of the disclosure is to be treated by means of a pyrohydrolysis in order to generate $Cl_2$, the latter can eventually be used in the processes of FIGS. 9A and 9B as a source of $Cl_2$.

Pure $SiO_2$ (one additional leaching stage) cleaning with nano water purity 99% min. Mother liquor free of silica is then named as spent acid (various metal chlorides and water) and goes to the crystallization step (step 4). Free HCl and chlorides recovery can be at least 99, 99.5 or 99.9%

In step 4, the spent acid (or leachate) with a substantial amount of aluminum chloride is then saturated with dry and highly concentrated gaseous hydrogen chloride obtained or recycled from step 5 or with aqueous HCl>30% wt., which results in the precipitate of aluminum chloride hexahydrate (AlCl$_3$.6H$_2$O). The precipitate retained is then washed and filtered or centrifuged before being fed to the calcination stage (step 5). The remaining of the spent acid from step 4 is then processed to acid recovery system (steps 6 to 8) where pure secondary products will be obtained.

In step 5, aluminum oxide (alumina) is directly obtained from high temperature conditions. The highly concentrated hydrogen chloride in gaseous form obtained can be fed to steps 4 and 7 for crystallization where it can be treated through hydrophobic membranes. The excess hydrogen chloride is absorbed and used as regenerated acid to the leaching step 2 as highly concentrated acid, higher than the concentration at the azeotropic point (>20.2%). For example, such a concentration can be about 18 to about 45 weight %, about 25 to about 45 weight % or between 25 and 36 weight %. Acid can also be redirected in gas phase directly (>30 wt %) to acid purification.

After step 4, various chlorides derivatives (mainly iron with magnesium and rare earth elements and rare metals) are next subjected to an iron extraction step. Such a step can be carried out for example by using the technology disclosed in WO 2009/153321, which is hereby incorporated by reference in its entirety. Moreover, hematite can be seeded for crystal growth. For example, hematite seeding can comprise recirculating the seeding.

In step 6, a hydrolysis at low temperature (155-350° C.) is carried out and pure Fe$_2$O$_3$ (hematite) is being produced and hydrochloric acid of at least 15% concentration is being regenerated. The method as described in WO 2009/153321 is processing the solution of ferrous chloride and ferric chloride, possible mixtures thereof, and free hydrochloric acid through a series of steps pre-concentration step, oxidation step where ferrous chloride is oxidized into ferric form, and finally through an hydrolysis step into an operational unit called hydrolyser where the ferric chloride concentration is maintained at 65 weight % to generate a rich gas stream where concentration ensures a hydrogen chloride concentration of 15-20.2% and a pure hematite that will undergo a physical separation step. Latent heat of condensation is recovered to the pre-concentration and used as the heating input with excess heat from the calcination stage (step 5).

The mother liquor from the hydrolyser (step 6) can be recirculated partially to first step crystallization process where an increase in concentration of non-hydrolysable elements is observed. After iron removal, the liquor is rich in other non-hydrolysable elements and mainly comprises magnesium chloride or possible mixture of other elements (various chlorides) and rare earth elements and rare metals that are, for example, still in the form of chlorides.

Rare earth elements and rare metals in form of chlorides are highly concentrated, in percentage, into the hydrolyser operational unit (step 6) and are extracted from the mother liquor (step 10) where various known techniques can be employed to extract a series of individual RE-O (rare earth oxides). Among others, the processes of the present disclosure allows to concentrate to high concentration the following elements, within the hydrolyser: scandium (Sc), galium (Ga), yttrium (Y), dysperosium (Dy), cerium (Ce), praseodynium (Pr), neodynium (Nd), europium (Eu), lanthanum (La), samarium (Sm), gadolinium, (Gd), erbium (Er), zirconium (Zr) and mixtures of thereof. Technologies that can be used for extracting rare earth elements and/or rare metals can be found, for example, in Zhou et al. in RARE METALS, Vol. 27, No. 3, 2008, p 223-227, and in US 2004/0042945, hereby incorporated by reference in their entirety. The person skilled in the art will also understand that various other processes normally used for extracting rare earth elements and/or rare metals from the Bayer process can also be used. For example, various solvent extraction techniques can be used. For certain elements, a technique involving octylphenyl acid phosphate (OPAP) and toluene can be used. HCl can be used as a stripping agent. This can be effective for recovering Ce$_2$O$_3$, Sc$_2$O$_3$, Er$_2$O$_3$ etc. For example, different sequence using oxalic acid and metallic iron for ferric chloride separation can be used.

The spent acid liquor from steps 6 and 10 rich in value added metals, mainly magnesium, is processed to step 7. The solution is saturated with dry and highly concentrated gaseous hydrogen chloride from step 5, which results in the precipitation of magnesium chloride hexahydrate. For example, same can be accomplished with HCl in aqueous form over 30% wt. The precipitate retained, is fed to a calcination stage step 8 where pure MgO (>98% wt.) is obtained and highly concentrated hydrochloric acid (for example of at least 38%) is regenerated and diverted to the leaching step (step 2). An alternative route for step 7 is using dry gaseous hydrochloric acid from step 8.

In step 9, metal chlorides unconverted are processed to a pyrohydrolysis step (700-900° C.) to generate mixed oxides and where hydrochloric acid from 15-20.2% wt. concentration can be recovered.

Figure 3:
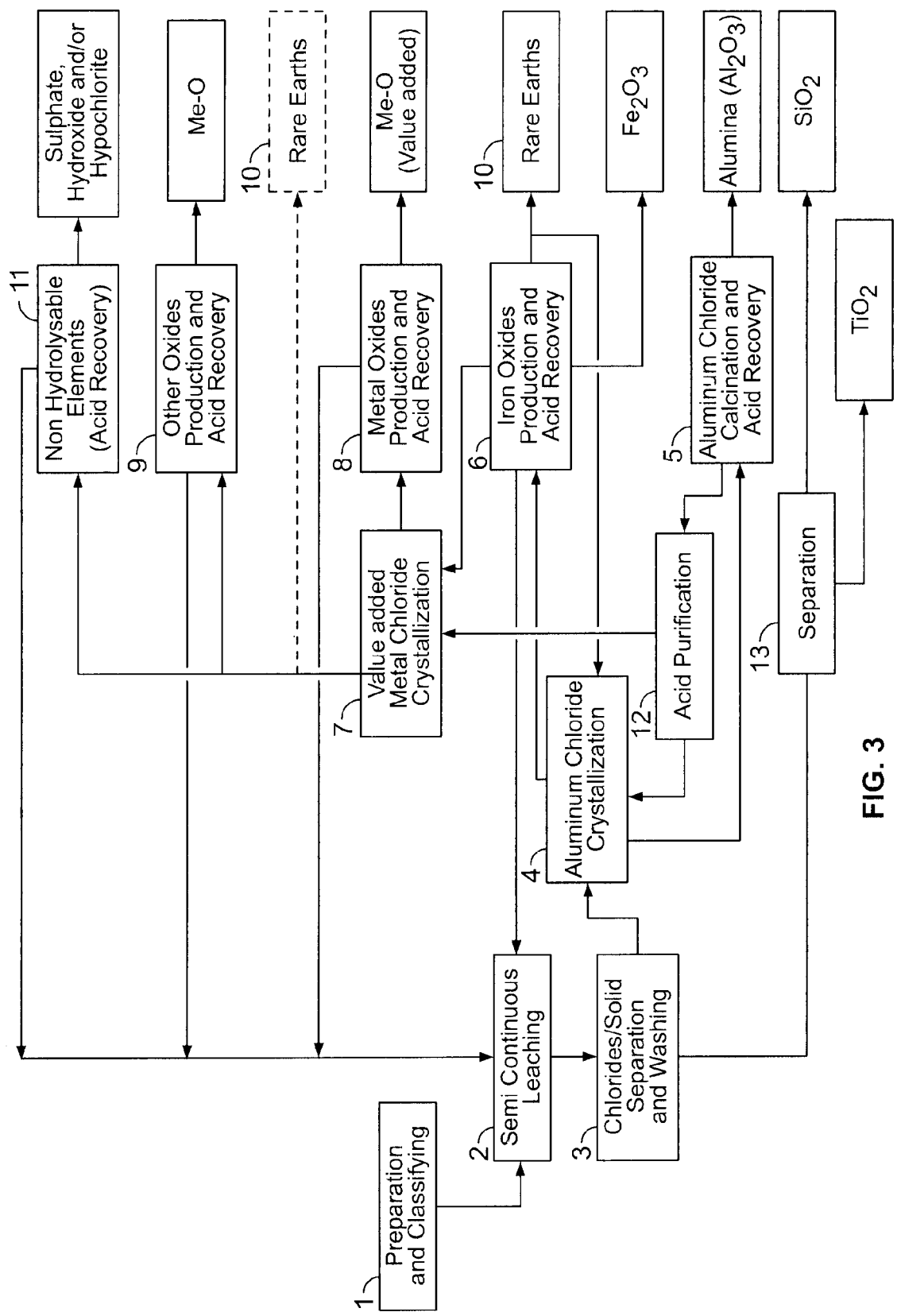
FIG. 3 shows a bloc diagram of another example of process for preparing alumina and various other products according to the present disclosure.

According to another example as shown in FIG. 3, the processes can be similar to the example shown in FIG. 1 but can comprise some variants as below discussed.

In fact, as shown in FIG. 3, the processes can comprise (after step 6 or just before step 10) an internal recirculation back to the crystallization step 4. In such a case, The mother liquor from the hydrolyser (step 6) can be recirculated fully or partially to the crystallization of step 4 where a concentration increase will occur with respect to the non-hydrolysable elements including rare earth elements and/or rare metals.

Such a step can be useful for significantly increasing the concentration of rare earth elements and/or rare metals, thereby facilitating their extraction in step 10.

With respect to step 7, the solution rich in magnesium chloride and other non-hydrolysable products at low temperature is, as previously discussed, then brought up in concentration with dry and highly concentrated gaseous hydrogen chloride by sparging it into a crystallizer. This can result into the precipitation of magnesium chloride as an hexahydrate (for example after sodium and potassium chloride removal). This can also be accomplished with HCl in aqueous form.

As shown in FIG. 3, an extra step 11 can be added. Sodium chloride can undergo a chemical reaction with sulfuric acid so as to obtain sodium sulfate and regenerate hydrochloric acid at a concentration at or above the azeotropic point. Potassium chloride can undergo a chemical reaction with sulfuric acid so as to obtain potassium sulfate and regenerate hydrochloric acid at a concentration above the azeotropic concentration. Sodium and potassium chloride brine solution can be the feed material to adapted small chlor-alkali electrolysis cells. In this latter case, common bases (NaOH and KOH) and bleach (NaOCl and KOCl) are produced and can be reused to some extent in other areas of the processes of the present disclosure (scrubber, etc.).

As previously indicated, if iron chloride is treated in stage 6 of FIG. 3 by means of a pyrohydrolysis under oxidizing conditions, Cl$_2$ will thus be produced and it can be used for treating the solid of stage 13. In such a case an arrow from box 6 towards box 13 can be inserted in FIG. 3 and the arrow from after box 6 to box 4 can be optionally removed.

Figure 6:
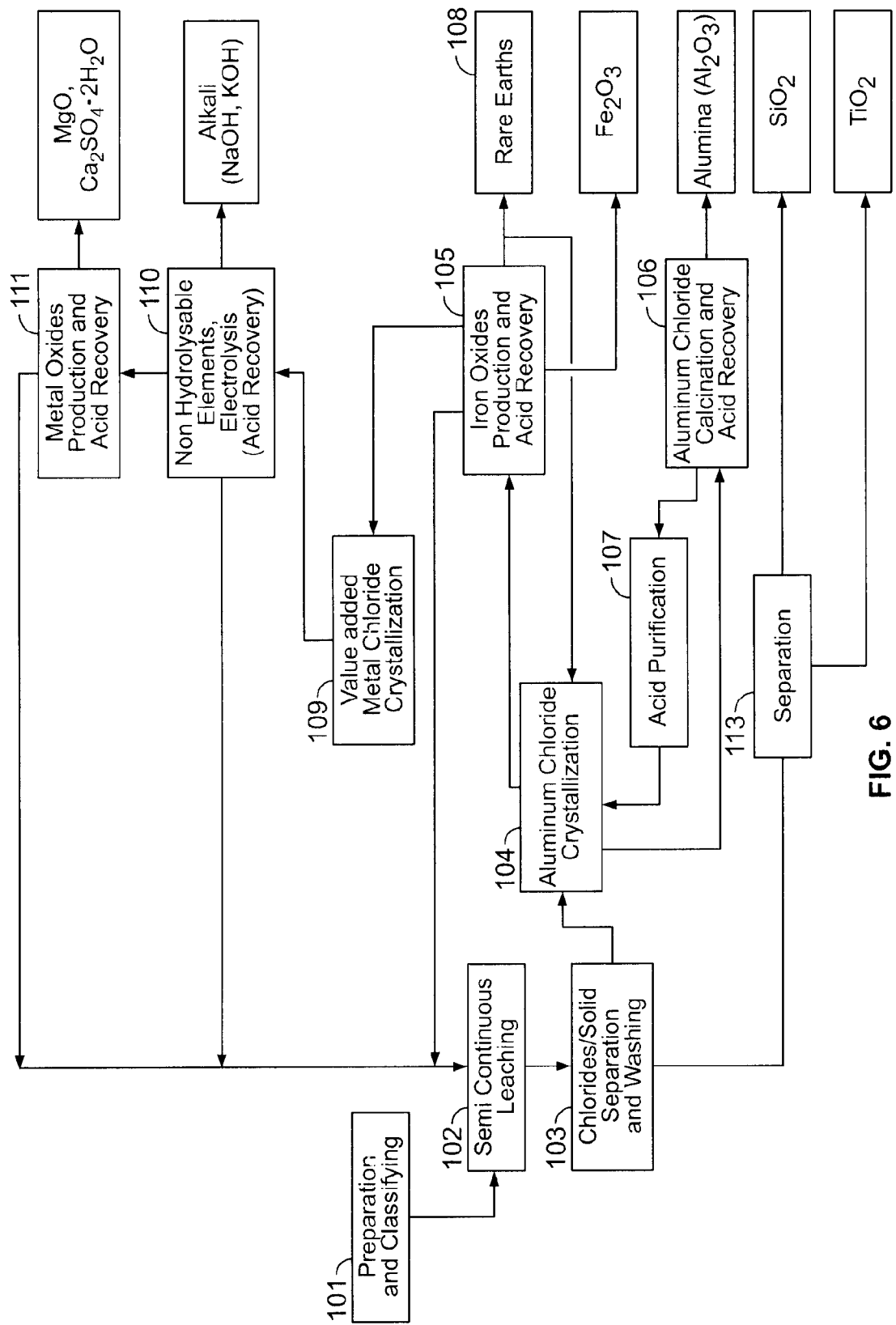
FIG. 6 shows another bloc diagram of an example of process for preparing alumina and various other products according to the present disclosure.
Figure 7:
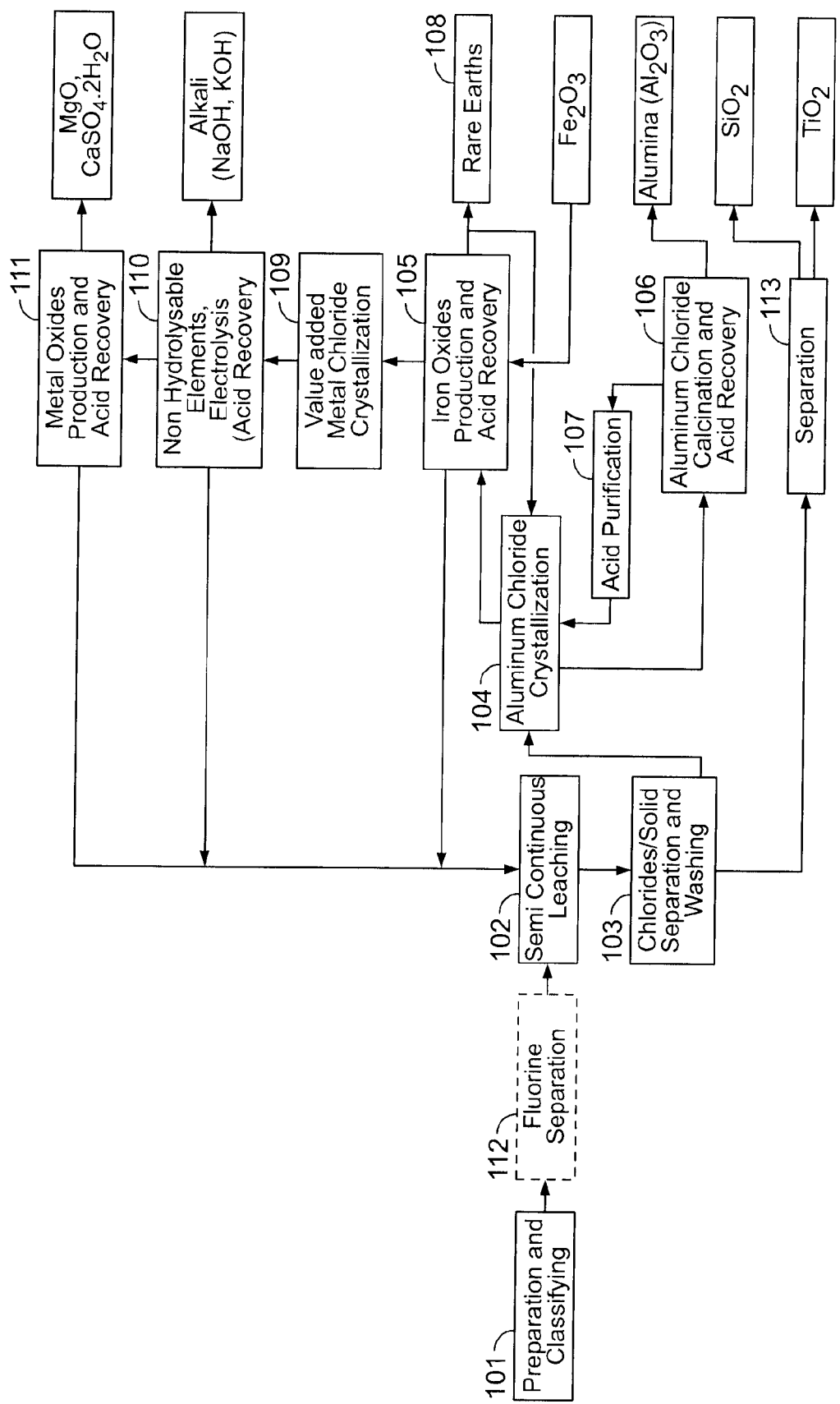
FIG. 7 shows another bloc diagram of an example of process for preparing alumina and various other products according to the present disclosure.

Similarly, for the processes of FIGS. 6 and 7, if iron chloride is treated in stage 105 by means of a pyrohydrolysis under oxidizing conditions, $Cl_2$ will thus be produced and it can be used for treating the solid of stage 113. In such a case an arrow from box 105 towards box 113 can be inserted in FIG. 3 and the arrow from after box 105 to box 104 can be optionally removed.

The following are non-limitative examples.

Example 1

Preparation of Alumina and Various Other Products

As a starting material a sample of clay was obtained from the Grande Vallee area in Québec, Canada.

These results represent an average of 80 tests carried out from samples of about 900 kg each.

Crude clay in the freshly mined state after grinding and classification had the following composition:
$Al_2O_3$: 15%-26%;
$SiO_2$: 45%-50%;
$Fe_2O_3$: 8%-9%;
MgO: 1%-2%;
Rare earth elements and/or rare metals: 0.04%-0.07%;
LOI: 5%-10%.

This material is thereafter leached in a two-stage procedure at 140-170° C. with 18-32 weight % HCl. The HCl solution was used in a stoichiometric excess of 10-20% based on the stoichiometric quantity required for the removal of the acid leachable constituents of the clay. In the first leaching stage of the semi-continuous operation (step 2), the clay was contacted for 2.5 hours with required amount or certain proportion of the total amount of hydrochloric acid. After removal of the spent acid, the clay was contacted again with a minimum 18 weight % hydrochloric acid solution for about 1.5 hour at same temperature and pressure.

Figure 2:
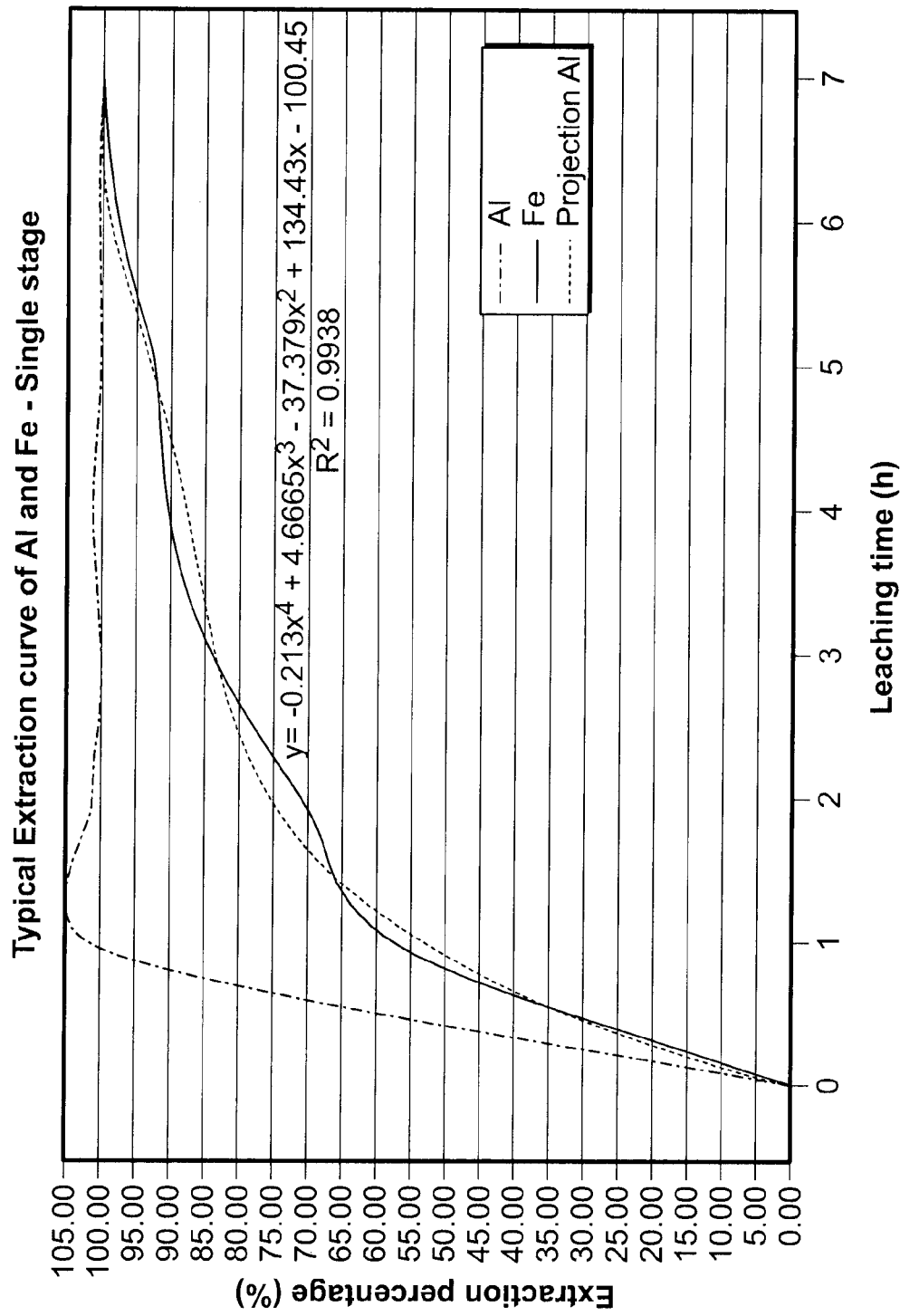
FIG. 2 is an extraction curve for Al and Fe in which the extraction percentage is expressed as a function of a leaching time in a process according to an example of the present application.

A typical extraction curve obtained for both iron and aluminum for a single stage leaching is shown in FIG. 2.

The leachate was filtered and the solid was washed with water and analyzed using conventional analysis techniques (see step 3 of FIG. 1). Purity of obtained silica was of 95.4% and it was free of any chlorides and of HCl.

In another example, the purity of the silica was 99.67% through an extra leaching step.

After the leaching and silica removal, the concentration of the various metal chlorides was:
$AlCl_3$: 15-20%;
$FeCl_2$: 4-6%;
$FeCl_3$: 0.5-2.0%;
$MgCl_2$: 0.5-2.0%;
REE-Cl: 0.1-2%
Free HCl: 5-50 g/l Spent acid was then crystallized using about 90 to about 98% pure dry hydrochloric acid in gas phase in two stages with less than 25 ppm iron in the aluminum chloride hexahydrate formed. The concentration of HCl in solution (aqueous phase) was about 22 to about 32% or 25 to about 32%, allowing 95.3% of $Al_2O_3$ recovery. The recovered crystallized material (hydrate form of $AlCl_3$ having a minimum purity of 99.8%) was then calcined at 930° C. or 1250° C., thus obtaining the α form of the alumina. Heating at 930° C. allows for obtaining the beta-form of alumina while heating at 1250° C. allows for obtaining the alpha-form.

Another example was carried out at low temperature (decomposition and calcination at about 350° C.) and the α form of the alumina was less than 2%.

HCl concentration in gas phase exiting the calcination stage was having a concentration greater than 30% and was used (recycled) for crystallization of the $AlCl_3$ and $MgCl_2$. Excess of hydrochloric acid is absorbed at the required and targeted concentration for the leaching steps.

Iron chloride (about 90-95% in ferric form) is then sent to a hydrothermal process in view of its extraction as pure hematite ($Fe_2O_3$). This can be done by using the technology described in WO 2009/153321 of low temperature hydrolysis with full heat recovery from calcining, pyrohydrolysis and leaching stage.

Rare earth elements and rare metals are extracted from the mother liquor of the hydrolyzer where silica, aluminum, iron and a great portion of water have been removed and following preconcentration from hydrolyser to crystallization. It was observed that rare earth elements can be concentrated by a factor of about 4.0 to 10.0 on average within the hydrolyzer itself on a single pass through it i.e. without concentration loop. The following concentration factors have been noted within the hydrolyzer (single pass):
Ce>6
La>9
Nd>7
Y>9

Remaining magnesium chloride is sparged with dry and highly concentrated hydrochloric acid and then calcinated to MgO while recovering high concentration acid (for example up to 38.4%).

Mixed oxides (Me-O) containing other non-hydrolysable components were then undergoing a pyrohydrolysis reaction at 700-800° C. and recovered acid (15-20.2% wt.) was rerouted for example to the leaching system.

Overall Yields Obtained:
$Al_2O_3$: 93.0-95.03% recovery;
$Fe_2O_3$: 92.65-99.5% recovery;
Rare earth elements: 95% minimum recovery (mixture);
MgO: 92.64-98.00% recovery;
Material discarded: 0-5% maximum;
HCl global recovery: 99.75% minimum;
HCl strength as feed to leaching 15-32% (aqueous); 95% (gas)
Red mud production: none.

Example 2

Preparation of Alumina and Various Other Products

A similar feed material (bauxite instead of clay) was processed as per in example 1 up to the leaching stage and revealed to be easily leachable under the conditions established in example 1. It provided an extraction percentage of 100% for the iron and over 90-95% for aluminum. The technology was found to be economically viable and no harmful by-products (red mud) were generated. Samples tested had various concentrations of $Al_2O_3$ (up to 51%), $Fe_2O_3$ (up to 27%) and MgO (up to 1.5%). Gallium extraction of 97.0% was observed. Scandium extraction was 95%.

Example 3

HCl Gas Enrichment and Purification $H_2SO_4$ Route $H_2SO_4$ can be used for carrying out purification of HCl. It can be carried out by using a packing column with $H_2SO_4$ flowing counter currently (see FIG. 4). This allows for converting the recovered HCl into HCl having a concentration above the azeotropic point (20.1% wt) and increase its concentration by about 60 to about 70% at minimum.

Water is absorbed by $H_2SO_4$ and then $H_2SO_4$ regeneration is applied where $H_2SO_4$ is brought back to a concentration of about 95 to about 98% wt. Water release at this stage free of sulphur is recycled back and used for crystallization dissolution, etc. Packing of the column can comprise polypropylene or polytrimethylene terephthalate (PTT).

Combustion energy can be performed with off gas preheating air and oxygen enrichment. Oxygen enrichment: +2% represents flame temperature increase by: 400° C. maximum.

Thus, HCl of the processes of the present disclosure can thus be treated accordingly.

Example 4

HCl Gas Enrichment and Purification

Calcium Chloride to Calcium Chloride Hexahydrate (Absorption/Desorption Process)

Figure 4:
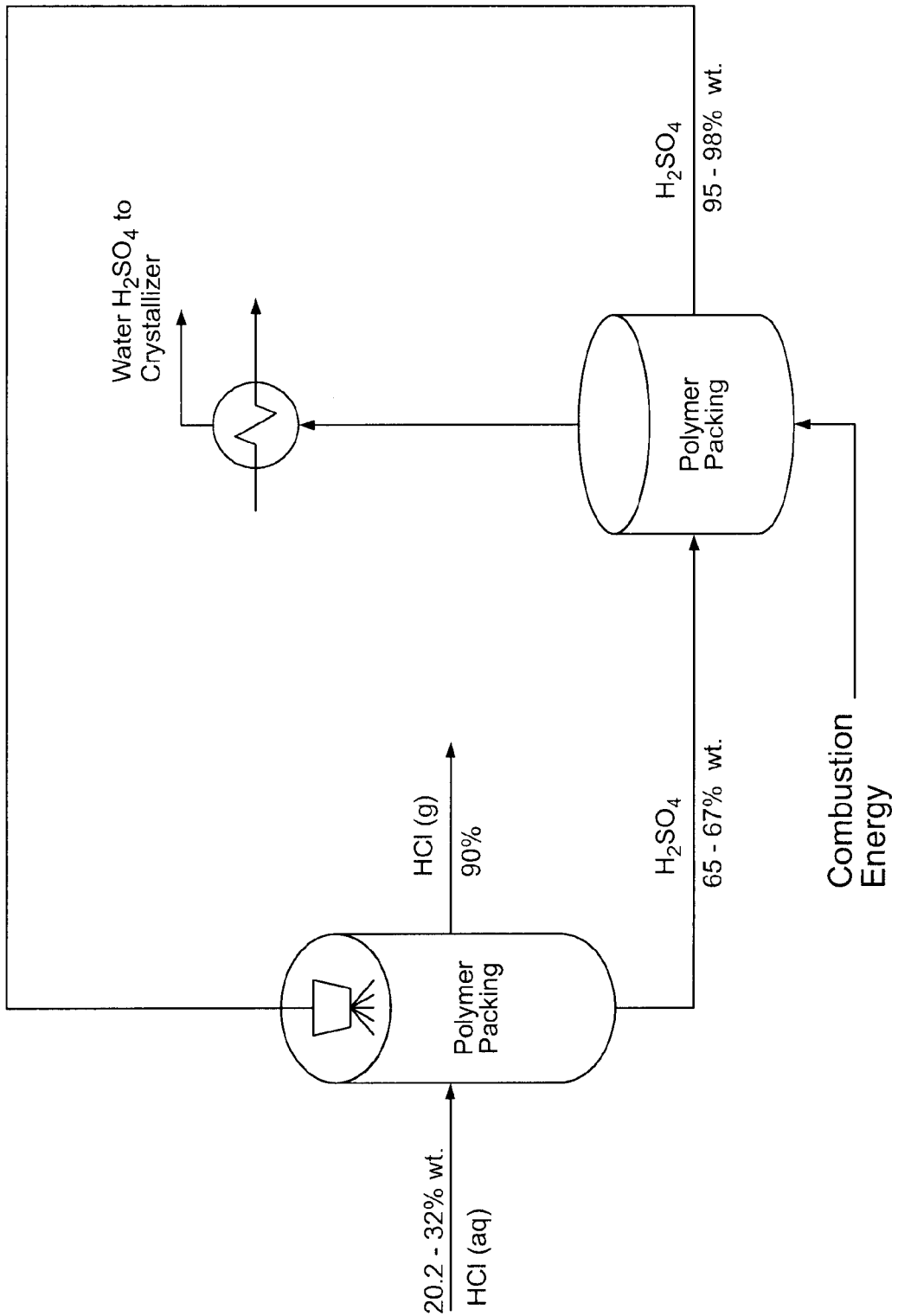
FIG. 4 is a schematic representation of an example of a process for purifying/concentrating HCl according to the present disclosure.
Figure 5:
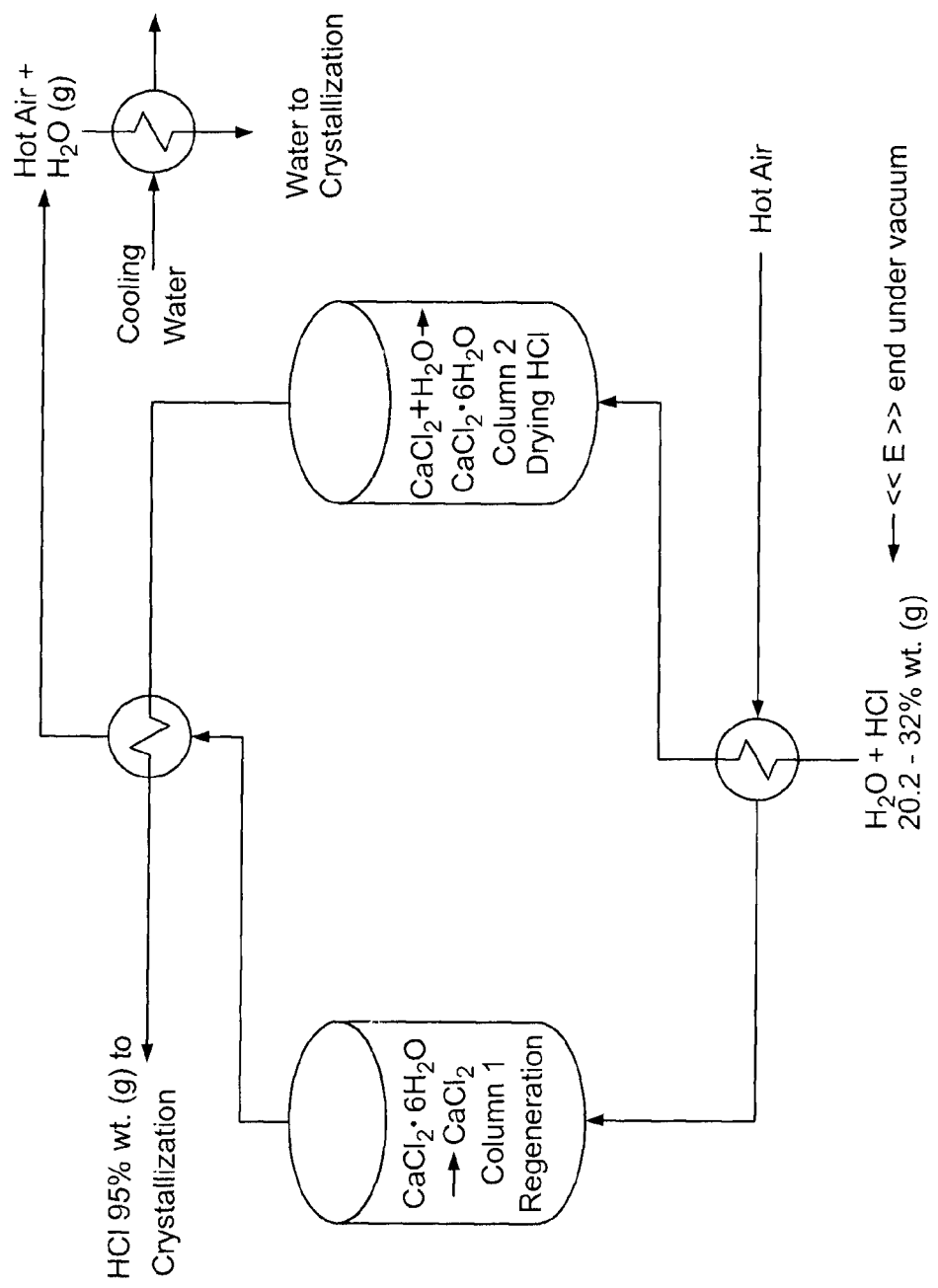
FIG. 5 is a schematic representation of an example of a process for purifying/concentrating HCl according to the present disclosure.

As shown in FIG. 5, $CaCl_2$ can be used for drying HCl. In fact, $CaCl_2$ can be used for absorbing water contained into HCl. In such a case, $CaCl_2$ is converted into its hexachloride form ($CaCl_2.6H_2O$) and one saturated system is eventually switched into regeneration mode where hot air recovered from calcination off gas of alumina and magnesium oxide spray roasting is introduced to regenerate the fixed bed. Alternatively, other absorbing agent such as LiCl can be used instead of $CaCl_2$. Such an ion/exchange type process can be seen in FIG. 4 and the cycle can be inversed to switch from one column to another one.

The person skilled in the art would understand that the processes described in examples 3 and 4 (see FIGS. 4 and 5) can be used in various different manners. For example, these processes can be combined with the various processes presented in the present disclosure. For example, such purifications techniques can be integrated to the processes shown in FIGS. 1, 3 and 6 to 8. For example, these techniques can be used downstream of at least one of step chosen from steps 5, 6, 8, 9, 10, 11, 13 and 20 (see FIGS. 1, 3 and 8). They can also be used downstream of step 4 and/or step 7. They can also be used downstream of at least one of step chosen from steps 104 to 111 (see FIGS. 6 and 7).

Example 5

Preparation of Alumina and Various Other Products

This example was carried out by using a process as represented in FIGS. 6 and 7. It should be noted that the processes represented in FIGS. 6 and 7 differ mainly by the fact that FIG. 7 shows an extra stage i.e. stage 112.

Raw Material Preparation

Raw material, clay for example, was processed in a secondary crusher in the clay preparation plant 101. Dry milling and classifying occurs on a dry basis in vertical roller mills (for example Fuller-Loesche LM 30.41). The clay preparation 101 included three roller mills; two running at a capacity of approximately 160-180 tph and one on standby. Raw material, if required, can be reduced to 85% less than 63 microns. Processed material was then stored in homogenization silos before being fed to the acid leaching plant 102. Below in Table 1 are shown results obtained during stage 101. If the ore contains the fluorine element, a special treatment can be applied before carrying out the 102 stage. In presence of hydrochloric acid, fluorine can produce hydrofluoric acid. This acid is extremely corrosive and damaging for human health. Thus, before leaching 102, an optional treatment fluorine separation 112 can be done. Stage 112 can comprise treating the processed material coming from stage 101 with an acid in a pre-leaching treatment so as to remove hydrofluoric acid. Therefore, depending on the composition of the raw material, a fluorine separation stage 112 (or pre-leaching stage 112) can be carried out.

TABLE 1

| Clay preparation | | |
|---|---|---|
| Rate | 290 tph | |
| Composition feed (main constituents) | $SiO_2$: | 50.9% |
| | $Al_2O_3$: | 24.0% |
| | $Fe_2O_3$: | 8.51% |
| | CaO: | 0.48% |
| | MgO: | 1.33% |
| | $Na_2O$: | 1.06% |
| | $K_2O$: | 2.86% |
| | MnO: | 0.16% |
| | $Cr_2O_3$: | 0.01% |
| | $TiO_2$: | 0.85% |
| | $P_2O_5$: | 0.145% |
| | SrO: | 0.015% |
| | BaO: | 0.05% |
| | $V_2O_5$ | 0.0321% |
| | Other (including $H_2O$ and REE): | 9.63% |
| Obtained particle size | 85% < 63 μm | |
| Residual moisture | 0.5-0.7% | |
| Yield | 99.5% min | |

Acid Leaching

Next, acid leaching 102 was performed semi-continuously in an 80 m³ glass-lined reactor. Semi-continuous mode comprises replacing reacted acid 1/3 in the reaction period with higher concentration regenerated acid, which greatly improves reaction kinetics. The reactor arrangement comprises for example, a series of three reactors. Other examples have been carried out with a first leaching at 1 atm was carried out and then, a second and third semi-continuous or continuous leaching was carried out with aqueous or gaseous HCl.

Leaching was performed at high temperature and pressure (about 160 to about 195° C. and pressures of about 5 to about 8 barg) for a fixed period of time. Reaction time was a function of the reaction extent targeted (98% for $Al_2O_3$), leaching mode, acid strength, and temperature/pressure applied.

Spent acid recovered out of the acid leaching 102 was then filtered 103 from unreacted silica and titanium dioxide and washed through an automated filter press where all free HCl and chloride are recovered. Step 113 can then be carried out in various manners as indicated previously for step 13. This allows, for example, a maximum quantity of about 30 ppm $SiO_2$ going into spent liquor. Cleaned silica at a concentration of ≈96%+$SiO_2$ is then produced. Various options are possible at that point. For example, the 96% silica can undergo final neutralization through caustic bath, cleaning, and then bricketing before storage. According to another example, the silica purified by adding another leaching step followed by a solid separation step that ensures $TiO_2$ removal (see stage 113 in FIGS. 6 and 7). In that specific case, high purity silica 99.5%+ is produced. In stage 113, titanium and silicium can be separated from one another in various manners. For example, the solid obtained from stage 103 can be leached in the presence of $MgCl_2$ at a temperature below 90 or 80° C. and at low acid concentration. For example, acid concentration can be below 25 or 20%. The acid can be HCl or $H_2SO_4$. In such a case, titanium remains soluble after such a leaching while titanium is still in a solid form. The same also applies when the solid is treated with $Cl_2$. These solid and liquid obtained after stage 113 are thus separated to provide eventually $TiO_2$ and $SiO_2$. Water input and flow for silica cleaning is in a ratio of 1:1 (silica/water) (150 t/h $SiO_2$/150 t/h $H_2O$), but comprises of wash water circulation in closed loop in the process and limited amount of process water for final cleaning of the silica and recovery of all chlorides and free HCl generated at the leaching stage. Below in Table 2 are shown results obtained during stage 102.

TABLE 2

| | Acid Leaching |
|---|---|
| Equivalent solid feed rate | 259.6 tph |
| Operation mode | Semi-continuous |
| Acid to clay ratio | 3.10 @ 23% wt (Equivalent to 3.35 with semi-continuous at 18.0% wt) |
| Regenerated acid concentration | 18.0-32.0% |
| Operating temperature | 150-155° C. (Pilot) 165-200° C. (Plant) |
| MAWP | 120 psig |
| Typical chemical reactions | $Fe_2O_3 + 6HCl \rightarrow 2FeCl_3 + 3H_2O$ $Al_2O_3 + 6HCl \rightarrow 2AlCl_3 + 3H_2O$ $MgO + 2HCl \rightarrow MgCl_2 + H_2O$ $K_2O + 2HCl \rightarrow 2KCl + H_2O$ $Re_2O_3 + 6HCl \rightarrow 2ReCl_3 + 3H_2O$ |
| Spent acid flow to crystallization | 600-1100 m³/h |
| Practical chemical composition after step 102 without solid ($SiO_2$) | $FeCl_3$ 4.33% $FeCl_2$ 0.19% $AlCl_3$ 16.6% $MgCl_2$ 0.82% NaCl 1.1% KCl 1.2% $CaCl_2$ 0.26% |
| Extraction yields | Iron 100% $Al_2O_3$ 98% |
| $SiO_2$ Recovery | 99.997% |
| Energy consumption | Activation energy only and self-sustained exothermic reaction from 130° C. |

$AlCl_3$ Crystallization

Spent acid, with an aluminum chloride content of about 20 to about 30%, was then processed in the crystallization stage 104. Dry and highly concentrated HCl (>90% wt.) in gas phase was sparged in a two-stage crystallization reactor, which allows the crystallization of aluminum chloride hexahydrate.

The flow rate of acid through these reactors is about 600 to about 675 m³/h and the reactor was maintained at about 50 to about 60° C. during this highly exothermic reaction. Heat was recovered and exchanged to the acid purification 107 part of the plant thus ensuring proper heat transfer and minimizing heat consumption of the plant. Aluminum chloride solubility decreases rapidly, compared to other elements, with the increase in concentration of free HCl in the crystallization reactor. The concentration of $AlCl_3$ for precipitation/crystallization was about 30%

The HCl concentration during crystallization was thus about 30 to about 32% wt.

The aqueous solution from the crystallization stage 104 was then submitted to the hydrothermal acid recovery plant 105, while the crystals are processed through the decomposition/calcination stage in the calcination plant 106.

A one-step crystallization stage or a multi-step crystallization stage can be done. For example, a two-steps crystallization stage can be carried out.

Below in Tables 3A and 3B are shown results obtained during stage 104.

TABLE 3A

| Aluminum chloride crystallization | |
|---|---|
| Number of crystallization steps | 2 |
| Operating temperature | 50-60° C. |
| Sparging HCl concentration | 90% (gaseous) |
| Typical chemicals formed | $AlCl_3 \cdot 6H_2O$ (s) Metal chlorides (aq) |
| $AlCl_3 \cdot 6H_2O$ residual | <5% (practical); 8% |

TABLE 3B

| Typical crystals composition main constituents obtained at pilot scale and feeding calcination | |
|---|---|
| Component | Weight distribution (%) |
| $AlCl_3 \cdot 6H_2O$ | 99.978 |
| $BaCl_2 \cdot 2H_2O$ | 0.0000 |
| $CaCl_2 \cdot 6H_2O$ | 0.0009 |
| $CrCl_4$ | 0.0022 |
| $CuCl_2 \cdot 2H_2O$ | 0.0000 |
| $FeCl_3 \cdot 6H_2O$ | 0.0019 |
| KCl | 0.0063 |
| $MgCl_2 \cdot 6H_2O$ | 0.0093 |
| $MnCl_2 \cdot 4H_2O$ | 0.0011 |
| NaCl | 0.0021 |
| $SiCl_4$ | 0.0004 |
| $SrCl_2 \cdot 6H_2O$ | 0.0000 |
| $TiCl_4$ | 0.0001 |
| $VCl_4$ | 0.0000 |
| Free $Cl^-$ | 0.0000 |

Calcination and Hydrothermal Acid Recovery

The calcination 106 comprises the use of a two-stage circulating fluid bed (CFB) with preheating systems. The preheating system can comprise a plasma torch to heat up steam to process. It processes crystals in the decomposition/calcination stage. The majority of the hydrochloric acid was released in the first stage which was operated at a temperature of about 350° C., while the second stage performs the calcination itself. Acid from both stages (about 66 to about 68% of the recovered acid from the processes) was then recovered and sent to either to the acid leaching 102 or to the acid purification 107. In the second reactor, which was operated at a temperature of about 930° C., acid was recovered through the condensation and absorption into two columns using mainly wash water from the acid leaching sector 102. Latent heat from this sector was recovered at the same time as large amounts of water, which limits net water input.

In the iron oxides productions and acid recovery 105 system, which comprises, aqueous solution from the crystallization 104 first undergoes a pre-concentration stage followed by processing in the hydrolyzer reactor. Here, hematite was produced during low temperature processing (about 165° C.). A recirculation loop was then taken from the hydrolyzer and is recirculated to the pre-concentrator, allowing the concentration of REE, Mg, K, and other elements. This recirculation loop, allows rare earth element chlorides and/or rare metal chlorides and various metal chlorides concentration to increase without having these products precipitating with hematite up to a certain extent.

Depending on acid balance in the plant, recovered acid is sent either directly to the 102 or 107 stage. Table 4 shows results obtained in stage 105.

TABLE 4

Hydrothermal acid recovery

| | |
|---|---|
| Flowrate from crystallization to HARP | 592 m³/h (design) |
| | 600 m³/h (design) |
| Operating hydrolyser temperature | 155-170° C. |
| Regenerated acid concentration | 27.4% |
| Regenerated acid flowrate | 205.2 tph HCl |
| Hematite total production rate | 24 TPH (design) |
| HCl recovery | <99.8% |
| Reflux (recirculation loop) rate in between hydrolyzer and pre-concentrator | 56 tph |
| Rare earth element chlorides and/or rare metal chlorides rate in recirculation loop | ≈12.8 t/h |

Hematite quality obtained and/or projected

| | |
|---|---|
| $Fe_2O_3$ purity | >99.5% |
| Hydrolysable chlorides | <0.2% |
| Moisture | Max 20% after filtration |
| PSD | 25-35 microns |
| Density (bulk) | 2-3 kg/l |

Typical chemical reaction in stage 105

$$2FeCl_3 + 3H_2O \rightarrow Fe_2O_3 + 6HCl$$
$$155\text{-}170° C.$$

Table 5 shows results obtained in stage 106.

TABLE 5

Calcination Plant 106

| | |
|---|---|
| Process characteristics: | Two-stage circulating fluid bed (CFB) with pre-heating system |
| | Two-stage hydrochloric acid regeneration |
| Production rate (practical) | About 66 tph |
| CFB feed rate | 371 tph @ 2-3% humidity* |

Typical chemical reaction occurring $$2(AlCl_3 \cdot 6H_2O) + Energy \rightarrow Al_2O_3 + 6HCl + 9H_2O$$

Typical alumina chemical composition obtained from aluminum chloride hexahydrate crystals being fed to calcination

| Component | Weight distribution (%) |
|---|---|
| $Al_2O_3$ | 99.938 |
| $Fe_2O_3$ | 0.0033 |
| $SiO_2$ | 0.0032 |
| $Cr_2O_3$ | 0.0063 |
| $V_2O_5$ | 0.0077 |
| Na | 0.0190 |
| MgO | 0.0090 |
| $P_2O_5$ | 0.0039 |
| K | 0.0053 |
| Ca | 0.0020 |
| MnO | 0.0002 |
| Free $Cl^-$ | Undetectable |

Rare Earth Elements and Rare Metals Extractions

The stream that was taken out of 105 recirculation then was treated for rare earth elements and are metals extraction 108, in which the reduction of the remaining iron back to iron 2 ($Fe^{2+}$), followed by a series of solvent extraction stages, was performed. The reactants were oxalic acid, NaOH, DEHPA (Di-(2-ethylhexyl)phosphoric acid) and TBP (tri-n-butyl phosphate) organic solution, kerosene, and HCl were used to convert rare earth element chlorides and rare metals chlorides to hydroxides. Countercurrent organic solvent with stripping of solution using HCl before proceeding to specific calcination from the rare earth elements and rare metals in form of hydroxide and conversion to high purity individual oxides. A ion exchange technique is also capable of achieving same results as polytrimethylene terephtalate (PET) membrane.

Iron powder from 105, or scrap metal as FeO, can be used at a rate dependent on $Fe^{3+}$ concentration in the mother liquor. HCl (100% wt) at the rate of 1 tph can be required as the stripped solution in REE Solvent Extraction (SX) separation and re-leaching of rare earth elements and/or rare metals oxalates.

Water of very high quality, demineralized or nano, at the rate of 100 tph was added to the strip solution and washing of precipitates.

Oxalic acid as di-hydrate at a rate of 0.2 tph was added and contributes to the rare earth elements and rare metals oxalates precipitation. NaOH or MgOH at a rate of 0.5 tph can be used as a neutralization agent.

DEHPA SX organic solution at the rate of 500 g/h was used as active reagent in rare earth elements separation while TBP SX organic solution at the rate of 5 kg/h is used as the active reagent for gallium recovery and yttrium separation. Finally, a kerosene diluent was used at the rate of approximately 2 kg/h in all SX section. Calcination occurs in an electric rotary furnace via indirect heating to convert contents to $REE_2O_3$ (oxides form) and maintain product purity.

Results of various tests made regarding stage 108 are shown in Table 6.

One line divided in subsections (5) to isolate the following elements using solvent extraction:

$Ga_2O_3$
$Y_2O_3$
$Sc_2O_3$
$Eu_2O_3+Er_2O_3+Dy_2O_3$
$Ce_2O_3+Nd_2O_3+Pr_2O_3$

| Equivalent output earths oxides 166.14 kg/h | | |
|---|---|---|
| Projected production as per pilot testing results | | |
| Feed | Incoming (kg/h) | Final extraction individual (kg/h) |
| $Ga_2O_3$ | 15.66 | 11.98 |
| $Sc_2O_3$ | 9.06 | 8.11 |
| $Y_2O_3$ | 22.56 | 20.22 |
| $La_2O_3$ | 32.24 | 25.67 |
| $Ce_2O_3$ | 61.37 | 51.82 |
| $Pr_2O_3$ | 8.08 | 6.18 |
| $Nd_2O_3$ | 30.3 | 27.24 |
| $Sm_2O_3$ | 5.7 | 4.51 |
| $Eu_2O_3$ | 1.06 | 0.95 |
| $Gd_2O_3$ | 4.5 | 4.06 |
| $Dy_2O_3$ | 3.9 | 3.55 |
| $Er_2O_3$ | 2.1 | 1.86 |
| Total | 196.55 | 166.14 |

Global Yield: 84.53%

Alternatively, stage 108 can be carried out as described in WO/2012/126092 and/or WO/2012/149642, that are hereby incorporated by reference in their entirety.

The solution after stages 108 and 109 contained mainly $MgCl_2$, NaCl, KCl, $CaCl_2$, $FeCl_2/FeCl_3$, and $AlCl_3$ (traces), and then undergoes the 111 stage. Na, K, Ca that follows the MgO can be extracted in stage 110 by crystallization in a specific order; Na first, followed by K, and then Ca. This technique can be employed for example in the Israeli Dead Sea salt processing plant to produce MgO and remove alkali from the raw material.

HCl Regeneration

Alkali (Na, K), once crystallized, was sent and processed in the alkali hydrochloric acid regeneration plant 110 for recovering highly concentrated hydrochloric acid (HCl). The process chosen for the conversion can generate value-added products Various options are available to convert NaCl and KCl with intent of recovering HCl. One example can be to contact them with highly concentrated sulfuric acid ($H_2SO_4$), which generates sodium sulphate ($Na_2SO_4$) and potassium sulfate ($K_2SO_4$), respectively, and regenerates HCl at a concentration above 90% wt. Another example, is the use of a sodium and potassium chloride brine solution as the feed material to adapted small chlor-alkali electrolysis cells. In this latter case, common bases (NaOH and KOH) and bleach (NaOCl and KOCl) are produced. The electrolysis of both NaCl and KCl brine is done in different cells where the current is adjusted to meet the required chemical reaction. In both cases, it is a two-step process in which the brine is submitted to high current and base (NaOH or KOH) is produced with chlorine ($Cl_2$) and hydrogen ($H_2$). $H_2$ and $Cl_2$ are then submitted to a common flame where highly concentrated acid in gas (100% wt.) phase is produced and can be used directly in the crystallization stage 104, or to crystallization stages requiring dry highly concentrated acid.

Magnesium Oxide

The reduced flow, which was substantially free of most elements (for example $AlCl_3$, $FeCl_3$, REE-Cl, NaCl, KCl) and rich in $MgCl_2$, was then submitted to the magnesium oxides plant 111. In the MgO, pyrohydrolysis of $MgCl_2$ and any other leftover impurities were converted into oxide while regenerating acid. The first step was a pre-evaporator/crystallizer stage in which calcium is removed and converted into gypsum ($CaSO_4.2H_2O$) by a simple chemical reaction with sulfuric acid, for which separation of MgO is required. This increases the capacity of MgO roasting and also energy consumption slightly, while substantially recovering HCl. The next step was the specific pyrohydrolysis of MgO concentrated solution by spray roasting. Two (2) main products were generated; MgO that was further treated and HCl (about 18% wt.), which was either recycled back to the upstream leaching stage 102 or to the hydrochloric acid purification plant (107) The MgO-product derived from the spray roaster can require further washing, purification, and finally calcining depending on the quality targeted. The purification and calcining can comprise a washing-hydration step and standard calcining step.

The MgO from the spray roaster is highly chemically active and was directly charged into a water tank where it reacts with water to form magnesium hydroxide, which has poor solubility in water. The remaining traces of chlorides, like $MgCl_2$, NaCl, dissolved in water. The $Mg(OH)_2$ suspension, after settling in a thickener, was forwarded to vacuum drum filters, which remove the remaining water. The cleaned $Mg(OH)_2$ is then forwarded into a calcination reactor where it is exposed to high temperatures in a vertical multi-stage furnace. Water from hydration is released and allows the transformation of the $Mg(OH)_2$ to MgO and water. At this point, the magnesium oxide was of high purity (>99%).

HCl Purification

The hydrochloric acid purification stage 107 is effective for purifying HCl regenerated from different sectors (for example 105, 106, 111) and to increase its purity for crystallization, whereas dry highly concentrated acid (>90% wt.) can be used as the sparging agent. Stage 107 also allowed for controlling the concentration of the acid going back to stage 102 (about 22 to about 32% wt.) and allows total acid and water balance. Total plant water balance is performed mainly by reusing wash water as absorption medium, as quench agent or as dissolution medium at the crystallization stages.

For example, HCl purification can be carried out as shown in FIGS. 4 and 5.

For example, purification can be carried out by means of a membrane distillation process. The membrane distillation process applied here occurs when two aqueous liquids with different temperatures are separated through a hydrophobic membrane. The driving force of the process was supplied by the partial pressure vapour difference caused by the temperature gradient between these solutions. Vapour travels from the warm to the cold side. Without wishing to be bound to such a theory, the separation mechanism was based on the vapour/liquid equilibrium of the HCl/water liquid mixture. Practical application of such a technology has been applied to HCl/water, $H_2SO_4$/water systems and also on large commercial scales on aqueous solution of sodium chloride with the purpose of obtaining potable water from seawater and nano water production. Therefore membrane distillation was a separation process based on evaporation through a porous hydrophobic membrane. The process was performed at about 60° C. and was effective to recover heat from the 104 and 102 stage with an internal water circulation loop, in order to maintain a constant incoming temperature to the membranes. For example, eight membranes of 300,000 $m^2$ equivalent surface area can be used per membrane to obtain a concentration of HCl well above the azeotropic point (i.e. >36%) of the ≈750 $m^3$/h and final 90% concentration is then obtained through pressure distillation (rectification column).

Purification of HCl by processing thus regenerated acid through hydrophobic membrane and separating water from HCl; therefore increasing HCl concentration up to about 36% (above azeotropic point) and therefore allowing with a single stage of rectification through a pressure stripping column to obtain >90% in gaseous phase, for crystallization stage (sparging); and therefore controlling acid concentration into crystallization stages up to 30-35%$_{(aq)}$.

As indicated stage 107 was operated at about 60° C. and heat input provided by heat recovery from stages 102 to 110. Rectification column was operated at about 140° C. in the reboiler part. Net energy requirement was neutral (negative in fact at −3.5 Gj/t $Al_2O_3$) since both systems were in equilibrium and in balance.

For example, the acid purification can be carried out by using adsorption technology over an activated alumina bed. In continuous mode, at least two adsorption columns are required to achieve either adsorption in one of them and regeneration in the other one. Regeneration can be performed by feeding in counter-current a hot or depressurized gas. This technology will result in a purified gas at 100% wt.

For example, the acid purification can be made by using calcium chloride as entrainer of water. A lean hydrochloric acid solution is contacted with a strong calcium chloride solution through a column. The water is then removed from the hydrochloric acid solution and 99.9% gaseous HCl comes out of the process. Cooling water and cryogenic coolant is used to condense water traces in the HCl. The weak $CaCl_2$ solution is concentrated by an evaporator that ensures the recuperation of calcium chloride. Depending on the impurities in the incoming HCl solution feed to the column, some metals can contaminate the calcium chloride concentrated solution. A precipitation with $Ca(OH)_2$ and a filtration allows the removal of those impurities. The column can operate for example at 0.5 barg. This technology can allow for the recuperation of 98% of the HCl.

Table 7 shows the results obtained concerning the process shown in FIG. 6.

| Composition (% wt) | Stage 101 Yield (%) | Stage 102 Yield (%) | Stage 106 Yield (%) | Stage 105 Yield (%) | MgO tpy | MgO Yield (%) | Stage 107 Yield (%) | Stage 108 Yield (%) | TOTAL PRODUCED Yield (%) |
|---|---|---|---|---|---|---|---|---|---|
| Main constituents | | | | | | | | | |
| SiO$_2$ | — | 99.997% | — | — | — | — | — | — | 99.997% |
| Al | — | 98.02% | 95.03% | — | — | — | — | — | 95.03% |
| Fe | — | 100.00% | — | 92.65% | — | — | — | — | 92.65% |
| Mg | — | 99.998% | — | — | 29,756 | 92.64% | — | — | 92.64% |
| Ca | — | 99.998% | — | — | — | — | — | — | 98.28% |
| Na | — | 99.998% | — | — | — | — | — | — | 92.76% |
| K | — | 100.00% | — | — | — | — | — | — | 93.97% |
| Others incl. H$_2$O | — | — | — | — | — | — | — | — | — |
| RE/RM | — | 99.80% | — | 92.32% | — | — | — | 84.67% | 84.67% |
| By-Products | | | | | | | | | |
| NaOH | — | — | — | — | 68,556 | — | — | — | — |
| NaOCl | — | — | — | — | 9,269 | — | — | — | — |
| KOH | — | — | — | — | 73,211 | — | — | — | — |
| KOCl | — | — | — | — | 9,586 | — | — | — | — |
| CaSO$_4$ | — | — | — | — | 46,837 | — | — | — | — |
| Reactants | | | | | | | | | |
| H$_2$SO$_4$(*) | — | — | — | — | 19,204 | — | — | — | — |
| Fresh HCl M-UP | — | — | — | — | — | — | 99.75% | — | 99.75% |
| Total | — | 98.55% | 95.03% | — | 256,419 | 92.64% | 99.75% | 84.67% | |

Tables 8 to 26 show results obtained concerning the products made in accordance with the process shown in FIG. 6 in comparison with standard of the industry.

TABLE 8

Chemical composition of obtained alumina

| Element | % Weight* | Standard used in industry |
|---|---|---|
| Al$_2$O$_3$ | 99.938 | 98.35 min |
| Fe$_2$O$_3$ | 0.0033 | 0.0100 |
| SiO$_2$ | 0.0032 | 0.0150 |
| TiO$_2$ | 0.0003 | 0.0030 |
| V$_2$O$_5$ | 0.0008 | 0.0020 |
| ZnO | 0.0005 | 0.0030 |
| Cr$_2$O$_3$ | 0.0003 | N/A |
| MgO | 0.0090 | N/A |
| MnO | 0.0002 | N/A |
| P$_2$O$_5$ | 0.0039 | 0.0010 |
| Cu | 0.0030 | N/A |
| Ca | 0.0020 | 0.0030 |
| Na | 0.0190 | 0.4000 |
| K | 0.0053 | 0.0150 |
| Li | 0.0009 | N/A |
| Ba | <0.00001 | 0.0000 |
| Th | <0.000001 | 0.0000 |
| U | <0.000001 | 0.0000 |
| Free Cl$^-$ | Not detectable | 0.0000 |
| LOI | <1.0000 | <1.0000 |

P$_2$O$_5$ removal technique can include, for example, after leaching, phosphorous precipitation using zirconium sulphate. It can be provided, for example, in a solution heated at 80 to about 90° C. or about 85 to about 95° C., under vacuum.

TABLE 9

Physical properties of obtained alumina

| Property | Orbite Alumina | Standard used in industry |
|---|---|---|
| PSD < 20 μm | 5-10% | N/A |
| PSD < 45 μm | 10-12% | <10% |

TABLE 9-continued

Physical properties of obtained alumina

| Property | Orbite Alumina | Standard used in industry |
|---|---|---|
| PSD > 75 μm | 50-60% | N/A |
| SSA (m$^2$/g) | 60-85 | 60-80 |
| Att. Index | 10-12% | <10% |
| α Al$_2$O$_3$ | 2-5% | <7-9% |

TABLE 10

Chemical composition of obtained hematite

| Element | % Weight |
|---|---|
| Fe$_2$O$_3$ | >99.5% |
| Hydrolysable elements | <0.2% |

TABLE 11

Physical properties of obtained hematite*

| Property | Orbite hematite |
|---|---|
| PSD$_{mean}$ | 25-35 μm |
| Density (bulk) | 2000-3000 kg/m$^3$ |
| Humidity after filtration | <10% |

*Material can be produced as brickets

TABLE 12

Chemical composition of obtained silica

| Element | % Weight |
|---|---|
| SiO$_2$ | >99.7 |
| Al$_2$O$_3$ | <0.25% |
| MgO | ≈0.1% |
| Fe$_2$O$_3$ | ≈0.1% |

TABLE 12-continued

Chemical composition of obtained silica

| Element | % Weight |
|---|---|
| CaO | ≈0.01% |
| $Na_2O$ | <0.1% |
| $K_2O$ | <0.1% |

Note:
Product may have unbleached cellulose fiber filter aid. Cellulose wood flour.

TABLE 13

Physical properties of obtained silica

| Property | Orbite silica |
|---|---|
| $PSD_{mean}$ | 10-20 μm |
| Specific surface area | 34 $m^2/g$ |
| Density (bulk) | 2000-2500 $kg/m^3$ |
| Humidity after filtration | <30% |

TABLE 14

Purity of obtained rare earth element oxides

| Element | Purity (%) |
|---|---|
| $Ga_2O_3$ | >99% |
| $Sc_2O_3$ | |
| $Y_2O_3$ | |
| $La_2O_3$ | |
| $Ce_2O_3$ | |
| $Pr_2O_3$ | |
| $Nd_2O_3$ | |
| $Sm_2O_3$ | |
| $Eu_2O_3$ | |
| $Gd_2O_3$ | |
| $Dy_2O_3$ | |
| $Er_2O_3$ | |

Physical properties of obtained REE-O/RM-O

| Property | Orbite REE-O/RM-O |
|---|---|
| $PSD_{mean}$ | 2-30 μm |
| Density | 5500-13000 $kg/m^3$ |
| LOI | <1% |

TABLE 15

Chemical composition of obtained MgO

| Element | Typical | Specification |
|---|---|---|
| MgO | 99.0+ | 98.35 min |
| CaO | 0.0020 | 0.83 |
| $SiO_2$ | 0.0000 | 0.20 max |
| $B_2O_3$ | 0.0000 | 0.02 max |
| $Al_2O_3$ | 0.0300 | 0.12 max |
| $Fe_2O_3$ | 0.0160 | 0.57 max |
| $MnO_2$ | <0.14 | 0.14 max |
| LOI | 0.7% | <1% |

TABLE 16

Physical properties of obtained MgO

| Property | Orbite MgO |
|---|---|
| $PSD_{mean}$ | 10 μm |
| Density | N/A |
| LOI | 650 $kg/m^3$ |

TABLE 17

Chemical composition of obtained NaOH

| Element | % Weight |
|---|---|
| Sodium hydroxide | 32% |
| Water | 68% |

TABLE 18

Physical properties of obtained NaOH

| Property | Sodium hydroxide (NaOH) |
|---|---|
| Physical state | Liquid |
| Vapour pressure | 14 mmHg |
| Viscosity | >1 |
| Boiling point | 100° C. |
| Melting point | 0° C. |
| Specific gravity | 1.0 |

TABLE 19

Chemical compositon of obtained sodium hypochlorite (bleach)

| Element | % Weight |
|---|---|
| Sodium hypochlorite | 12% |
| Sodium hydroxide | <1% |
| Water | >80% |

TABLE 20

Physical properties of obtained NaOCl

| Property | Sodium hypochlorite (NaOCl) |
|---|---|
| Physical state | Liquid |
| Vapour pressure | 1.6 kPa |
| Viscosity | N/A |
| Boiling point | 100° C. |
| Melting point | −3° C. |
| Specific gravity | 1.2 |

TABLE 21

Chemical composition of obtained potassium hydroxide

| Element | % Weight |
|---|---|
| Potassium hydroxide | 32% |
| Water | 68% |

TABLE 22

Physical properties of obtained potassium hydroxide

| Property | KOH |
|---|---|
| Physical state | Liquid |
| Vapour pressure | 17.5 mmHg |
| Viscosity | N/A |
| Boiling point | 100° C. |
| Melting point | N/A |
| Specific gravity | 1.18 |

TABLE 23

Chemical composition of obtained potassium hypochlorite (KOCl)

| Element | % Weight |
|---|---|
| Potassium hypochlorite | 12% |
| Potassium hydroxide | <1% |
| Water | >80% |

TABLE 24

Physical properties of obtained potassium hypochlorite

| Property | KOCl |
|---|---|
| Physical state | Liquid |
| Vapour pressure | N/A |
| Viscosity | N/A |
| Boiling point | 103° C. |
| Melting point | N/A |
| Specific gravity | >1.0 |

TABLE 25

Chemical composition of obtained calcium sulphate dihydrate

| Element | % Weight |
|---|---|
| Calcium sulphate dehydrate | 100% |

TABLE 26

Physical properties of obtained calcium sulphate dehydrate

| Property | Orbite CaSO$_4$•2H$_2$O |
|---|---|
| Physical state | Solid |
| Specific gravity | 2.32 |

In order to demonstrate the versatility of the processes of the present disclosure, several other tests have been made so as to shown that these processes can be applied to various sources of starting material.

Example 6

Another starting material has been used for preparing acidic compositions comprising various components. In fact, a material that is a concentrate of rare earth elements and rare metals (particularly rich in zirconium) has been tested. Table 27 shows the results carried out on such a starting material using a similar process as shown in FIGS. 1, 3, 6 and 7 and as detailed in Examples 1, 2 and 5. It can thus be inferred from the results shown in Table 27 that the various components present in the leaching (various metals such as aluminum, iron, magnesium as well as rare earth elements and rare metals) can be extracted from the obtained leaching composition and that they can eventually be isolated by the processes of the present disclosure such as, for example, those presented in Examples 1, 2 and 5.

Example 7

Other tests have been made in a similar manner as described in Example 6. In the present example, carbonatite has been used as a starting material. (see Table 28 below).

TABLE 27

Tests made on a zirconium rich material.

| Raw material | Composition measure and/or evaluated (% wt.) | Average measured for testing (% wt.) | Extraction rate measured (ALP) (%) | O All Orbite process recovery (%) |
|---|---|---|---|---|
| Al$_2$O$_3$ | 6.12 | 6.12 | 89.65 | 86.95 |
| Fe$_2$O$_3$ | 15.80 | 15.80 | 99.50 | 97.51 |
| SiO$_2$ | 36.00 | 36.00 | 0.000 | 99.997 |
| MgO | 3.08 | 3.08 | 99.75 | 92.66 |
| Na$_2$O | 1.13 | 1.13 | 99.50 | 99.50 |
| K$_2$O | 2.12 | 2.12 | 99.50 | 99.50 |
| CaO | 6.10 | 6.10 | 99.50 | 99.00 |
| S total | 0.22 | 0.22 | | 100.00 |
| F | 1.98 | 1.98 | 99.50 | 99.00 |
| TiO$_2$ | 0.13 | 0.13 | 0.000 | 99.03 |
| V$_2$O$_5$ | 0.00 | 0.00 | 98.00 | 96.04 |
| P$_2$O$_5$ | 1.10 | 1.10 | 98.00 | 96.04 |
| MnO | 0.43 | 0.43 | 98.00 | 96.04 |
| ZrO$_2$ | 12.43 | 12.43 | 22.70 | 20.43 |
| Cr$_2$O$_3$ | 0.00 | 0.00 | 0.00 | 0.00 |
| Ce$_2$O$_3$ | 3.05 | 3.045 | 97.31 | 92.98 |
| La$_2$O$_3$ | 1.34 | 1.337 | 99.55 | 92.68 |
| Nd$_2$O$_3$ | 1.55 | 1.551 | 98.40 | 94.79 |
| Pr$_2$O$_3$ | 0.37 | 0.375 | 99.75 | 97.52 |
| Sm$_2$O$_3$ | 0.15 | 0.151 | 88.75 | 84.80 |
| Dy$_2$O$_3$ | 0.09 | 0.089 | 80.35 | 76.77 |
| Er$_2$O$_3$ | 0.03 | 0.030 | 72.60 | 69.37 |
| Eu$_2$O$_3$ | 0.03 | 0.027 | 85.57 | 81.76 |
| Gd$_2$O$_3$ | 0.21 | 0.205 | 82.85 | 79.16 |
| Ho$_2$O$_3$ | 0.01 | 0.013 | 77.10 | 73.67 |
| Lu$_2$O$_3$ | 0.00 | 0.003 | 60.15 | 57.47 |
| Tb$_2$O$_3$ | 0.02 | 0.022 | 78.05 | 74.58 |
| Th | 0.02 | 0.022 | 88.10 | 84.18 |
| Tm$_2$O$_3$ | 0.00 | 0.004 | 66.85 | 63.88 |
| U | 0.01 | 0.014 | 81.90 | 78.26 |
| Y$_2$O$_3$ | 0.30 | 0.300 | 72.70 | 69.46 |
| Yb$_2$O$_3$ | 0.02 | 0.023 | 62.80 | 60.01 |
| Ga$_2$O$_3$ | 0.02 | 0.016 | 96.90 | 92.59 |
| Sc$_2$O$_3$ | 0.00 | 0.003 | 95.00 | 90.77 |
| LOI (inc. water) | 6.122023973 | 6.12 | | |

TABLE 28

Tests made on carbonatite

| Raw material | Composition measure and/or evaluated (% wt.) | Average measured for testing (% wt.) | Extraction rate measured (ALP) (%) | O All Orbite process recovery (%) |
|---|---|---|---|---|
| Al$_2$O$_3$ | 0.70 | 0.70 | 84.31 | 81.61 |
| Fe$_2$O$_3$ | 11.22 | 11.22 | 94.14 | 92.15 |
| SiO$_2$ | 2.11 | 2.11 | 0.00003 | 99.997 |
| MgO | 6.50 | 6.500 | 100 | 96.25 |
| Na$_2$O | 0.07 | 0.07 | 92.54 | 90.55 |
| K$_2$O | 0.18 | 0.181 | 37.33 | 37.33 |
| CaO | 16.51 | 16.51 | 100 | 98.00 |
| TiO$_2$ | 0.00 | 0.000 | 0.00000 | 100.000 |
| V$_2$O$_5$ | 0.00 | 0.000 | 0 | 100.000 |

TABLE 28-continued

Tests made on carbonatite

| Raw material | Composition measure and/or evaluated (% wt.) | Average measured for testing (% wt.) | Extraction rate measured (ALP) (%) | O All Orbite process recovery (%) |
|---|---|---|---|---|
| $P_2O_5$ | 0.00 | 0.000 | 0 | 100.000 |
| MnO | 0.00 | 0.000 | 0 | 100.000 |
| $ZrO_2$ | 0.00 | 0.000 | 0 | 100.000 |
| $Cr_2O_3$ | 0.00 | 0.000 | 0 | 100.000 |
| $Ce_2O_3$ | 1.19 | 1.195 | 64.04 | 61.190 |
| $La_2O_3$ | 0.46 | 0.463 | 63.86 | 61.018 |
| $Nd_2O_3$ | 0.45 | 0.448 | 81.46 | 77.835 |
| $Pr_2O_3$ | 0.14 | 0.142 | 67.59 | 64.582 |
| $Sm_2O_3$ | 0.03 | 0.033 | 65.32 | 62.413 |
| $Dy_2O_3$ | 0.00 | 0.000 | 78.12 | 74.644 |
| $Er_2O_3$ | 0.00 | 0.000 | 86.15 | 82.316 |
| $Eu_2O_3$ | 0.01 | 0.007 | 66.45 | 63.493 |
| $Gd_2O_3$ | 0.01 | 0.013 | 54.46 | 52.037 |
| $Ho_2O_3$ | 0.00 | 0.000 | 83.12 | 79.421 |
| $Lu_2O_3$ | 0.00 | 0.000 | 88.86 | 84.906 |
| $Tb_2O_3$ | 0.00 | 0.001 | 41.42 | 39.577 |
| Th | 0.06 | 0.065 | | |
| $Tm_2O_3$ | 0.00 | 0.000 | 90.70 | 86.664 |
| U | 0.01 | 0.007 | | |
| $Y_2O_3$ | 0.00 | 0.000 | 84.68 | 80.912 |
| $Yb_2O_3$ | 0.00 | 0.000 | 85.11 | 81.323 |
| $Ga_2O_3$ | 0.00 | 0.000 | 0 | 0.000 |
| $Sc_2O_3$ | 0.00 | 0.000 | 0 | 0.000 |
| LOI (inc. water) | | 60.33 | | |

It can thus be inferred from the results shown in Table 28 that the various metals, rare earth elements and rare metals extracted present in the obtained leaching composition can eventually be isolated by the processes of the present disclosure such as, for example, those presented in Examples 1, 2 and 5.

Figure 8:
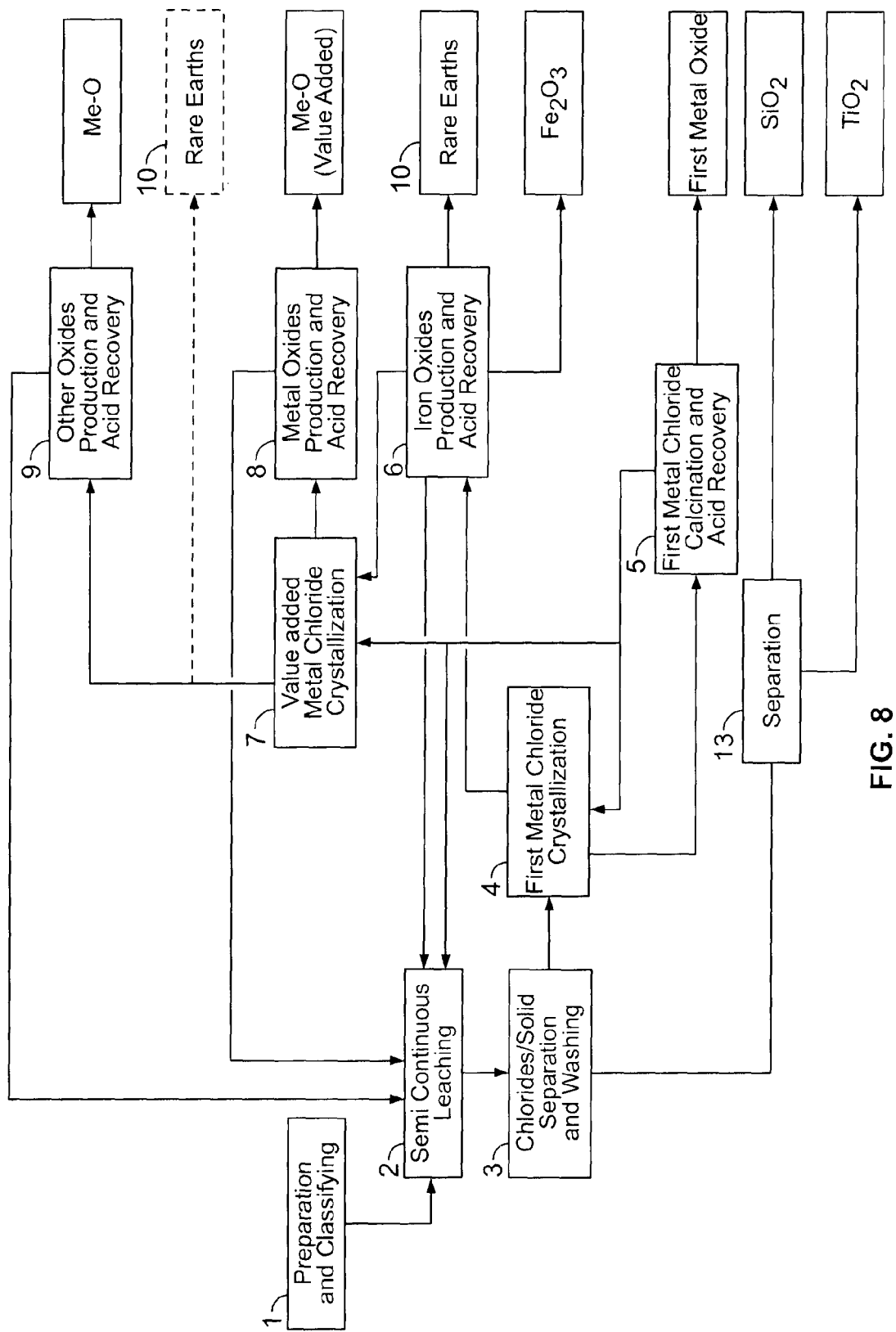
FIG. 8 shows another bloc diagram of an example of process for preparing various products.

The process shown in FIG. 8 is similar to the process of FIG. 1, with the exception that in FIG. 8, the term "aluminum" is replaced by a "first metal". The person skilled in the art would thus understand that in accordance with the present disclosure, the processes can also encompass recovering various other products and using various types of material as starting material. The first metal can be chosen from Al, Fe, Ti, Zn, Ni, Co, Mg, Li, Mn, Cu, Au, Ag, Pd, Pt. and mixtures thereof etc. Such a process can thus be used for recovering various other metals than aluminum. Thus, the first metal will be precipitated as a chloride in stage 5 and eventually converted into an oxide.

In fact, the person skilled in the art would understand that by replacing in FIGS. 1, 3, 6 and 7 the term "aluminum" with the expression "first metal" the processes shown in these figures can be used to obtain various other products than alumina and also used for treating various different starting material. Thus, the first metal can be recovered as a chloride (as it is the case for aluminum chlorides in the processes of FIGS. 1, 3, 6 and 7) and all the other stages of these processes can thus be carried out (when applicable) depending on the nature of the starting material used.

In step 4, the first metal chloride can be precipitated or crystallized. In fact, the first metal can be removed from the leachate in various manner. For example, a precipitating agent can be added or HCl (for example gaseous) can be reacted with the liquid obtained from step 3 so as to cause precipitation and/or crystallization of the first metal chloride. Alternatively, the temperature of the leachate can be controlled so as to substantially selectively cause precipitation of the first metal chloride. This can also be done, for example, by using an ion exchange resin, by adding a precipitating agent, etc. Combinations of various possibilities mentioned in this paragraph can also be envisaged. All these methods of at least substantially selectively recovering the first metal chloride can also be applied on the first metal oxide. They can be applied to only the first metal chloride, only to the second metal oxide or to both of them. In fact, the liquid obtained after stage 4 can be treated so as to convert the second metal chloride into the corresponding oxide and then, the second metal oxide can be substantially selectively recovered by selectively precipitating and/or crystallizing such a second metal oxide, for example by controlling the temperature, by using an ion exchange resin, by adding a precipitating agent, by adding HCl, or mixtures thereof.

As previously indicated, the processes of the present disclosure can be efficient for treating material comprising Al, Fe, Ti, Zn, Ni, Co, Mg, Li, Mn, Cu, Au, Ag, Pd, Pt.

For example, when treating a material that comprises, for example, Mg and Fe, the material can be leached for example by using HCl. Then, while the mixture (comprising a solid and a liquid) so obtained is still hot, it can be treated so as to separate the solid from the solid (for example by means of a solid/liquid separation). That will be effective for removing solids such as Si and optionally others such as Ti. Thus, the liquid can be cooled down to a temperature of about 5 to about 70° C., about 10 to about 60° C., about 10 to about 50° C., about 10 to about 40° C., or about 15 to about 30° C. so as to substantially selectively precipitate or crystallize magnesium (for example as $MgCl_2$ (first metal chloride in FIG. 8)), as shown in 4 of such a figure. Then, the first metal chloride can be converted as shown in 5 so as to obtain the first metal oxide. The iron can then be treated as in 6 of FIG. 8. The remainder of the process shown in FIG. 8 (stages 6 to 10) being as described previously for FIG. 1.

In a similar manner, the expression "iron oxides" in step 6 can be replaced in FIG. 8 by "second metal oxide". The person skilled in the art would thus understand that another metal than iron could be recovered as an oxide pursuant, for example, to a treatment of the liquid obtained from step 4. As previously discussed, the chloride of the second metal obtained from step 4 can be treated so as to substantially selectively recover the chloride of the second metal. This can be done, for example, by selectively precipitating and/or crystallizing such a second metal chloride by controlling the temperature, by substantially selectively hydrolyzing such a second metal chloride, by using an ion exchange resin, by adding a precipitating agent, by adding HCl, or mixtures thereof. All these methods of at least substantially selectively recovering the second metal chloride can also be applied on the second metal oxide. The can be applied to only the second metal chloride, only to the second metal oxide or to both of them. In fact, the liquid obtained after stage 4 can be treated so as to convert the second metal chloride into the corresponding oxide and then, the second metal oxide can be substantially selectively recovered by selectively precipitating and/or crystallizing such a second metal oxide, for example by controlling the temperature, by using an ion exchange resin, by adding a precipitating agent, by adding HCl, or mixtures thereof.

Alternatively, the iron chloride can be treated by means of a pyrohydrolysis in order to generate $Cl_2$. In such a case, the $Cl_2$ so produced can be used in step 13 of FIG. 8 for treating the solid that comprises Ti. For example, it can be used to convert $TiO_2$ into $TiCl_4$. Such a reaction can be carried under oxidizing conditions (for example more than 4% of $O_2$). The pyrohydrolysis can be carried out in in a fluid bed reactor under such oxidizing conditions.

For example, platinum and palladium can also be treated similarly. Moreover, their separation can also be accomplished with ion exchange: selective crystallization in HCl is possible and can be temperature sensitive.

FIGS. 9A and 9B show methods for separating Si from Ti. For example, when using an ore as starting material, leaching can be carried out in the presence of $Cl_2$ (optionally in the presence of carbon) so as to maintain Ti under the form of $TiCl_4$ since in remains in solution (fluid) while Si remains solid ($SiO_2$). Then, Ti (such as $TiCl_4$) can be heated so as to be converted into $TiO_2$. For example, it can be injected into a plasma torch for being purified.

Such a method for purifying Si and Ti can be used in all the processes of the present disclosure when there is a need for separating these two entities. See stage 13 in FIGS. 1, 3 and 8 and stage 113 in FIGS. 6 and 7.

The processes of the present disclosure provide a plurality of important advantages and distinction over the known processes. This is true for the production of various products has previously indicated.

The processes of the present disclosure can provide economical solutions that can successfully extract various products from various type of materials while providing ultra pure secondary products of high added value including highly concentrated rare earth elements and rare metals. The technology described in the present disclosure can allow for an innovative amount of total acid recovery and also for a ultra high concentration of recovered acid. When combing it to the fact that combined with a semi-continuous leaching approach that favors very high extraction yields and allows a specific method of crystallization of some products, and concentration of other value added elements.

For example, the crystallization of $AlCl_3$ into $AlCl_3.6H_2O$ using dried, cleaned and highly concentrated gaseous HCl as the sparging agent allows for a pure aluminum chloride hexahydrate with only few parts per million of iron and other impurities. A minimal number of stages are required to allow proper crystal growth.

The direct interconnection with the calcination of $AlCl_3.6H_2O$ into $Al_2O_3$ which does produce very high concentration of gas allows the exact adjustment in continuous of the HCl concentration within the crystallizer and thus proper control of the crystal growth and crystallization process.

The applicants have now discovered fully integrated and continuous processes with substantially total hydrochloric acid recovery for the extraction of alumina and other value added products from various materials that contain aluminum (clay, bauxite, aluminosilicate materials, slag, red mud, fly ashes etc.) containing aluminum. In fact, the processes allows for the production of substantially pure alumina and other value added products purified such as purified silica, pure hematite, titanium oxide, pure other minerals (ex: magnesium oxide) and rare earth elements products. In addition, the processes do not necessary require thermal pre-treatment before the acid leach operation. Acid leach can be carried out using semi-continuous techniques with high pressure and temperature conditions and very high regenerated hydrochloric acid concentration. In addition, the processes do not generate any residues not sellable, thus eliminating harmful residues to environment like in the case of alkaline processes.

The advantage of the high temperature calcination stage, in addition for allowing to control the α-form of alumina required, can be effective for providing a concentration of hydrochloric acid in the aqueous form (>38%) that is higher than the concentration of HCl at the azeotropic point and thus providing a higher incoming HCl concentration to the leaching stage. The calcination stage hydrochloric acid network can be interconnected to two (2) crystallization systems and by pressure regulation excess HCl can be being absorbed at the highest possible aqueous concentration. The advantage of having a hexahydrate chloride with low moisture content (<2%) incoming feed can allow for a continuous basis to recover acid at a concentration that is higher than the azeotropic concentration. This HCl balance and double usage into three (3) common parts of the processes and above azeotropic point is a substantial advance in the art.

Another advantage can be the use of the incoming chemistry (ferric chloride) to the iron oxide and hydrochloric acid recovery unit where all excess heat load from any calcination part, pyrohydrolysis and leaching part is being recovered to preconcentrate the mother liquor in metal chloride, thus allowing, at very low temperature, the hydrolysis of the ferric chloride in the form of very pure hematite and the acid regeneration at the same concentration than at its azeotropic point.

For example, the processes of the present disclosure can be effective for providing, at the ferric chloride hydrolysis step, the possibility to concentrate rare earth elements in form of chlorides at very high concentration within the hydrolyser reactor through an internal loop between hydrolyzer and crystallization. The advantage in that the processes of the present disclosure benefit from the various steps where gradual concentration ratios are applied. Thus, at this stage, in addition to an internal concentration loop, having the silica, the aluminum, the iron and having in equilibrium a solution close to saturation (large amount of water evaporated, no presence of free hydrochloric acid) allows for taking rare earth elements and non-hydrolysable elements in parts per million into the incoming feed and to concentrate them in high percentage directly at the hydrolyser after ferric chloride removal Purification of the specific oxides (RE-O) can then be performed using various techniques when in percentage levels. The advantage is doubled here: concentration at very high level of rare earth elements using integrated process stages and most importantly the approach prevents from having the main stream (very diluted) of spent acid after the leaching step with the risk of contaminating the main aluminum chloride stream and thus affecting yields in $Al_2O_3$. Another important improvement of the art is that on top of being fully integrated, selective removal of components allows for the concentration of rare earth elements to relatively high concentration (percentages).

Another advantage of the processes can be a selective crystallization of $MgCl_2$ through the sparging of HCl. Highly concentrated acid both in gaseous phase or in aqueous form can thus be generated. As previously indicated, $Mg(OH)_2$ can also be obtained. As per aluminum chloride specific crystallization, the direct interconnection with the calcination reactor, the HCl gas very high concentration (about 85 to about 95%, about 90 to 95% or about 90% by weight) can allow for exact adjustment in continuous of the crystallizer based on quality of magnesium oxide targeted.

The pyrohydrolysis can allow for conversion of any remaining chloride and the production of refined oxides that can be used (in case of clay as starting material) as a fertilizer and allowing the processing of large amount of wash water from the processes with the recovery hydrochloric acid in close loop at the azeotropic point for the leaching step. This is related to the fact that it does totally close the process loop in terms of acid recovery and the insurance that no residues harmful to the environment are being generated while processing any type of raw material, as previously described.

It was demonstrated that the processes of the present disclosure offer effective solutions for extracting various metals from various materials. For example, it was demonstrated that materials that contain titanium can be efficiently treated so as to recover titanium therefrom while also recovering other metals as those described in the present disclosure.

It was thus demonstrated that the present disclosure provides fully integrated processes for the extraction and/or recovery of titanium and/or for the preparation of titanium chloride or titanium oxide using a hydrochloric acid treatment while producing high purity and high quality products (minerals) and optionally extracting rare earth elements and rare metals.

With respect to the above-mentioned examples 1 to 5, the person skilled in the art will also understand that depending on the starting material used some parameters might need to be adjusted consequently. In fact, for example, certain parameters such as reaction time, concentration, temperature may vary in accordance with the reactivity of the selected starting material.

While a description was made with particular reference to the specific embodiments, it will be understood that numerous modifications thereto will appear to those skilled in the art. Accordingly, the above description and accompanying drawings should be taken as specific examples and not in a limiting sense.

What is claimed is:

1. A process for preparing various products, said process comprising:
   leaching a raw aluminum-containing material with HCl so as to obtain a leachate comprising Al, Fe and Mg ions and a solid comprising Si, and separating said solid from said leachate, thereby recovering Si;
   recovering said Al from said leachate by recovering Al as precipitated $AlCl_3$, by controlling the temperature of said leachate and/or concentration of HCl, by using a precipitating agent, or by using an ion exchange resin;
   recovering said Fe from said leachate by recovering Fe as precipitated $Fe_2O_3$, by controlling the temperature of said leachate and/or concentration of HCl, by carrying out an hydrolysis, by using a precipitating agent, or by using an ion exchange resin; and
   recovering said Mg from said leachate by recovering Mg as precipitated $MgCl_2$, by controlling the temperature of said leachate and/or concentration of HCl, by using a precipitating agent, or by using an ion exchange resin.

2. The process of claim 1, wherein said aluminum-containing material is leached with HCl having a concentration of about 25 to about 45 weight %.

3. The process of claim 1, wherein said aluminum-containing material is leached with HCl having a concentration of about 25 to about 45 weight % at a temperature of about 125 to about 225° C.

4. The process of claim 1, wherein said process further comprises calcining at least one of $AlCl_3$ and $MgCl_2$ and recycling gaseous HCl so-produced by contacting it with water so as to obtain a composition having a concentration of about 25 to about 45 weight % and using said composition for leaching said aluminum-containing material.

5. The process of claim 4, wherein said recycled gaseous HCl so-produced is contacted with water so as to obtain said composition having a concentration of about 26 to about 42 weight % and said composition is reacted, at a temperature of about 125 to about 225° C., with said aluminum-containing material so as to leaching it.

6. The process of claim 1, wherein said leachate comprises iron chloride and is concentrated to a concentrated liquid having an iron chloride concentration of at least 30% by weight; and then hydrolyzed at a temperature of about 155 to about 350° C.

7. The process of claim 1, further comprising calcining $MgCl_2$ into MgO.

8. The process of claim 1, wherein recovering said Al comprises reacting said leachate with gaseous HCl so as to obtain said liquid and said precipitate comprising said aluminum ions in the form of $AlCl_3.6H_2O$.

9. The process of claim 8, wherein said process comprises converting $AlCl_3.6H_2O$ into $Al_2O_3$ by carrying out a calcination of $AlCl_3.6H_2O$.

10. The process of claim 8, wherein said process comprises converting $AlCl_3.6H_2O$ into $Al_2O_3$ by heating said $AlCl_3.6H_2O$ at a temperature of at least 1200° C.

11. The process of claim 8, wherein said process comprises converting $AlCl_3.6H_2O$ into $Al_2O_3$ by heating said $AlCl_3.6H_2O$ at a temperature of at least 350° C.

12. The process of claim 9, wherein converting $AlCl_3.6H_2O$ into $Al_2O_3$ is carried out in two stages.

13. The process of claim 9, wherein converting $AlCl_3.6H_2O$ into $Al_2O_3$ is carried out by injecting steam.

14. The process of claim 1, wherein said process comprises:
    leaching said aluminum-containing material with HCl so as to obtain said leachate comprising Al, Fe and Mg ions and a solid comprising Si, and separating said solid from said leachate, thereby recovering Si;
    recovering said Al from said leachate in the form of precipitated $AlCl_3$ by controlling the temperature of said leachate and/or concentration of HCl;
    recovering said Fe from said leachate in the form of precipitated $Fe_2O_3$ by controlling the temperature of said leachate and/or concentration of HCl; and
    recovering said Mg from said leachate by using gaseous HCl for crystallizing $MgCl_2$.

15. A process for preparing aluminum, said process comprising:
    obtaining $AlCl_3$ by a process as defined in claim 1;
    converting said $AlCl_3$ into $Al_2O_3$; and
    converting said $Al_2O_3$ into aluminum.

16. A process for preparing various products, the process comprising:
    leaching a titanium-containing material comprising Ti, Si, Fe and Al with HCl so as to obtain a leachate comprising ions of Fe and Al and a solid comprising Ti and Si, and separating the solid from the leachate;
    reacting the leachate with HCl so as to obtain a liquid comprising at least one chloride of Fe and a precipitate comprising a chloride of Al, and separating the precipitate from the liquid;
    treating the liquid under conditions effective for converting the at least one chloride of Fe into $Fe_2O_3$ and recovering said $Fe_2O_3$;
    heating the precipitate under conditions effective for converting the precipitate into $Al_2O_3$ and recovering said $Al_2O_3$;
    treating said solid so as to substantially separate Si from Ti that are contained therein by:
        leaching said solid with an acid in the presence of a chloride that was combined with said solid and said acid so as to obtain a liquid portion comprising Ti and a solid portion containing Si and wherein the liquid portion is separated from the solid portion so as to recover said Ti and said Si; or
        treating said solid with $Cl_2$ in order to obtain a liquid portion comprising said Ti and a solid portion comprising said Si, and wherein said solid portion and said liquid portion are separated from one another so as to recover said Ti and said Si,
    thereby separately recovering said Ti, Si, Fe and Al.

17. A process for preparing various products, the process comprising:
- leaching a titanium-containing material comprising Ti, Al, Fe and Mg with HCl so as to obtain a leachate comprising ions of Al, Fe and Mg and a solid comprising Ti, and separating the solid from the leachate;
- substantially selectively recovering said Al from said leachate;
- substantially selectively recovering said Fe from said leachate;
- substantially selectively recovering said Mg from said leachate;
- treating said solid so as at least partially recover Ti.

18. The process of claim 17, wherein said process comprises controlling the temperature of said leachate and/or concentration of HCl so as to substantially selectively precipitate said Fe in the form of at least one chloride, and recovering said precipitate from said leachate.

19. The process of claim 17, wherein said process comprises:
- controlling the temperature of said leachate and/or concentration of HCl so as to substantially selectively precipitate said Fe in the form of at least one chloride, and recovering said at least one chloride from said leachate;
- reacting said leachate with gaseous HCl so as to substantially selectively precipitate said Al in the form of $AlCl_3 \cdot 6H_2O$, and recovering said $AlCl_3 \cdot 6H_2O$ from said leachate; and
- reacting said leachate with gaseous HCl so as to substantially selectively precipitate said Mg in the form of $MgCl_2$, and recovering said $MgCl_2$ from said leachate.

20. A process for preparing various products, said process comprising:
- leaching an aluminum-containing material with HCl so as to obtain a leachate comprising Al, Fe, Ni and Mg ions and a solid comprising Si, and separating said solid from said leachate, thereby recovering Si;
- recovering said Al contained in said leachate in the form of precipitated $AlCl_3$ by controlling the temperature of said leachate and/or concentration of HCl;
- recovering said Fe contained in said leachate in the form of precipitated $Fe_2O_3$ by controlling the temperature of said leachate and/or concentration of HCl;
- recovering said Mg contained in said leachate by crystallizing $MgCl_2$; and
- recovering said Ni contained in said leachate under the form of $NiCl_2$.

21. A process for preparing various products, said process comprising:
- leaching an aluminum-containing material with HCl so as to obtain a leachate comprising Al, Fe and Mg ions and a solid comprising Si, and separating said solid from said leachate, thereby recovering Si;
- recovering said Al from said leachate by recovering Al as precipitated $AlCl_3$, by controlling the temperature of said leachate and/or concentration of HCl, by using a precipitating agent, or by using an ion exchange resin;
- recovering said Fe from said leachate by recovering Fe as precipitated $Fe_2O_3$, by controlling the concentration of HCl, by using a precipitating agent, or by using an ion exchange resin; and
- recovering said Mg from said leachate by recovering Mg as precipitated $MgCl_2$, by controlling the temperature of said leachate and/or concentration of HCl, by using a precipitating agent, or by using an ion exchange resin.

22. A process for preparing various products, said process comprising:
- leaching an aluminum-containing material with HCl so as to obtain a leachate comprising Al, Fe and Mg ions and a solid comprising Si, and separating said solid from said leachate, thereby recovering Si;
- substantially selectively recovering said Al from said leachate by recovering Al as precipitated $AlCl_3$, by controlling the temperature of said leachate and/or concentration of HCl, by using a precipitating agent, or by using an ion exchange resin;
- substantially selectively recovering said Fe from said leachate by recovering Fe as precipitated $Fe_2O_3$, by controlling the temperature of said leachate and/or concentration of HCl, by carrying out an hydrolysis, by using a precipitating agent, or by using an ion exchange resin; and
- substantially selectively recovering said Mg from said leachate by recovering Mg as precipitated $MgCl_2$, by controlling the temperature of said leachate and/or concentration of HCl, by using a precipitating agent, or by using an ion exchange resin.

* * * * *